(12) United States Patent
Rana et al.

(10) Patent No.: US 11,669,400 B2
(45) Date of Patent: Jun. 6, 2023

(54) LIGHTWEIGHT METADATA HANDLING FOR FILE INDEXING AND LIVE BROWSE OF BACKUP COPIES

(71) Applicant: Commvault Systems, Inc., Tinton Falls, NJ (US)

(72) Inventors: Pratik S. Rana, Edison, NJ (US); Deepak Raghunath Attarde, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 25 days.

(21) Appl. No.: 17/354,905

(22) Filed: Jun. 22, 2021

(65) Prior Publication Data

US 2022/0043712 A1 Feb. 10, 2022

Related U.S. Application Data

(63) Continuation-in-part of application No. 16/870,723, filed on May 8, 2020.

(60) Provisional application No. 62/893,000, filed on Aug. 28, 2019.

(51) Int. Cl.
*G06F 11/14* (2006.01)
*G06F 3/06* (2006.01)

(52) U.S. Cl.
CPC .......... *G06F 11/1435* (2013.01); *G06F 3/067* (2013.01); *G06F 3/0619* (2013.01); *G06F 3/0644* (2013.01); *G06F 11/1451* (2013.01); *G06F 11/1464* (2013.01); *G06F 11/1469* (2013.01)

(58) Field of Classification Search
None
See application file for complete search history.

(56) References Cited

U.S. PATENT DOCUMENTS

2017/0124034 A1\* 5/2017 Upadhyay ............. G06F 40/289
2017/0277686 A1\* 9/2017 Dornemann ........ G06F 11/1448
2020/0401489 A1\* 12/2020 Mitkar .................... G06F 16/13

\* cited by examiner

*Primary Examiner* — Eddy Cheung
(74) *Attorney, Agent, or Firm* — Commvault Systems, Inc,

(57) ABSTRACT

The disclosed enhancements optimize the use of the live browse cache and pseudo-disk storage areas, improving metadata handling so that it can be used more effectively to speed up live browse and file indexing of backup copies in a data storage management system. The enhancements operate granularly to identify within each extent being backed up smaller sectors that comprise metadata. The disclosed approach pre-fetches the metadata of the backup copy before allowing the file scan of the file indexing and/or the live browse operation to proceed. The backup operation, the file indexing operation, and the live browse operation are enhanced to handle the more granular metadata sectors without changing the granularity of the full extents generated and stored in the backup.

20 Claims, 27 Drawing Sheets

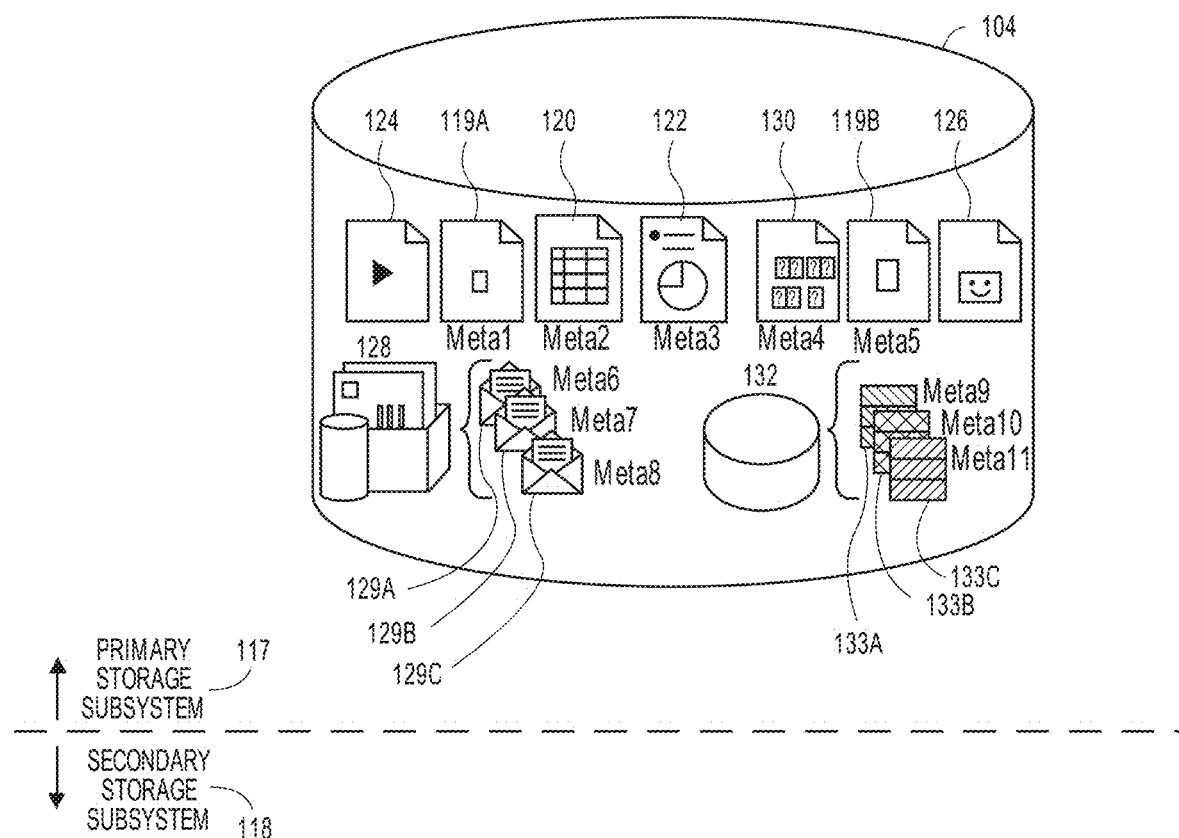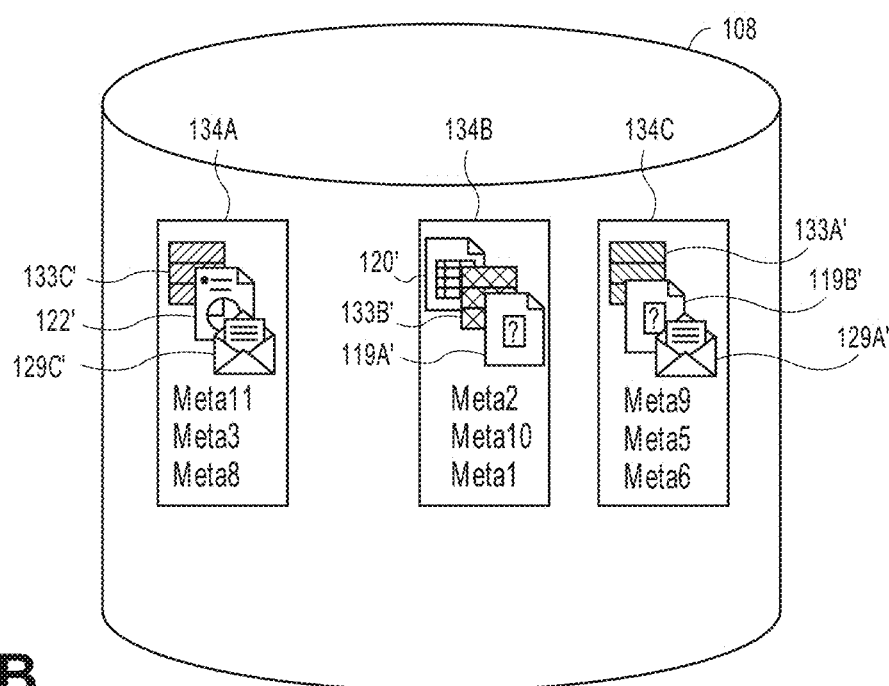
FIG. 1B

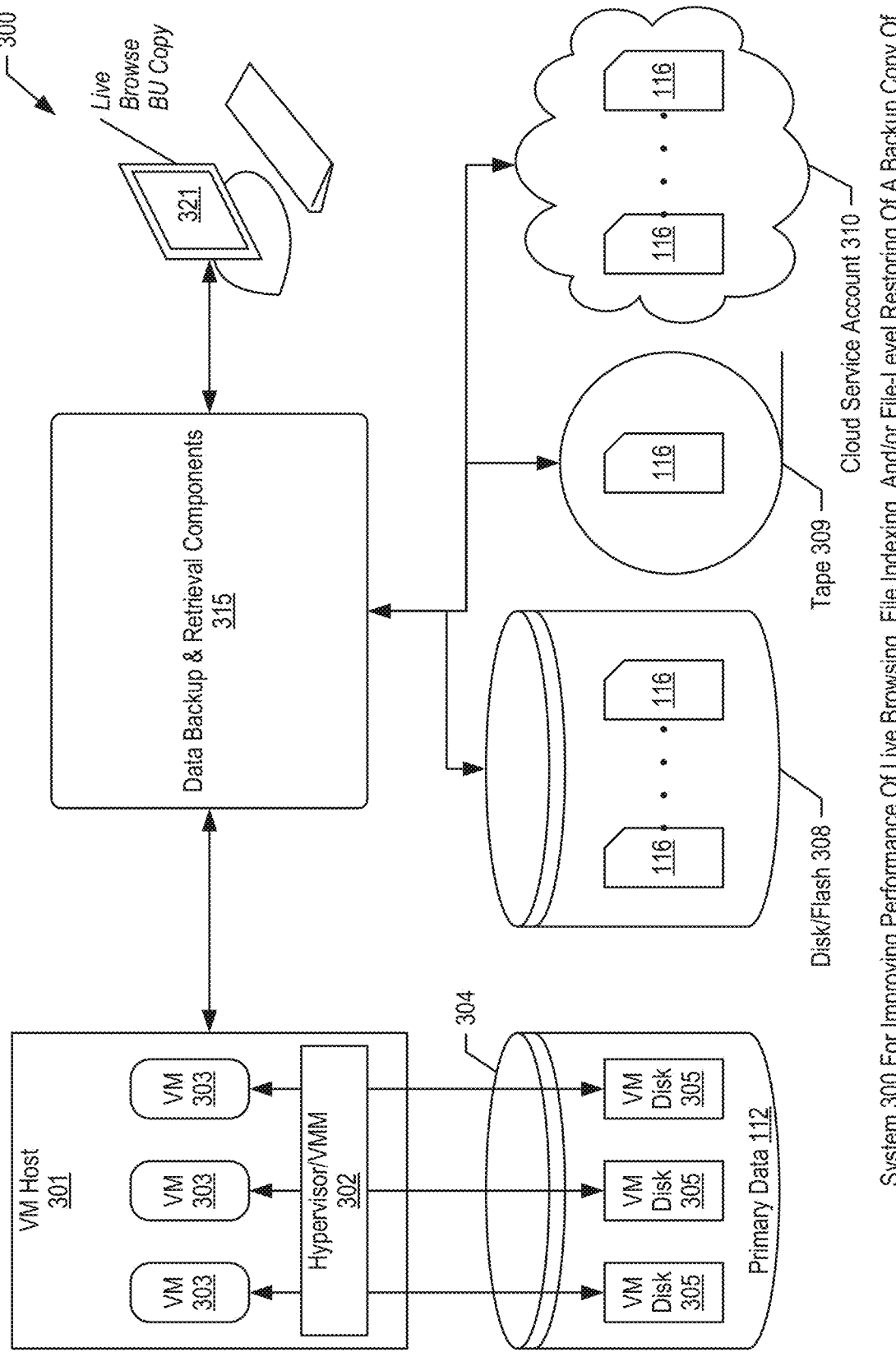
FIG. 3A  System 300 For Improving Performance Of Live Browsing, File Indexing, And/or File-Level Restoring Of A Backup Copy Of Virtual Machine Data

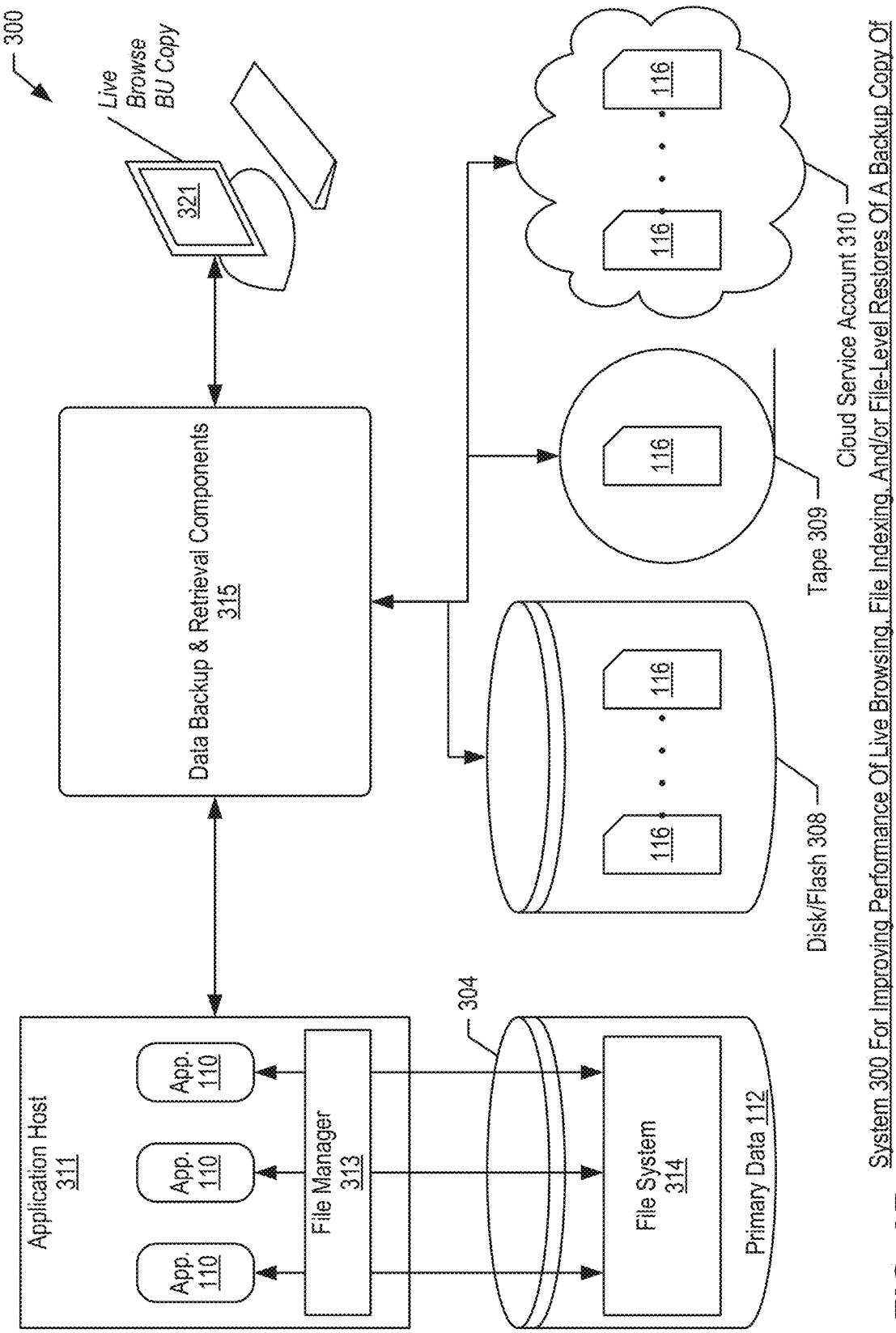
FIG. 3B  System 300 For Improving Performance Of Live Browsing, File Indexing, And/or File-Level Restores Of A Backup Copy Of File System Data

LIGHTWEIGHT METADATA HANDLING FOR FILE INDEXING AND LIVE BROWSE OF BACKUP COPIES

INCORPORATION BY REFERENCE TO ANY PRIORITY APPLICATIONS

This application is a Continuation-in-Part of U.S. patent application Ser. No. 16/870,723 filed on May 8, 2020, which claims the benefit of priority to U.S. Provisional Patent Application No. 62/893,000 filed on Aug. 28, 2019, all of which are incorporated by reference herein. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines (VMs), and so on as part of a maintenance program. Given the rapidly expanding volume of data under management, companies also continue to seek innovative techniques for managing data growth. Enterprises also increasingly view their data as a valuable asset to leverage pro-actively.

One way of leveraging backed up data is to index it for future access. Another way to leverage the backed up data is to give users the ability to discover files and folders in backup copies, a feature known as "live browse." Live browse and file indexing operations, as well as file-level restores, can suffer significant slow-downs when a targeted backup copy is stored in certain cloud storage environments configured in cloud service accounts and/or on non-random-access media such as tape. In some scenarios using tape as the backup medium, live browse and/or file indexing is too slow to be offered as a feature. Therefore, there is a need to speed up live browse and file indexing operations.

Fully featured enterprise-grade data storage management systems may back up data that is very large in size and/or in numbers of files. Thus, for backup jobs of thousands or millions of files, the need to speed up file indexing and live browse operations is even more pronounced.

SUMMARY

The present inventors determined that techniques for speeding up file indexing and/or live browse of backup copies, which use a live browse cache and a pseudo-disk storage area, may be slowed down by large amounts of payload data that accompany the metadata saved in the live browse cache and pseudo-disk. Since live browse and file indexing rely on metadata and generally do not require payload data from the backup copy, the extra payload data burdens the file indexing and/or live browse features to some extent.

Data files saved in backup copies comprise file-specific metadata, such as file attributes, access control lists, etc. The backup operations generate additional job-specific metadata. All this metadata becomes part of the backup copy. Very large numbers of files in a backup copy thus produce a lot of metadata. Even if the files themselves are small, the amount of metadata can be relatively large. Backup copies are saved to media in groupings of data (extents, chunks, data blocks) of a certain fixed granularity, e.g., 1 MB, which is optimized for backup performance. Metadata may be dispersed in any number of extents within the backup copy, and with large numbers of files, the metadata is likely to be widely dispersed.

A problem arises when extents that comprise metadata content fill up the live browse cache. This phenomenon tends to happen with backup copies comprising very large numbers of files with widely dispersed metadata. When the live browse cache is full, additional retrievals must be made from the backup media. Retrievals from media are slower and take up substantially more bandwidth and processing cycles.

The present inventors recognized the need to optimize the use of the live browse cache and pseudo-disk storage areas. The present inventors devised enhancements that improve metadata handling so that it can be used more effectively to speed up live browse and file indexing without over-filling the live browse cache or the pseudo-disk storage area. The enhancements advantageously operate at a more granular level to identify within each extent smaller segments (sectors, fragments) that comprise metadata, e.g., 4 KB in size as contrasted to the 1 MB-sized backup extents. The backup, the file indexing, and the live browse operations are enhanced to handle the more granular metadata sectors without changing the granularity of the extents that are generated and stored at backup time.

The backup operation identifies and flags extents that comprise metadata, and additionally identifies which sectors of the extent comprise metadata. A representative bitmap of the sectors is constructed during backup, indicating which sectors carry metadata, and the bitmap is added to the extent header along with the metadata flag. Typically this function is performed by a data agent that intakes the source data for backup.

An incoming extent with a metadata flag indicating that the extent is metadata-free is not a candidate for the live browse cache. On the other hand, an incoming extent with a metadata flag indicating it comprises metadata is processed for the live browse cache. Instead of storing the incoming extent in its entirety in the live browse cache, the bitmap is used to strip out all segments lacking metadata (i.e., payload-only segments) and replace them with hole markers. A "stripped" (sparse, partial) extent is then constructed that comprises only the metadata-carrying segments and hole markers, and an extent identifier corresponding to the incoming extent, which will be backed up separately. The stripped extent is added to the live browse cache. The hole markers are minimal in size, and therefore stripped extents collectively occupy far less space in the live browse cache (e.g., 80-90% less) than the extents as received from the data agent.

All extents are backed up to media, whether they comprise metadata or not. Such extents are referred to herein as "backup extents" or "full extents" because they have not been stripped of the payload-only segments. The backup extents collectively form a backup copy generated in a backup job, e.g., a backup copy of a data source. A backup index tracks where the backup extents can be found in backup media. In some embodiments, the full extents lack the metadata flag and bitmap, which are retained in the backup index. These enhancements operate in the illustrative media agent that executes on a media agent host computer, which may be implemented as hardware or virtualized.

At this point, the live browse cache, which is maintained by the media agent, comprises stripped extents that occupy much less storage space than full extents, because their payload-only sectors are missing (and replaced by hole markers). A live browse cache index tracks whether an extent in the live browse cache is a stripped extent or a full extent, though generally few full extents end up in the live browse cache.

Live browse is typically invoked by a user at a client computing device. File indexing is typically invoked automatically, immediately following completion of the backup job, by a storage manager that controls storage operations in the data storage management system. Both file indexing and live browse generate read requests for metadata. File indexing involves a complete file scan of all of the backup copy, whereas live browse issues read requests on demand according to how the user navigates. Both features benefit from fast reads of the metadata.

An illustrative driver, which is interposed between the computing device issuing the read requests and the media agent, intercepts the read requests. The driver serves the read requests from a pseudo-disk storage area it maintains. The driver may execute on the media agent host or on a separate proxy computer, which may be implemented as hardware or may take a virtualized form.

To speed up file indexing and live browse, the disclosed approach pre-fetches the metadata of the backup copy before allowing the file scan of the file indexing and/or the live browse operation to proceed. As backup copies are made, the backup operation populates stripped extents into the live browse cache. Pre-fetching brings stripped extents into the pseudo-disk storage area from the live browse cache.

To populate its pseudo-disk, the driver first accesses the backup index at the media agent host to identify metadata-carrying extents of the backup copy. The driver requests these extents from the media agent with an indication for metadata. On receiving a request for metadata, the media agent checks its live browse cache index and serves the stripped extents from the live browse cache. Ideally, these stripped extents will satisfy all of the live browse and/or file scan read requests, but in the event that they cannot, the driver will request the extent from the media agent, typically without the indication for metadata, e.g., requesting a full extent. The media agent restores the full extent from the backup media and serves the full extent to the driver. Such full extents may be added to the live browse cache for future use.

These enhancements optimize how the limited storage space is utilized at the live browse cache and the pseudo-disk. By using these storage areas sparingly, much more metadata may be packed into them, thus enabling a more streamlined file indexing and/or live browse experience, even for very large backup copies having thousands or millions of files. Additionally, this approach reduces bandwidth needed for the pipeline between media agent and driver, and ultimately provides for faster completion of the file scan in file indexing. More details are given below and in the accompanying figures.

BRIEF DESCRIPTION OF THE DRAWINGS

FIG. 1B is a detailed view of a primary storage device, a secondary storage device, and some examples of primary data and secondary copy data.

FIG. 3A is a block diagram illustrating some salient portions of a system 300 for improving performance of live browsing, file indexing, and/or file-level restoring of a block-level backup copy of virtual machine data, according to an illustrative embodiment.

FIG. 3B is a block diagram illustrating some salient portions of a system 300 for improving performance of live browsing, file indexing, and/or file-level restoring of a block-level backup copy of file system data, according to an illustrative embodiment.

DETAILED DESCRIPTION

Detailed descriptions and examples of systems and methods according to one or more illustrative embodiments of the present invention may be found in the section entitled LIGHTWEIGHT METADATA HANDLING FOR FILE INDEXING AND LIVE BROWSE OF BACKUP COPIES as well as in the section entitled Example Embodiments, and also in FIGS. 11-15 herein. Furthermore, components and functionality for improving live-browse performance may be configured and/or incorporated into information management systems such as those described herein in FIGS. 1A-1H and 2A-10B.

Various embodiments described herein are intimately tied to, enabled by, and would not exist except for, computer technology. For example, live browse cache management and pseudo-disk management as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
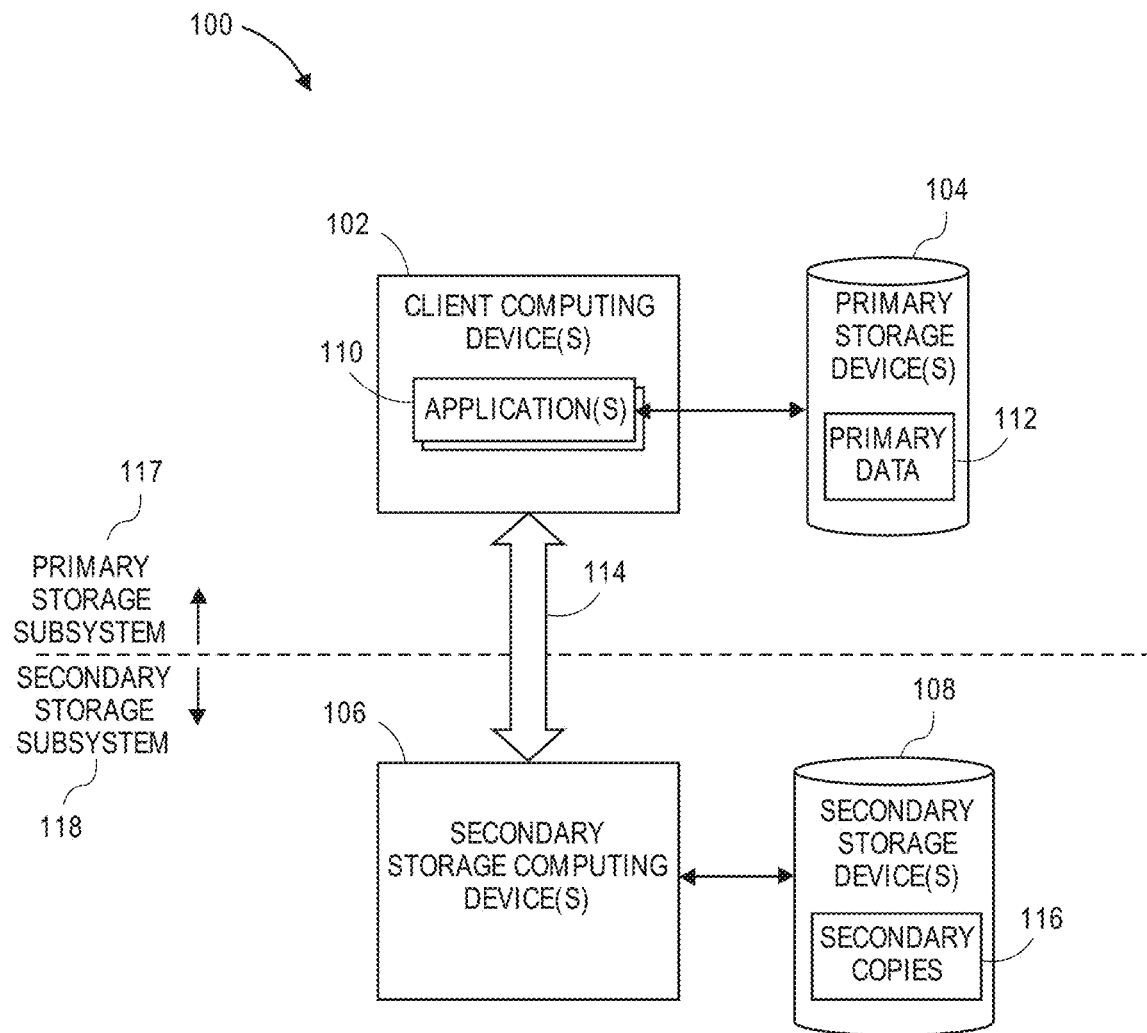
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

- U.S. Pat. No. 7,035,880, entitled "Modular Backup and Retrieval System Used in Conjunction With a Storage Area Network";
- U.S. Pat. No. 7,107,298, entitled "System And Method For Archiving Objects In An Information Store";
- U.S. Pat. No. 7,246,207, entitled "System and Method for Dynamically Performing Storage Operations in a Computer Network";
- U.S. Pat. No. 7,315,923, entitled "System And Method For Combining Data Streams In Pipelined Storage Operations In A Storage Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,529,782, entitled "System and Methods for Performing a Snapshot and for Restoring Data";
- U.S. Pat. No. 7,617,262, entitled "System and Methods for Monitoring Application Data in a Data Replication System";
- U.S. Pat. No. 7,734,669, entitled "Managing Copies Of Data";
- U.S. Pat. No. 7,747,579, entitled "Metabase for Facilitating Data Classification";
- U.S. Pat. No. 8,156,086, entitled "Systems And Methods For Stored Data Verification";
- U.S. Pat. No. 8,170,995, entitled "Method and System for Offline Indexing of Content and Classifying Stored Data";
- U.S. Pat. No. 8,230,195, entitled "System And Method For Performing Auxiliary Storage Operations";
- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 8,364,652, entitled "Content-Aligned, Block-Based Deduplication";
- U.S. Pat. No. 8,578,120, entitled "Block-Level Single Instancing";
- U.S. Pat. No. 8,954,446, entitled "Client-Side Repository in a Networked Deduplicated Storage System";
- U.S. Pat. No. 9,020,900, entitled "Distributed Deduplicated Storage System";
- U.S. Pat. No. 9,098,495, entitled "Application-Aware and Remote Single Instance Data Management";
- U.S. Pat. No. 9,239,687, entitled "Systems and Methods for Retaining and Using Data Block Signatures in Data Protection Operations";
- U.S. Pat. No. 9,633,033, entitled "High Availability Distributed Deduplicated Storage System";
- U.S. Pat. No. 9,852,026, entitled "Efficient Application Recovery based on a Pseudo-Storage-Device Driver";
- U.S. Pat. Pub. No. 2006/0224846, entitled "System and Method to Support Single Instance Storage Operations";
- U.S. Pat. Pub. No. 2016-0350391, entitled "Replication Using Deduplicated Secondary Copy Data";

U.S. Pat. Pub. No. 2017-0168903 A1, entitled "Live Synchronization and Management of Virtual Machines across Computing and Virtualization Platforms and Using Live Synchronization to Support Disaster Recovery";

U.S. Pat. Pub. No. 2017-0185488 A1, entitled "Application-Level Live Synchronization Across Computing Platforms Including Synchronizing Co-Resident Applications To Disparate Standby Destinations And Selectively Synchronizing Some Applications And Not Others";

U.S. Pat. Pub. No. 2017-0192866 A1, entitled "System For Redirecting Requests After A Secondary Storage Computing Device Failure";

U.S. Pat. Pub. No. 2017-0235647 A1, entitled "Data Protection Operations Based on Network Path Information"; and U.S. Pat. Pub. No. 2017-0242871 A1, entitled "Data Restoration Operations Based on Network Path Information".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
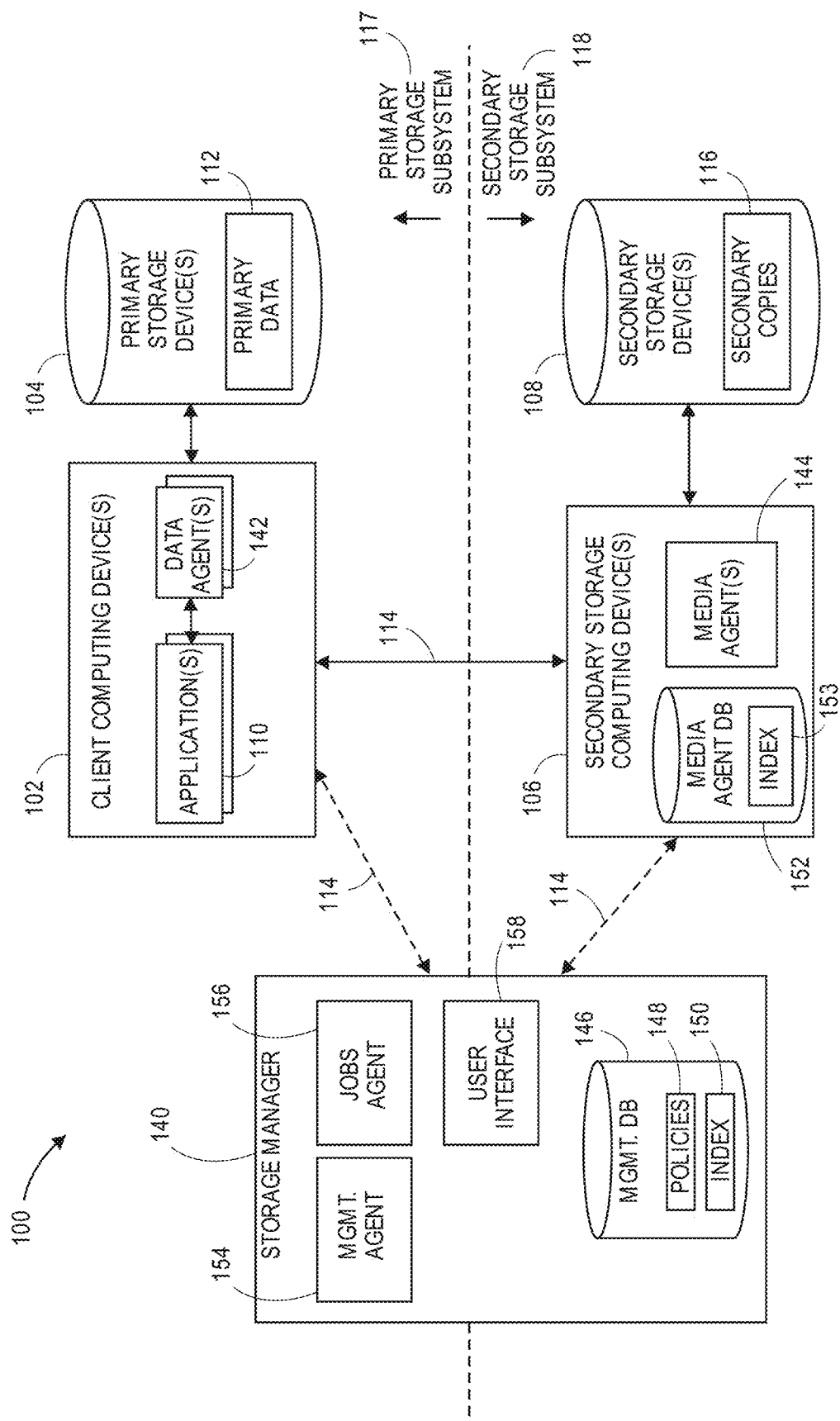
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise, secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or another non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:
  communicating with data agents 142 and media agents 144, including transmitting instructions, messages, and/or queries, as well as receiving status reports, index information, messages, and/or queries, and responding to same;
  initiating execution of information management operations;
  initiating restore and recovery operations;
  managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102 and process the data appropriately. For example, during a secondary copy operation, data agent 142 may arrange or assemble the data and metadata into one or more files having a certain format (e.g., a particular backup or archive format) before transferring the file(s) to a media agent 144 or another component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain backup media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
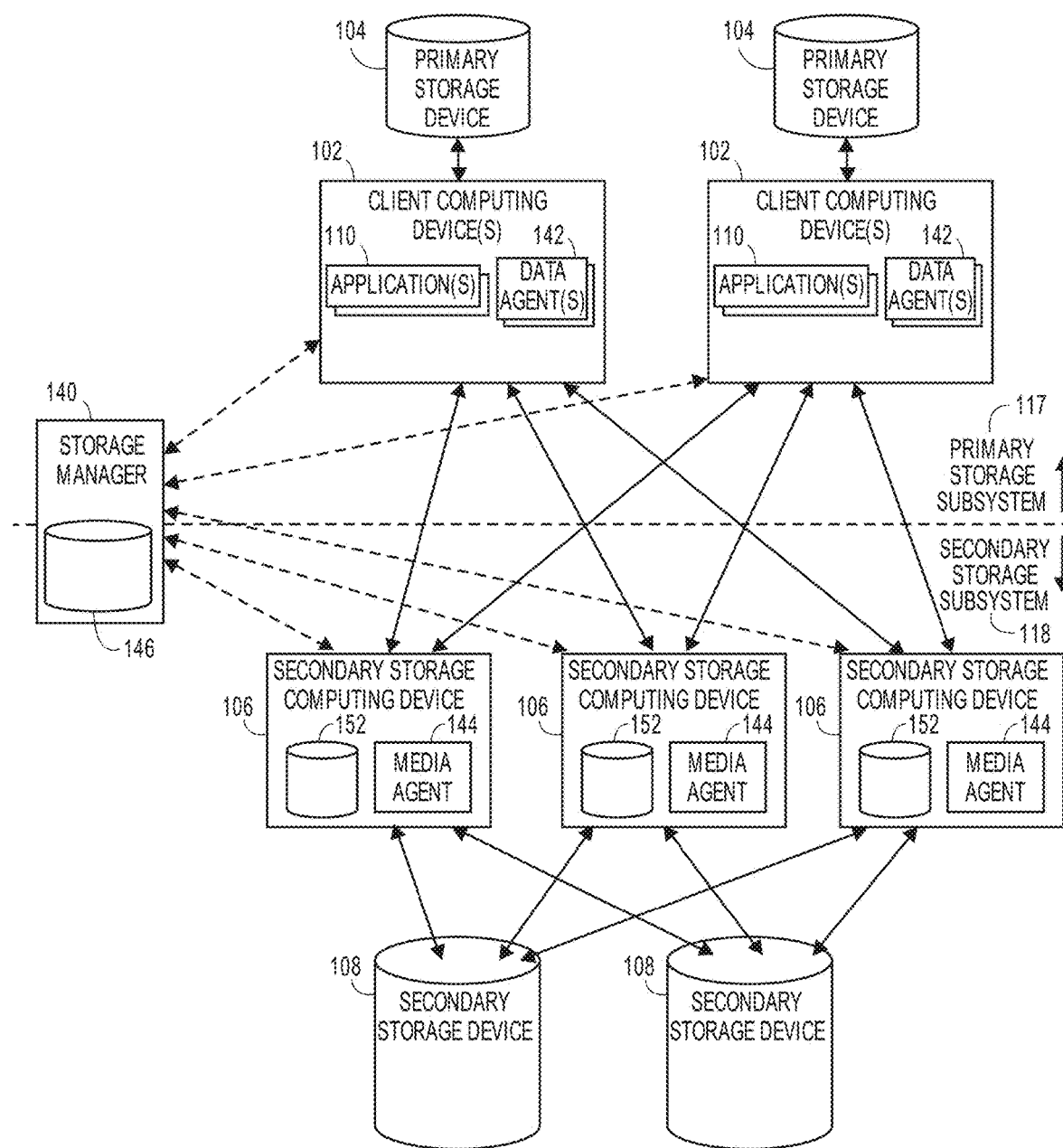
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases, a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched, and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
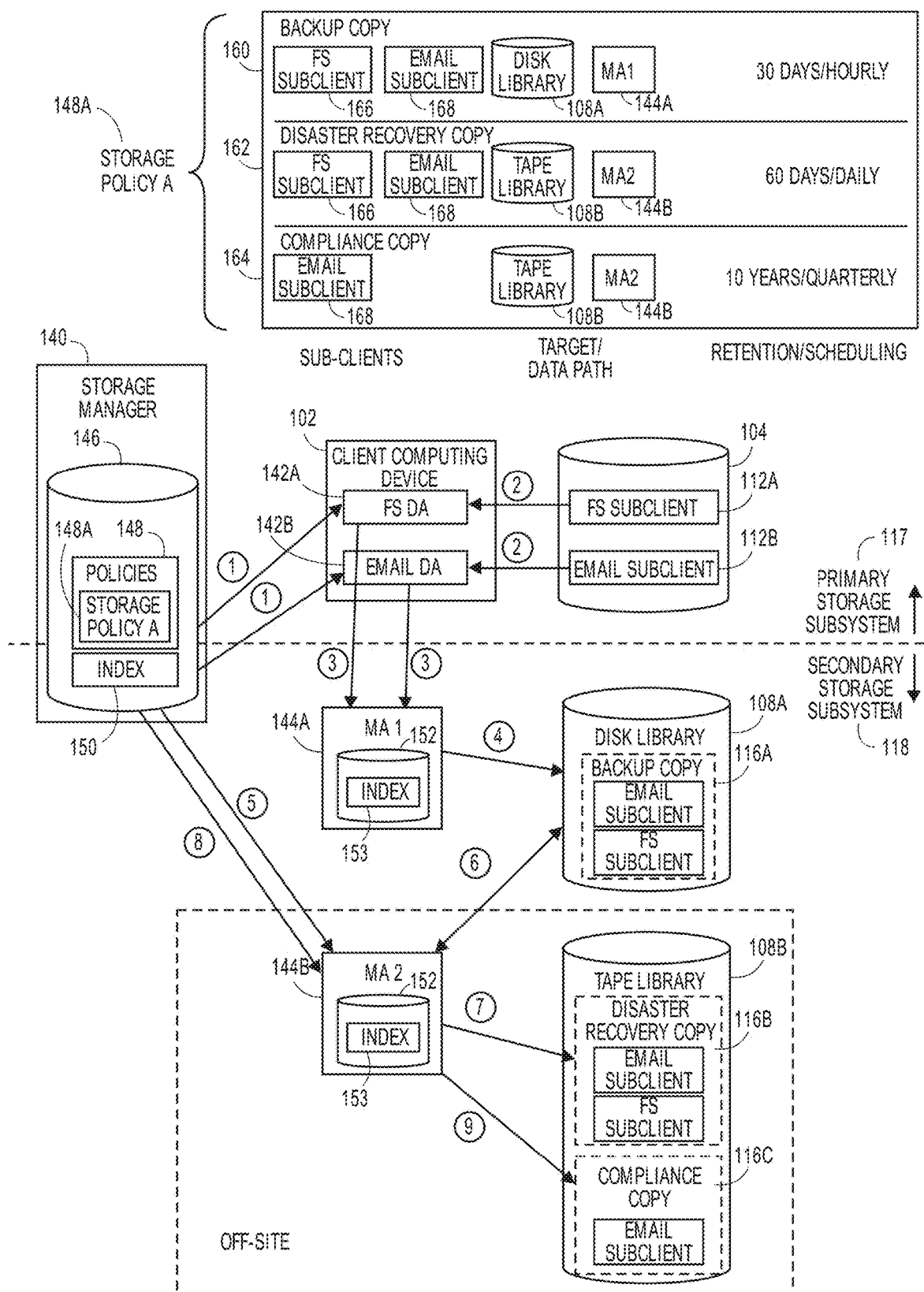
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases, a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
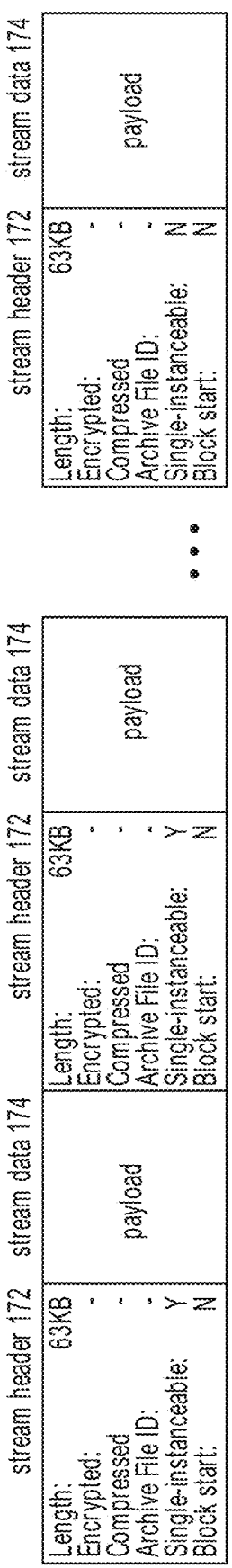
FIGS. 1F-1H are block diagrams illustrating suitable data structures that may be employed by the information management system.
Figure 1G:
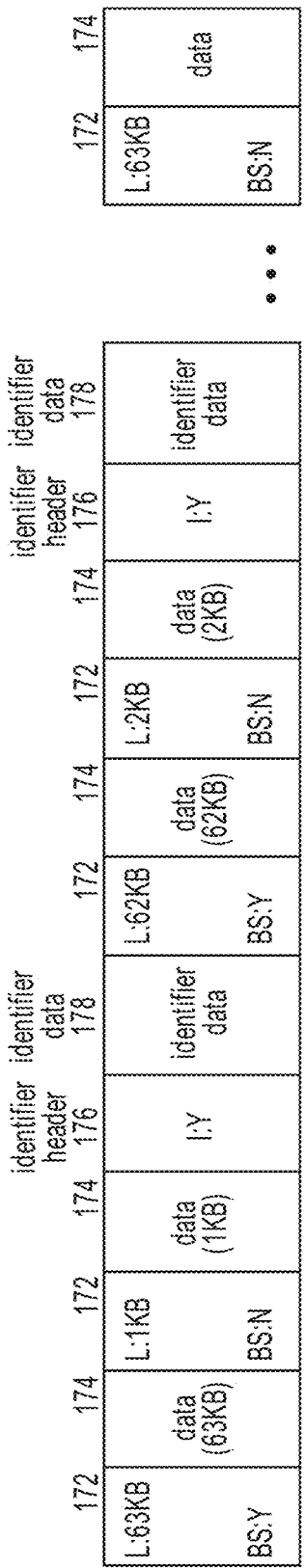

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
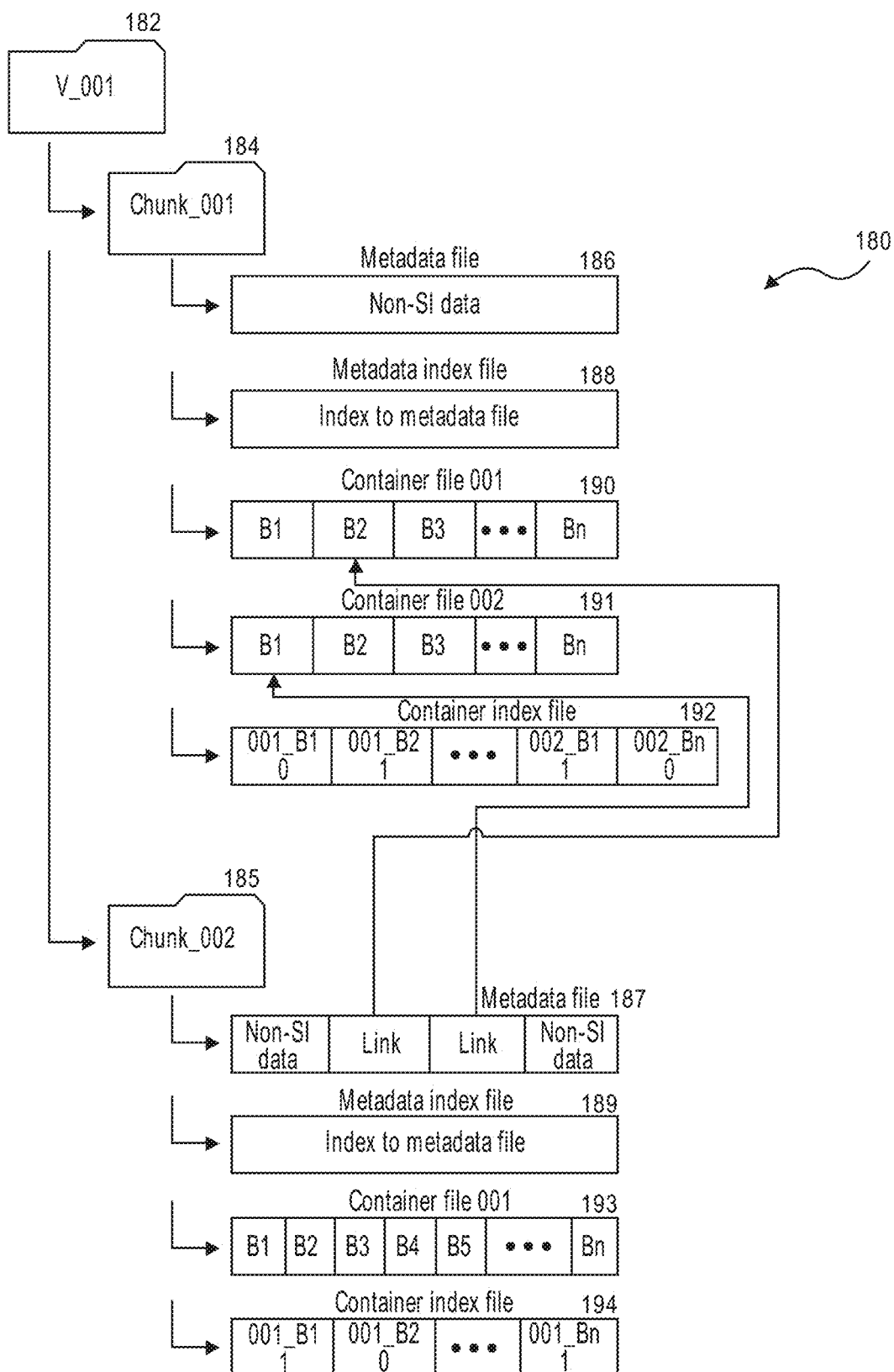

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
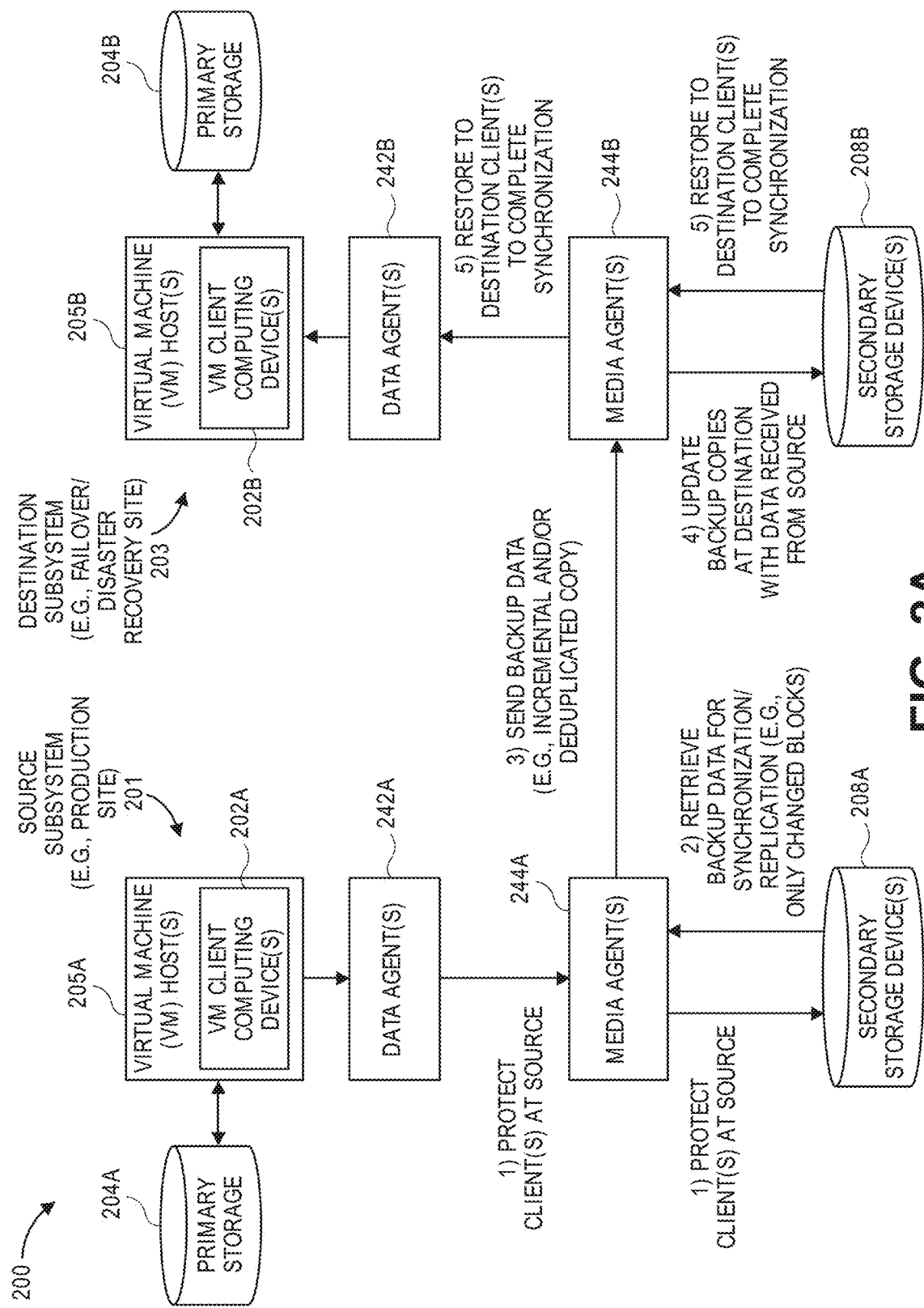
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242*a* and source media agent(s) 244*a* work together to write backup or other secondary copies of the primary data generated by the source client computing devices 202*a* into the source secondary storage device(s) 208*a*. At step 2, the backup/secondary copies are retrieved by the source media agent(s) 244*a* from secondary storage. At step 3, source media agent(s) 244*a* communicate the backup/secondary copies across a network to the destination media agent(s) 244*b* in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244*b* write the received backup/secondary copy data to the destination secondary storage device(s) 208*b*. At step 5, the synchronization is completed when the destination media agent(s) and destination data agent(s) 242*b* restore the backup/secondary copy data to the destination client computing device(s) 202*b*. The destination client computing device(s) 202*b* may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
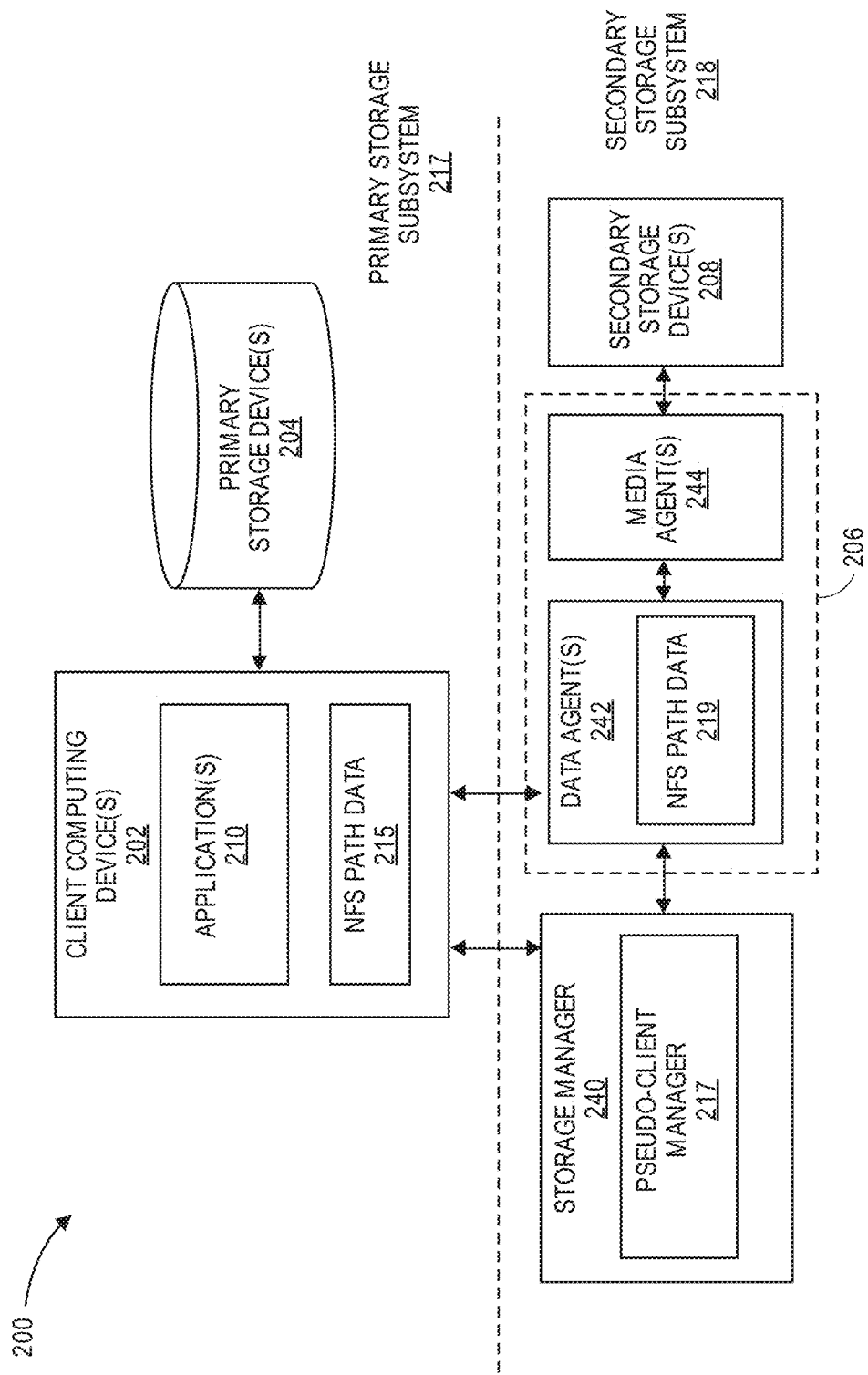
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
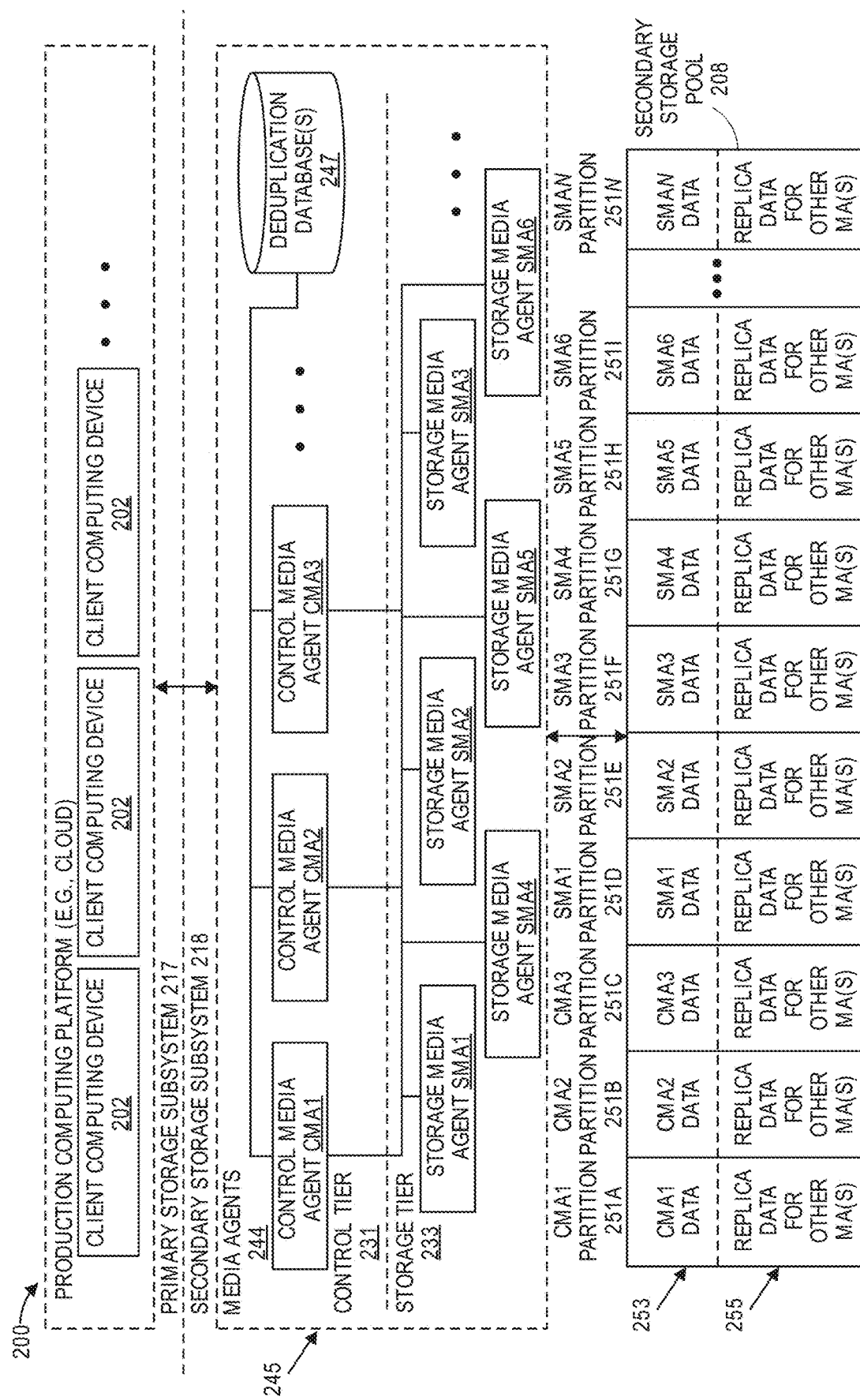
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store and be configured to receive client write and read requests from the primary storage subsystem 217 and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208 and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Live Browse Cache Management for Faster Live Browsing and File Indexing of Backup Copies, Including Block-Level Backup Copies of Virtual Machines and/or File Systems The present inventors devised an approach that speeds up file indexing and/or live browse operations for backed up block-level copies in an illustrative data storage management system. The approach enables live browse and file indexing operations to start sooner and progress faster, and thus represents a technological improvement over prior art live browse and file indexing features. the disclosed enhancements make live browse and file indexing feasible now for backup copies stored on tape. File indexing operations are used for populating the cache storage area for speedier retrieval during subsequent live browsing of the same backup copy, and vice versa. The key data blocks cached while file indexing and/or live browsing an earlier backup copy help to pre-fetch corresponding data blocks of later backup copies, thus producing a beneficial learning cycle. The approach is especially beneficial for cloud and tape backup media. File-level restore operations likewise benefit from the illustrative approach, starting sooner and progressing faster as well.

A cache storage area (the "live browse cache") is used for locally storing and serving key data blocks. In a live browse and/or file indexing and/or file-level restore operation, data blocks are preferentially served from the live browse cache rather than being retrieved from the targeted backup copy, since the former operation is speedier than the latter, especially if the backup copy resides in cloud storage (e.g., in a cloud service account) or on tape. The cache storage area is maintained for locally storing and serving key data blocks, thus relying less on retrieving data on demand from the backup copy. File indexing operations are used for populating the cache storage area for speedier retrieval during subsequent live browsing of the same backup copy, and vice versa, live browse operations are also used for populating the cache storage area for speedier retrieval during file indexing. Flagging the key data blocks while file indexing and/or live browsing an earlier backup copy helps to pre-fetch corresponding data blocks of later backup copies, thus producing a beneficial learning cycle that speeds up the subsequent operations. The approach is especially beneficial for cloud and tape backup media, and is available for a variety of data sources and backup copies, including block-level backup copies of virtual machines (VMs) and block-level backup copies of file systems, including UNIX-based and Windows-based operating systems and corresponding file systems. File-level restore operations likewise benefit from the illustrative approach.

The Live Browse feature provides the ability to discover in real-time files and folders in a backup copy that is mounted to a component of the data storage management system. User-driven live browse enables a user to traverse folders throughout the backup copy and see what files lie therein. File Indexing, which relies on using live browse to automatically traverse all files and folders in the backup copy, collects information into an index that can be searched by filename and other attributes. File-indexed information (metadata) includes source virtual machine identifier, source file system type, disk and volume identifiers, file and folder names, file types, file size, file versions, access control list attributes, etc., without limitation.

The illustrative approach includes special handling for certain data blocks that are needed for activating live browse of a backup copy. Such data blocks are sometimes referred to as metadata, though not all metadata (attributes) present in a backup copy are needed to activate live browse. To ease the reader's understanding of the present disclosure, data blocks that receive special handling according to the illustrative embodiments are referred to herein as "cacheable" or "live-browse cacheable" data blocks, to distinguish them from other data blocks that are not specially handled in regard to live browse cache management. Cacheable data blocks include data blocks that describe the file system on a block device in a data source, and hence in its backup copy, such as superblocks in Unix-based file systems, Master File Table (MFT) blocks in New Technology File System (NTFS) and other Windows-based file systems, etc. Different file systems have different nomenclatures, configurations, locations, sizes, and formats for their file-system descriptor data blocks.

The illustrative approach includes techniques for populating and using the special-purpose live browse cache, which is configured within a data storage management component that is involved in creating block-level backup copies. An exemplary such component is a media agent that acts as a portal for generating backup copies and storing and retrieving them to/from storage. Thus, the same component that participates in creation and storage of a backup copy (the media agent) is also used for live browsing and/or file indexing of the backup copy. The media agent manages live browse cache contents and serves data blocks as needed from the live browse cache, and if not found therein, the media agent retrieves data blocks from the targeted backup copy in backup media.

During live browse and file indexing operations, the live browse cache is populated with certain key data blocks—the so-called "cacheable data blocks," which are later served from the live browse cache in subsequent operations. Data blocks read during a user-driven live browse of a backup copy are added to the live browse cache, unless already present therein. Likewise, data blocks read in a file indexing operation are also added to the live browse cache, unless already present therein. Live browse/file indexing and file-level restore performance is optimized when the live browse cache was previously populated with all data blocks needed for the present operation.

During backup operations, a data agent, which is another component of the data storage management, plays a key role. In some configurations, the data agent associated with the source virtual machine and/or file system recognizes cacheable data blocks (e.g., file-system descriptor blocks) when backing up source data. The data agent flags such data blocks as cacheable data blocks to be added to the live browse cache. In such a scenario, the live browse cache is populated at least in part when the initial backup copy is created, because the data agent has the intelligence to identify cacheable data blocks. These blocks then become available from the live browse cache on the next live browse/file indexing operation that mounts the particular backup copy. In this scenario, performance benefits of using the live browse cache are realized on the next operation that follows the initial backup.

However, in some configurations, the data agent involved in the backup operation does not recognize some or all of the cacheable data blocks in the data source, and therefore cannot populate the live browse cache when creating the backup copy. In such scenarios, the subsequent live browse/file indexing operation experiences slower performance as some or all of the needed data blocks are recalled on demand from the backup copy in backup media. These recalled data blocks are captured and added to the live browse cache for future use. This feature is especially useful for live browsing block-level backup copies from certain file systems where the file-system descriptor blocks are not known or recognized by the originating data agent, e.g., EXT4 without limitation. Such scenarios in the prior art would always experience slow live browse and file indexing, or might even time out altogether, because data blocks would always be recalled from backup media. However, the illustrative approach cures this deficiency by using post-backup live browse and file indexing operations to collect cacheable data blocks and populate the live browse cache for future use, thus enabling second and later live browse operations to be faster than the first. In some embodiments, the data agent performing a backup operation queries for live browse cache contents as a guide to flagging source data blocks as cacheable in the present backup.

User-driven live browse viewing patterns are not generally predicted by the data agent and/or media agent involved in creating a backup copy. Instead, the illustrative approach captures read data blocks according to viewing patterns of each individual backup copy, so that the live browse cache can be tapped as needed in future live browse/file indexing operations. Thus, every live browse is an opportunity to add to the live browse cache and improve a subsequent round of live browse/file indexing and/or improve the precision of flagging data blocks in a subsequent backup operation. A frequency "heat map" tracks whether certain data blocks see repeated live browse access. The heat map is used for pruning the live browse cache when cache storage space reaches certain limits.

As noted, file indexing relies on an underlying live browse operation that automatically navigates all of a backup copy. Instead of user-driven on-demand live browsing, which may selectively browse only some portions of a backup copy, file indexing scans the entire directory tree through the live browse mount point. File indexing scans the entire tree of each backup copy, whether a full backup copy, an incremental backup copy, a differential backup copy, etc. Thus, file indexing invokes live browse and methodically traverses all drive letters, directories/folders, and files in the backup copy. Read requests are issued as directories and file names are traversed, and data blocks are preferentially served from the live browse cache; if not found therein, they are recalled from the backup copy in backup media. Data blocks recalled from backup media are added to the live browse cache and will be used again, thereby speeding up the performance of subsequent user-driven live browses of the same backup copy. In a file indexing operation, the media agent indexes the filenames and corresponding directories into a data structure (the "file index") associated with the block-level backup copy. The file index is stored at the media agent and is also persistently added to backup media.

The illustrative approach enhances backup operations to facilitate the use of the live browse cache. When a backup copy is created, the media agent tracks where each data block is stored within the backup copy on backup media and stores the tracking information in a data structure illustratively referred to as the "backup block index." The backup block index is associated with the backup copy and is stored to persistent backup media. The media agent retains the backup block index for future use when recalling data blocks from backup media. According to some illustrative embodiments, the backup block index additionally tracks whether each data block is live-browse cacheable, e.g., by adding a cacheable flag. Cacheable flags are added to the backup block index at backup time when the block-level backup copy and the backup block index are created. Whether a data block is classified as cacheable is determined by the data agent involved in creating the backup copy, based on one or more of: recognizing cacheable data blocks in the source data, information obtained from flags in a preceding version of the backup block index, and/or from contents of the live browse cache. Thus, past history in regard to whether data blocks are cacheable is exploited in certain future backup operations as an ongoing learning process. In some embodiments, cacheable flags in the backup block index of a preceding backup copy are used in subsequent file indexing operations to pre-fetch sequentially data blocks from the backup copy in backup media. Sequential pre-fetching improves the performance of the ongoing file indexing operation as compared to serving random reads issued by the operating system. Thus, even in cases where the live browse cache is empty, unusable, or otherwise unavailable, previously identified cacheable flags can be exploited to improve the performance of a live browse/file indexing operation. Because the backup block index is stored to persistent backup media (unlike the live browse cache), cacheable flags are available in case the live browse cache is wiped or otherwise lost, e.g., if the media agent fails.

Using and managing the live browse cache, and additionally flagging cacheable data blocks, enables live browse and file indexing operations and file-level restore operations to start sooner and progress faster. Moreover, it is now feasible to use the illustrative approach to live browse and file index block-level backup copies stored on tape. The illustrative embodiments are designed to work with any kind of source virtual machine and/or file system, so that at least the second round of live browse/file indexing operations will be faster than the first round by taking advantage of faster data recalls from the live browse cache.

An illustrative approach speeds up live browse and file indexing operations, as well as file-level restores, for block-level backup copies in a data storage management system. The approach enables live browse to start sooner and progress faster and makes live browse feasible now for backup copies stored on tape. A cache storage area (the "live browse cache") is used for locally storing and serving key data blocks, thus relying less on retrieving data from the backup copy. Data blocks are preferentially served from the live browse cache rather than being retrieved from the targeted backup copy. The approach is available for a variety of data sources and backup copies, including block-level backup copies of virtual machines (VMs) and block-level backup copies of file systems (including UNIX-based and Windows-based operating systems and corresponding file systems). File indexing relies upon an underlying live browse operation, and therefore benefits from the present enhancements to live browse. File-level restores also benefit (i.e., starting sooner and progressing faster) from retrieving information from the live browse cache rather than from backup media as much as possible.

FIG. 3A is a block diagram illustrating some salient portions of a system 300 for improving performance of live browsing, file indexing, and/or file-level restoring of a block-level backup copy of virtual machine data, according to an illustrative embodiment. FIG. 3A depicts: VM host 301 comprising hypervisor/VMM 302 and any number of virtual machines (VMs) 303 in communication with corresponding virtual machine disks 305 configured in data storage device(s) 304 and comprising primary data 112; disk/flash storage device(s) 308 comprising backup copies 116; tape storage device(s) 309 comprising backup copies 116; cloud service account 310 comprising backup copies 116; data backup and retrieval components 315; and endpoint 321 for user-driven live browse of backup copies 116.

System 300 is a data storage management system analogous to system 100 and further comprising features for live browse cache management. An exemplary data storage management system 300 is supplied by Commvault Systems Inc., of Tinton Falls, N.J., USA. System 300 illustratively comprises components 315, but not necessarily the other depicted components and/or depicted data 112 and 116.

Primary data 112 is generated by and natively accessible by a virtual machine 303. Primary data 112 for a particular VM 303 is stored in a virtual disk (e.g., VMDK file, VHD file, etc.) 305 configured in primary data storage device(s) 304. More details on primary data 112 are given elsewhere herein.

Backup copies 116 are described in further detail elsewhere herein. A block-level backup copy 116 as shown in the present figure comprises data backed up from a source virtual disk 305. Any number of successive block-level backup copies 116 taken at different points in time co-exist in system 300. Backup copies 116 as shown in the present figure are generated using block-level backup techniques and therefore are referred to as block-level backup copies. Many of the advantages described herein for live browse cache management are achieved in the context of block-level backup operations and block-level backup copies 116. More details on block-level storage operations and backup copies 116 are found elsewhere herein.

Virtual machine (VM) host 301 is a computing device (e.g., VM server) comprising one or more hardware processors and computer memory. VM hosts are well known in the art. VM host 301 runs a hypervisor or virtual machine monitor (VMM), e.g., 302, that in turn manages any number of VMs 303 hosted by VM host 301. In some embodiments, VM host 301 is not expressly accessible, as it is part of a cloud computing infrastructure underlying a cloud services account, but VMs 303 are instantiated and activated in the cloud services account.

Hypervisor or virtual machine monitor (VMM) 302 is well known in the art and manages any number of VMs 303 as well as their access to primary data 112 in respective virtual disks 305.

Virtual machines 303 are well known in the art. VMs 303 are hosted by VM host 301. Each VM 303 generates and uses primary data 112 in a corresponding virtual disk 305. In some embodiments, VMs 303 run in a cloud services account as part of a cloud computing infrastructure.

Data storage device(s) 304 are analogous to data storage device 104 and are well known in the art. One or more data storage devices 304 are configured to store primary data 112 for VMs 303. In some embodiments, data storage resources 304 are configured in a cloud services account as part of a cloud computing infrastructure.

Virtual machine disks 305 are also known as "virtual disks." VM disks are well known in the art. For example, VMDK (virtual machine disk) files describe containers for virtual machine hard disk drives used by VMs. Likewise, VHD (virtual hard disk) files. Different VM systems use different virtual machine disk formats. Thus, the terms VMDK file and VHD file are used synonymously herein with reference to VM disk 305, because of their one-to-one correspondence. For example, a VMWare VM 303 uses a VMDK file as its VM disk 305.

Data storage device(s) 308 comprise hard disk and/or flash storage technology and are considered to be relatively fast at providing random access to data stored thereon. Disk/flash storage devices 308 are well known in the art. Any number of backup copies 116 are stored thereon.

Data storage device(s) 309 comprise storage tape technology that is well known in the art. However, unlike disk and flash, tape is accessible sequentially, which is what accounts for its unacceptably slow performance characteristics (in the prior art) in regard to random-access features such as live browse. Using the illustrative live browse cache enables speedier live browse and makes it feasible to live browse block-level backup copies stored on tape 309.

Cloud service account 310 is well known in the art (e.g., Amazon Web Services, Microsoft Azure, etc.). Cloud service accounts 310 include data storage resources (cloud-based storage) rated at different rates of responsiveness. Cloud-based storage provides random access to data stored therein, but empirical experience indicates that the kind of random access needed in live browsing operations is unacceptably slow. Using the illustrative live browse cache enables speedier live browse and makes it feasible to live browse backup copies stored in cloud service accounts 310.

Data backup and retrieval components 315 comprise a number of components that are not shown in detail in the present figure for the sake of simplicity. More details are given in FIG. 4.

Endpoint 321 is a computing device well known in the art for providing a user with live browse access to block-level backup copies 116. Endpoint 321 can be a laptop, a desktop, a tablet, a web access terminal, etc., without limitation. A user is typically provided with access to system 300 and the user can choose, via a user interface presented on endpoint 321, to live browse a certain backup copy 116.

System 300 is not limited to the present depiction. In other embodiments, system 300 also comprises application host 311 and associated components as shown in FIG. 3B. Additionally or alternatively, system 300 also comprises any number of other components shown in preceding figures herein. In some embodiments, only components 315 are part of system 300, whereas the other depicted components are serviced thereby and/or are associated therewith without being part of system 300.

FIG. 3B is a block diagram illustrating some salient portions of a system 300 for improving performance of live browsing, file indexing, and/or file-level restoring of a block-level backup copy of file system data, according to an illustrative embodiment. The present figure depicts: application host 311 comprising file manager 313 and any number of applications 110 in communication with file system 314 configured in data storage device(s) 304 and comprising primary data 112; disk/flash storage device(s) 308 comprising backup copies 116; tape storage device(s) 309 comprising backup copies 116; cloud service account 310 comprising block-level backup copies 116; data backup and retrieval components 315; and endpoint 321 for user-driven live browse of block-level backup copies 116.

Applications 110 are well known in the art and are described in more detail elsewhere herein. There is no limit on how many applications 110 execute on and are hosted by application host 311.

Application host 311 is a computing device (e.g., server) comprising one or more hardware processors and computer memory. Application hosts are well known in the art.

File manager (or file browser) 313 is an application or computer program that executes on application host 311 and provides users with access to files and folders in file system 314. Microsoft Windows Explorer is an example of file manager 313, without limitation. File manager 313 is well known in the art.

File system 314 is well known in the art and organizes data stored in storage device(s) 304 and controls how data is stored thereto and retrieved therefrom. Examples of file systems include New Technology File System (NTFS), UNIX and related UNIX-based solutions. Other examples without limitation include FAT (FAT12, FAT16, FAT32), exFAT, HFS, HFS+, HPFS, APFS, UFS, ext2, ext3, ext4, XFS, btrfs, ISO 9660, Files-11, Veritas File System, VMFS, ZFS, ReiserFS and UDF (source: File System, Wikipedia, https://en.wikipedia.org/wiki/File system, accessed Aug. 19, 2019). The illustrative live browse cache management works with any and all source (primary data) file systems. As explained in more detail elsewhere herein, certain advantages accrue when the data agent associated with the source data has the ability to interpret at least part of the source file system at backup time. When the source file system is not discernible to the data agent, techniques disclosed herein help to collect information that is used in second and subsequent operations to speed up live browse and file indexing.

System 300 is not limited to the present depiction. In other embodiments, system 300 also comprises VM host 301 and associated components as shown in FIG. 3A. Additionally or alternatively, system 300 also comprises any number of other components shown in preceding figures herein.

Figure 4:
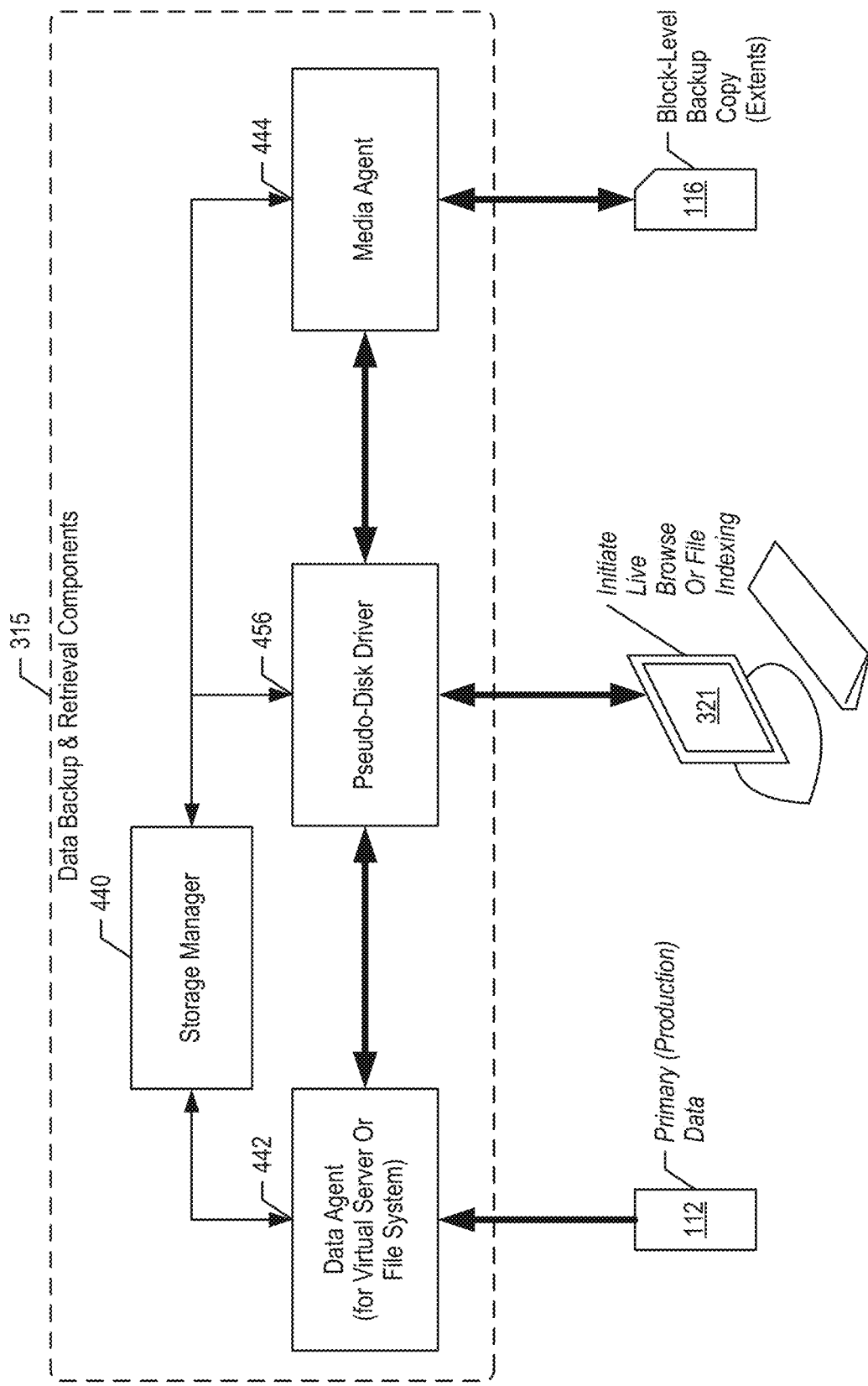
FIG. 4 is a block diagram illustrating some details of data backup and retrieval components 315 in system 300.

FIG. 4 is a block diagram illustrating some details of data backup and retrieval components 315 in system 300. FIG. 4 depicts: primary data 112, block-level backup copy 116, endpoint 321, and a number of data backup and retrieval components 315, including storage manager 440, data agent 442, media agent 444, and pseudo-disk driver 456.

Data backup and retrieval components 315 are supplied by Commvault Systems, Inc. of Tinton Falls, N.J., USA.

Storage manager 440 is analogous to storage manager 140 and additionally comprises features for operating in system 300, e.g., triggering file indexing operations, indicating to a data agent 442 that media agent 444 uses live browse cache management, etc. Storage manager 440 is illustratively embodied as executable software that executes on an underlying computing device comprising one or more hardware processors and computer memory. In some embodiments, storage manager 440 comprises a computing device comprising one or more hardware processors and computer memory.

Data agent 442 is analogous to data agent 142 and further comprises features for operating in system 300, e.g., flagging cacheable data blocks, querying media agent(s) for indications on which source data blocks are cacheable, etc. Data agent 442 is associated with and specialized for handling backups from a certain kind of data source, i.e., specialized for different kinds of primary data 112. Exemplary data agents 442 include Virtual Server Agent ("VSA"), and various file system data agents, e.g., Windows File System Agent, UNIX/Linux File System Agent, etc. In some embodiments, data agent 442 executes on the same host computing device as the data source; for example, VM host 301 also executes VSA data agent 442 running on one of the VMs 303; for example, application host 311 also executes a file system data agent 442 suitable to and compatible with file system 314. In other embodiments, data agent 442 executes on a separate computing device distinct from hosts 301/311 and from media agent 444's host; in some embodiments, data agent 442 is co-located with media agent 444 on the same host computing device.

Media agent 444 is analogous to media agent 144 and further comprises features for operating in system 300, e.g., cache management logic, enhanced backup logic that adds cacheable flags to a backup block index, enhanced retrieval logic that preferentially serves data from the live browse cache, the live browse cache, live browse cache index, and heat map. Media agent 444 comprises a computing device (not shown) that comprises one or more hardware processors and computer memory for executing computer programs, as well as cache storage technology for accommodating the live browse cache. In some embodiments, the underlying computing device also hosts a data agent 442 and/or a pseudo-disk driver 456 in addition to hosting media agent 444.

Pseudo-disk driver 456 is a driver that presents a pseudo-disk to live-browse users. Pseudo-disk driver 456 requests data blocks using read requests based on live browse actions taken by a user. Pseudo-disk driver 456 (a/k/a "CVBLK" and/or "pseudo-mount") is described in more detail in U.S. Pat. No. 9,852,026, entitled "Efficient Application Recovery based on a Pseudo-Storage-Device Driver," which is incorporated by reference herein. In some embodiments, pseudo-disk driver 456 resides and executes on the same computing device that hosts media agent 444. In other embodiments, pseudo-disk driver resides and executes on a separate computing device comprising one or more hardware processors and computer memory, which is interposed between endpoint 321 and media agent 444, and which in some embodiments is referred to as a File Recovery Enabler for Linux ("FREL"). FRELs are used when the operating system involved in generating the source primary data 112 (e.g., Linux) is different from the operating system underlying media agent 444 (e.g., Windows); in such a configuration, the FREL acts as a bridge enabling the backup copy to be mounted to the media agent host and live browsed therefrom. FRELs as described by Commvault Systems, Inc. are well known in the art.

The bold arrows in the present figure show logical data flows among the depicted components. The present figure depicts some of the key components that make possible one or more of the illustrative embodiments. The embodiments are not limited to the depicted configuration. Generally, system 300 comprises one storage manager 440 responsible for managing storage operations within system 300, and any number of data agents 442, media agents 444, and/or pseudo-disk drivers 456. VM hosts 301, application hosts 311, primary data storage 304, and backup media 308, 309, and 310 are not necessarily part of system 300, but system 300 interfaces/interoperates with any number thereof.

Figure 5:
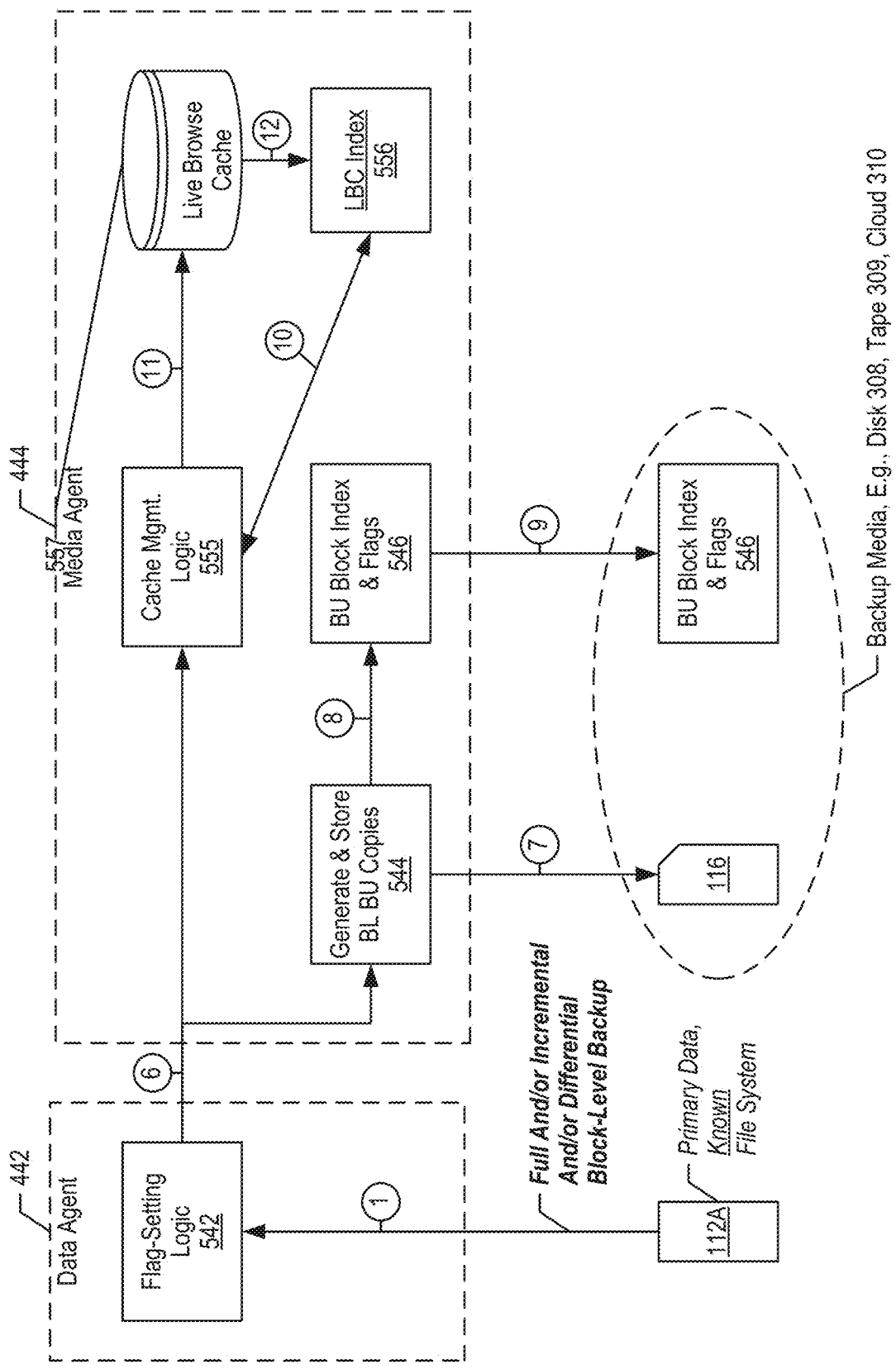
FIG. 5 is a block diagram illustrating certain operations and data flows in a block-level backup in system 300, wherein the type of source virtual machine/file system is known to the originating data agent.

FIG. 5 is a block diagram illustrating certain operations and data flows in a block-level backup in system 300, wherein the type of source virtual machine/file system is known to the originating data agent 442. In this configuration, data agent 442 recognizes certain key aspects of source file system 314 or source VM disk 305 that are relevant to live browse cache management. See also FIG. 9. FIG. 5 depicts a block-level backup operation, e.g., full, incremental, differential, etc. FIG. 5 depicts: primary data 112 (organized by a file system known to data agent 442); block-level backup copy 116 stored in backup media (e.g., 308, 309, 310) along with index 546; data agent 442 comprising flag-setting logic 542; and media agent 444 comprising logic 544, index 546, cache management logic 555, live browse cache index 556, and live browse cache 557. Logical data flows and information pathways are depicted by arrows.

Flag-setting logic 542 is a functional component of data agent 442, and is responsible at least in part for determining which data blocks in source primary data 112 are of a kind (i.e., cacheable) that should be added to live browse cache 557, e.g., file-system descriptor data blocks, without limitation. This aspect works with source file systems that are known to and understood by data agent 442. When the source file system is unknown to data agent 442, FIGS. 8A and 8B describe operations needed for live browse cache management. Flag-setting logic 542 indicates to media agent 444 which data blocks being backed up should be flagged as live-browse cacheable.

Logic 544 is a functional component of media agent 444 that is responsible at least in part for receiving data blocks from data agent 442, further processing them (e.g., compression, encryption, deduplication, formatting, etc.), generating block-level backup copies 116, and storing copies 116 to backup media (e.g., 308, 309, 310). Logic 544 is further responsible for tracking where data blocks are stored on backup media, e.g., file location, block offset, etc., and for adding this information to index 546. Logic 544 is further responsible for receiving information from data agent 442 on whether certain data blocks are live-browse cacheable and adds this information to index 546, illustratively in the form of flags associated with the cacheable data blocks. Logic 544 is further responsible for associating index 546 with backup copy 116 and for storing index 546 to backup media. In some embodiments, logic 544 parses out flagged (cacheable) data blocks received from data agent 442 and transmits them (not shown here) to cache management logic 555.

Backup block index and flags 546 (or "index 546" or "flags 546") is a data structure created and maintained by logic 544. As noted, index 546 comprises location-related information about each backed up data block and further comprises flags for live-browse cacheable data blocks. In embodiments where index 546 is a table, cacheable flag tracking is implemented as an added column in the table, though the invention is not so limited.

Cache management logic 555 is a functional component of media agent 444 that is responsible at least in part for a variety of functions relating to live browse cache 557, including receiving data blocks, parsing out data blocks that are live-browse cacheable, checking whether each data block is already in live browse cache 557 (e.g., by checking index 556), and if not, adding the data block to live browse cache 557. In some embodiments, the data blocks are pre-parsed by and received from logic 544 (not shown here). Cache management logic 555 associates each data block with a data source (e.g., a certain VM and/or data file) and/or with a particular point-in-time and backup copy 116. Cache management logic 555 is also responsible for adding to cache 557 data blocks that have changed as identified by an incremental/differential backup operation, e.g., retaining data block D from a prior backup and adding changed block D' generated by the present backup operation. Cache management logic 555 also is responsible for pruning live browse cache 557 when storage space begins to run short.

Live browse cache index ("LBC index") 556 is a data structure, illustratively maintained by logic 555, that tracks data block identifiers and their associations as stored in live browse cache 557. LBC index 556 is consulted for purposes of deduplication, i.e., to prevent the same unchanged data block from being repeatedly stored to LBC 557, and for look-up during live browse operations to find out whether a data block in a read request is stored in and can be served from live browse cache 557.

Live browse cache ("LBC") 557 is a data storage area configured on the computing device that hosts media agent 444. LBC 557 stores data blocks that are live-browse cacheable. Cache management logic 555 maintains LBC 557, e.g., adding to LBC 557, pruning LBC 557, updating LBC index 556 based on changes to LBC 557, etc.

Several numbered steps depicted in the present figure illustrate some of the data processing logic that occurs in system 300 in a block-level backup operation (e.g., full, incremental, differential), wherein the type of source virtual machine/file system is known to the originating data agent 442. Step 1 occurs in the course of a block-level backup operation involving data agent 442 and media agent 444. In some embodiments, storage manager 440 triggers the block-level backup operation by instructing data agent 442 and media agent 444 accordingly. In the present scenario, data agent 442 knows and understands the file system that governs the source primary data 112. At step 1, data agent 442 extracts a data block D (or a grouping of data blocks grouped into an "extent" E) from primary data 112. Data agent 442 (e.g., using flag-setting logic 542) determines whether data block D should be flagged as live-browse cacheable, based on determining whether it is a file-system descriptor data block (e.g., MFT, superblock, etc.). Data agent 442 flags file-system descriptor blocks as live-browse cacheable.

At step 6 (the present figure depicts no steps 2-5), data agent 442 transmits data block D to media agent 444, along with an indication of whether the data block is cacheable, if applicable. At step 6, media agent 444 delivers data block D to logic 544 and logic 555. In some embodiments, data block D is delivered to cache management logic 555 only if accompanied by a cacheable flag. In some embodiments, data block D is delivered to cache management logic 555 by logic 544 (not by data agent 442) after logic 544 determines that data block D is accompanied by a cacheable flag.

At step 7, after logic 544 processes block D for inclusion within backup copy 116 as is well known in the art, logic 544 stores block-level backup copy 116 to backup media, e.g., disk/flash 308, tape 309, and/or cloud service account 310. At step 8, logic 544 populates backup block index 546 with storage information about data block D, and adds a cacheable flag, if applicable, to mark block D in index 546. At step 9, media agent 444 (e.g., using logic 544) copies index 546 to backup media (e.g., 308, 309, and/or 310). In some embodiments, index 546 is stored to the same backup media as backup copy 116, because they are associated with each other, but the invention is not so limited.

At step 10, cache management logic 555 analyzes data block D, including checking LBC index 556 to determine whether data block D is already present in LBC 557. In some embodiments, deduplication logic in cache management logic 555 will account for data block D without storing another copy thereof in live browse cache 557. Accordingly, each data block added to LBC 557 will receive a unique signature, e.g., based on a hash function applied in a manner well known in the art. The deduplication logic will audit a candidate data block against existing signatures tracked in LBC index 556 to determine whether the candidate block is unique or duplicative, and duplicative data blocks will not be added to LBC 557. A new version of a certain data block associated with a certain data source (e.g., VM, virtual disk, file system, etc.), i.e., modified data block D', is treated as a new block, which is associated with a later backup copy 116 of the same data source as the original data block D. Data blocks received without a cacheable flag are not checked against index 556, as they are not candidates for live browse cache 557 at this stage.

At step 11, data blocks that meet criteria for being added to the live browse cache, i.e., cacheable flag, not duplicative, etc., are added to live browse cache 557 by cache management logic 555. At step 12, cache management logic 555 updates LBC index 556 to reflect the addition of data blocks to live browse cache 557.

Steps 1 and 6-12 are included here to enhance the reader's understanding of the present disclosure, but the invention is not so limited. Other embodiments implement different sequences of events and/or perform some of the depicted steps concurrently and/or include fewer or additional steps not shown here. Furthermore, data agent 442 and media agent 444 are not limited to the functionality and data structures depicted in the present figure.

Figure 6:
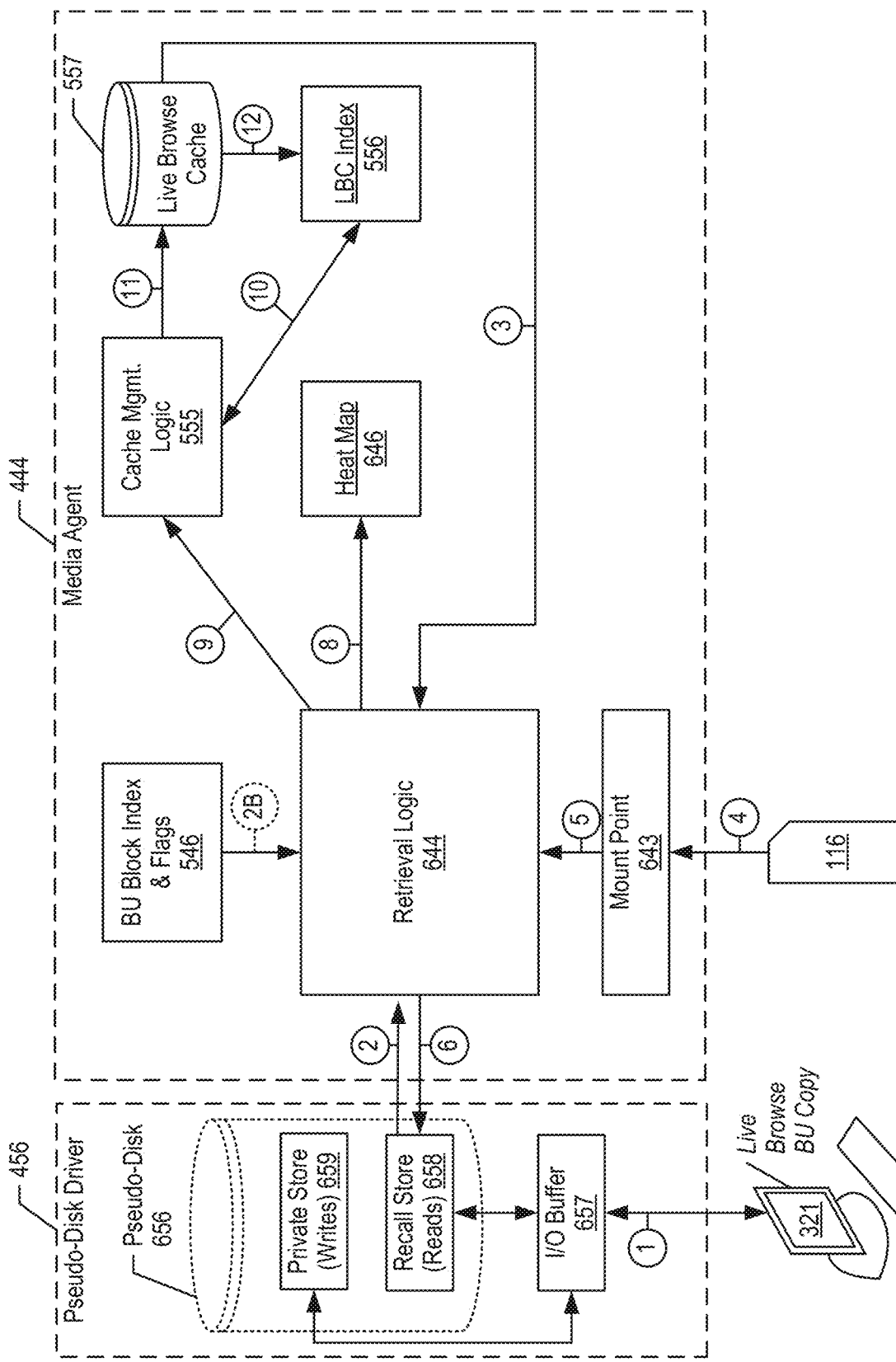
FIG. 6 is a block diagram illustrating certain operations and data flows in a user-driven live browse operation that follows the block-level backup of FIGS. 5 and/or 8A/8B.

FIG. 6 is a block diagram illustrating certain operations and data flows in a user-driven live browse operation that follows the block-level backup operations of FIGS. 5 and/or 8A/8B. The present figure depicts: block-level backup copy 116; live browse endpoint 321; media agent 444 comprising index 546, cache management logic 555, LBC index 556, LBC 557, mount point 643, retrieval logic 644, and heat map 646; and pseudo-disk driver 456 comprising pseudo-disk 656, which comprises recall store 658 and private store 659, and I/O buffer 657. Logical data flows and information pathways are depicted by arrows.

Mount point 643 is a directory/folder configured on media agent 444 to access via the media agent's file system a backup copy, such as block-level backup copy 116. Mount points and techniques for mounting a backup copy to a computing device are well known in the art.

Retrieval logic 644 is a functional component of media agent 444 and is generally responsible for mounting a targeted backup copy 116, receiving read requests from pseudo-disk driver 456 (or from other entities), determining the optimal source for recalling each data block in response to the read requests, recalling each data block from the optimal source, and serving the recalled data block in response to the read request. To determine the optimal source, logic 644 checks LBC index 556 to determine whether the data block is present in live browse cache 557; if not found there, logic 644 mounts backup copy 116 to mount point 643 (if not already mounted) and recalls the data block from backup copy 116, e.g., using index 546 to quickly locate data blocks on backup media.

Heat map 646 is a data structure illustratively maintained by retrieval logic 644 to indicate how often each recalled data block has been read, e.g., how many read requests over a certain time period. Frequently recalled data blocks will be preferentially preserved in the live browse cache longer than rarely recalled ones when live browse cache 557 is pruned.

Pseudo-disk driver 456 comprises pseudo-disk 656 and I/O buffer 657. Live browse commands from endpoint 321 are submitted via I/O buffer 657. Pseudo-disk driver 456 determines whether the command, e.g., a read request for a data block D, can be served from recall store 658 or private store 659. Write requests are written to private store 659. See also U.S. Pat. No. 9,852,026, entitled "Efficient Application Recovery based on a Pseudo-Storage-Device Driver," for more details on how an illustrative pseudo-disk operates. In the present embodiments, pseudo-disk driver 456 operates as an intermediary between live browse endpoint 321 and media agent 344, using recall store 658 to transmit read requests to media agent 444 and receive responses therefrom. In some embodiments, no pseudo-disk driver is configured and instead endpoint 321 interfaces directly with media agent 444, requesting reads and presenting results to the endpoint's user.

Several numbered steps depicted herein illustrate some of the data processing logic that occurs in system 300 during a user-driven live browse operation. Illustratively the live browse operation follows the backup operation depicted in FIG. 5 (wherein data agent 442 knows/recognizes the primary data's file system) and/or FIGS. 8A/8B (wherein data agent 442 does not know/recognize the primary data's file system). Distinctions between the scenarios of FIG. 5 versus FIGS. 8A/8B are described here and in FIGS. 9 and 10A/10B.

At step 1, a read request comes in from live browse endpoint 321. The live browse operation in this scenario is user-driven, which includes selections made by a user into a user interface, e.g., navigating down the branch of a letter drive and file folder/directory tree. At step 2, the read request is transmitted to media agent 444, e.g., from recall store 658 to retrieval logic 644. Retrieval logic 644 analyzes the read request to determine the identity of data block D being requested. Retrieval logic 644 consults LBC index 556 to determine whether data block D is in the live browse cache 557, and if so, at step 3, retrieval logic 644 retrieves data block D from LBC 557. If data block D is not in LBC 557, retrieval logic 644 mounts backup copy 116 at step 4 (if not already mounted) and retrieves data block D from backup copy 116 at step 5, e.g., using index 546 to locate the data blocks in backup media. At step 6, the requested data block D is in the possession of retrieval logic 644, which serves data block D in response to the read request that originated with live browse endpoint 321.

In some embodiments, before the user has an opportunity to generate any read requests, retrieval logic 644 pre-fetches flagged data blocks to speed up the user's live browse experience. For example, on receiving notice that a live browse of a certain backup copy 116 has been initiated by a user at endpoint 321, retrieval logic 644 consults index 546 (step 2B) to identify all data blocks in backup copy 116 that were flagged as live-browse cacheable in the preceding backup operation (see, e.g., FIGS. 5 and 8B). Equipped with this information, retrieval logic 644 preferentially retrieves the identified data blocks from LBC 557 and if not found there, retrieves them from block-level backup copy 116 as described in the preceding paragraph. Additionally, retrieval logic 644 conducts the retrieval from backup copy 116 by defining a sequential order for the data blocks to be retrieved and retrieving them according to the sequential order, which minimizes delays in accessing backup media, especially cloud-based storage and tape. Retrieval logic 644 transmits retrieved data blocks to recall store 658 and issues a release command to endpoint 321 to permit the intake of user commands. Because the recall store 658 is pre-populated with many, if not all, data blocks needed to begin the live browse operation, the user experiences in some embodiments an "instant on" live browse operation. From this point onward, the live browse proceeds as described in the preceding paragraph, with each user-driven read request being analyzed and served on demand.

The present figure does not include step 7. At step 8, retrieval logic 644 populates one or more entries in heat map 646 to indicate which data block D was retrieved in the present read request. Heat map 646 is also populated during the pre-fetch operations described in the preceding paragraph. Thus, heat map 646 reflects each retrieval of each data block, whether the data block was retrieved from LBC 557 or from block-level backup copy 116. At step 9, retrieval logic 644 transmits data block D to cache management logic 555 for analysis. As described in FIG. 5 in regard to steps 10, 11, and 12, data block D is added to LBC 557 if not already therein and LBC index 556 is updated accordingly.

Steps 1-6 and 8-12 are included here to enhance the reader's understanding of the present disclosure, but the invention is not so limited. Other embodiments implement different sequences of events and/or perform some of the depicted steps concurrently. Furthermore, pseudo-disk driver 456 and media agent 444 are not limited to the functionality and data structures depicted in the present figure.

Figure 7:
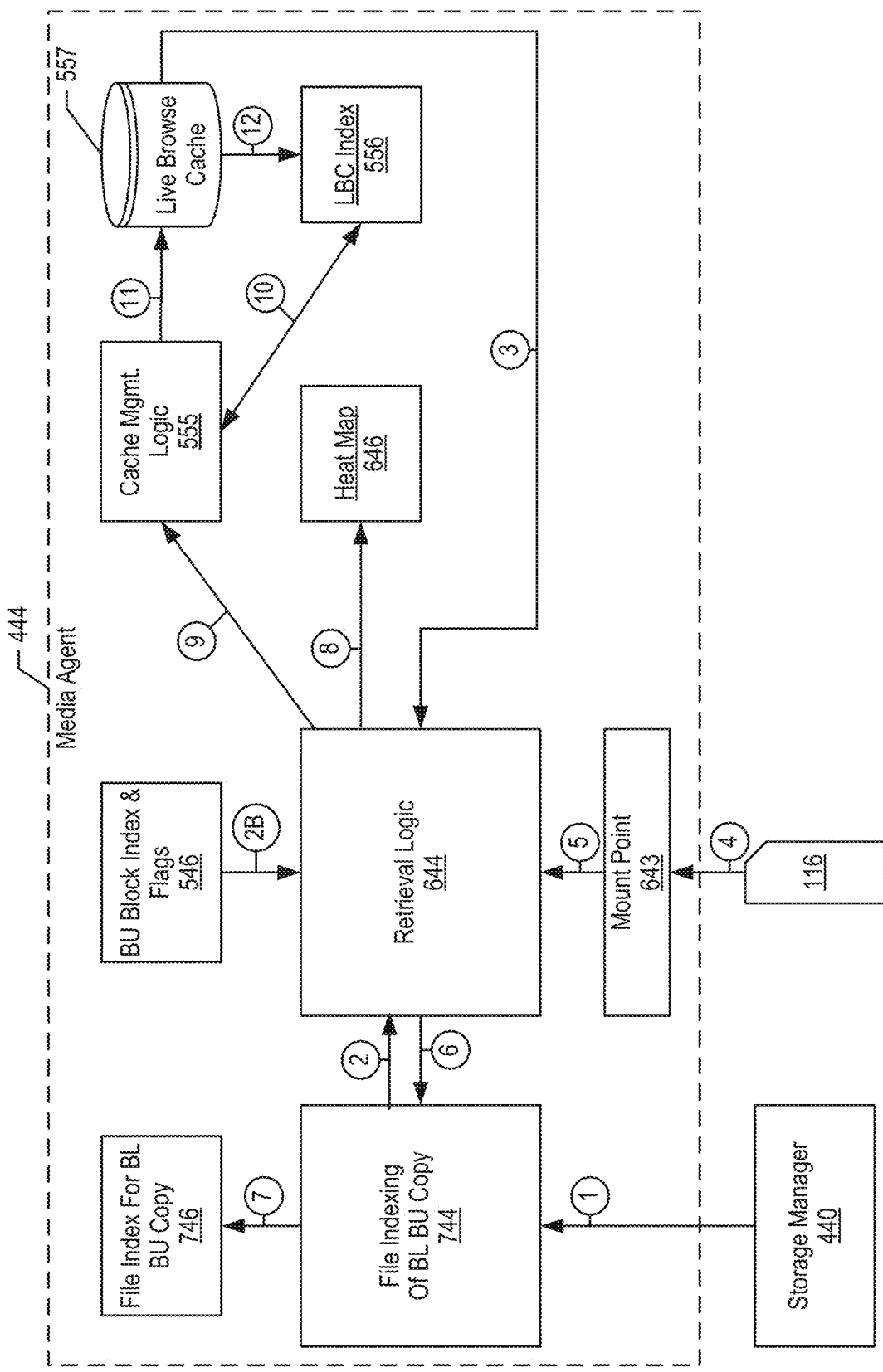
FIG. 7 is a block diagram illustrating certain operations and data flows in a file indexing operation that follows the block-level backup of FIGS. 5 and/or 8A/8B.

FIG. 7 is a block diagram illustrating certain operations and data flows in a file indexing operation that follows the block-level backup of FIGS. 5 and/or 8A/8B. The present figure depicts: block-level backup copy 116; storage manager 440; media agent 444 comprising index 546, cache management logic 555, LBC index 556, LBC 557, mount point 643, retrieval logic 644, heat map 646, file indexing logic 744, and file index 746. Logical data flows and information pathways are depicted by arrows.

File indexing logic 744 is a functional component of media agent 444, which is responsible for discovering all data files backed up within backup copy 116 and creating an index (e.g., 746) that tracks where each file can be found therein, e.g., filename, copy 116 identifier, copy 116 location on storage media, file offset, etc. Notably, the block-level backup operation that created backup copy 116 did not capture file identities, because it was not a file-level operation, hence the need for the present file indexing operation. File indexing logic 744 initiates a live browse operation and traverses the directory tree to discover all files backed up within each block-level backup copy 116. Thus, file indexing logic 744 scans the entire directory tree in backup copy 116 through the live browse mount point 643. File indexing logic 744 generates an association between file index 746 and block-level backup copy 116.

File index 746 is a data structure created by a file indexing operation and is illustratively populated by media agent 444, e.g., using file indexing logic 744. In some embodiments, media agent 444 copies file index 746 to storage media (not shown here).

Figure 8A:
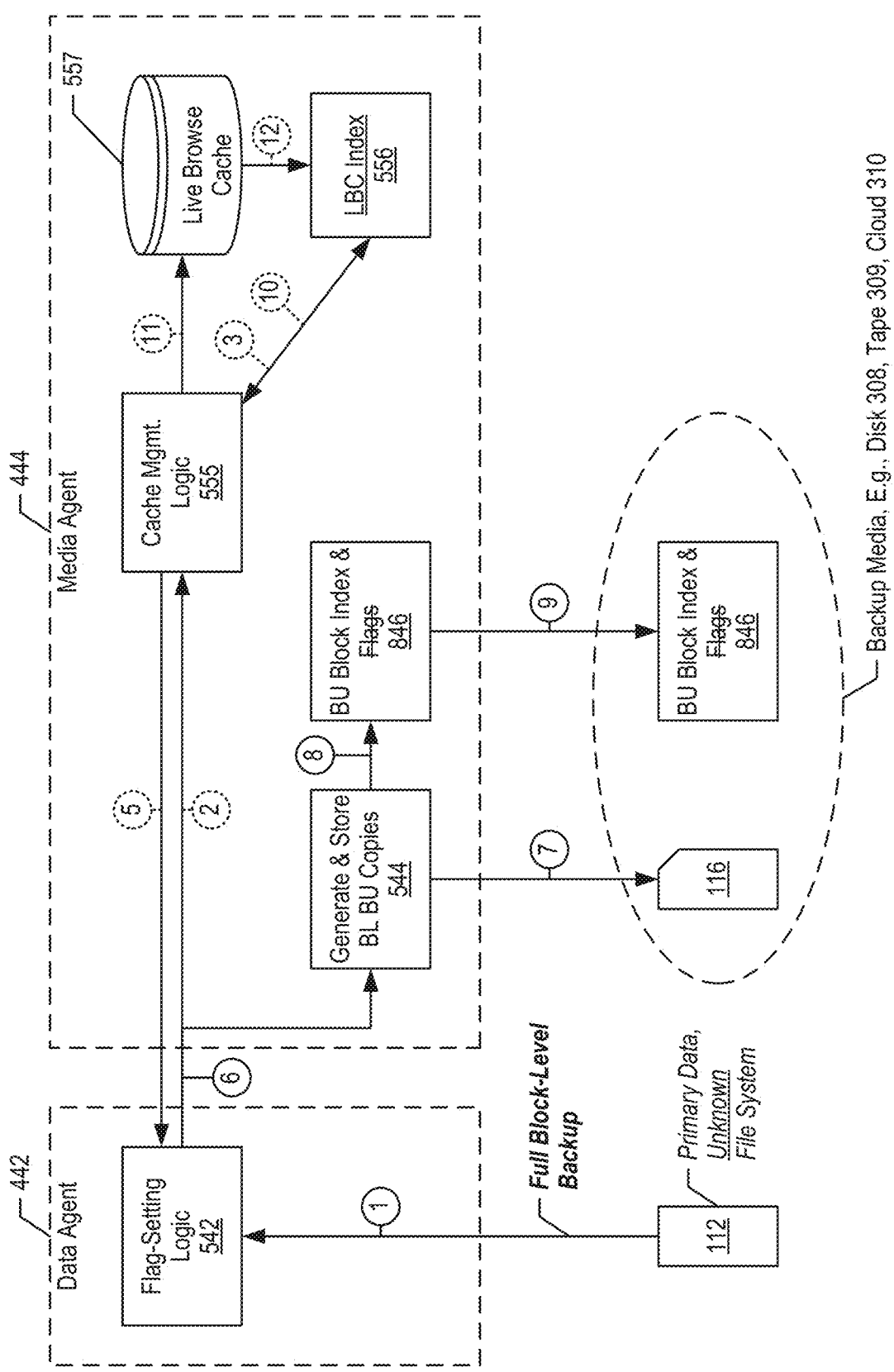
FIG. 8A is a block diagram illustrating certain operations and data flows in a block-level backup (Full Backup) in system 300, wherein the type of source virtual machine/file system is unknown to the originating data agent.

Several numbered steps depicted herein illustrate some of the data processing logic that occurs in a file indexing operation in system 300. In some embodiments, file indexing immediately follows the completion of a block-level backup operation as depicted in FIGS. 5 and 8A/8B, but the invention is not so limited, and a substantial time lag can elapse between backup completion and file indexing. During that time gap, any number of user-driven live browse operations can occur, without limitation (see, e.g., FIG. 6). In short, file indexing and user-driven live browsing are mutually independent operations and neither depends upon the other.

At step 1, storage manager 440 initiates a file indexing operation for a targeted block-level backup copy 116, e.g., sending instructions to media agent 444, which invokes file indexing logic 744. File indexing logic 744 in turn invokes an internal live browse operation that will traverse the entire tree within the targeted backup copy 116, e.g., identifying drive letters, folders/directories, and individual files. At step 2, file indexing logic 744 transmits to retrieval logic 644 an indication that an internal live browse has been started, followed by a sequence of read requests that are analogous to read requests invoked by a user-driven live browse. As described in more detail in FIG. 6, at steps 3-6 retrieval logic 644 pre-fetches data blocks preferentially from LBC 557 and sequentially from backup copy 116 and transmits results to file indexing logic 744, followed by on-demand retrieval as the read requests come in from file indexing logic 744 (step 2). Step 2B provides retrieval logic 644 with information about the location on backup media of backed up data blocks; relevant file location information is passed to file indexing logic 744 at step 6 for adding to file index 746.

At step 7, file indexing logic 744 processes the received data blocks and location information and populates file index 746 accordingly.

Steps 8-12 are analogous to steps 8-12 in FIG. 6, i.e., populating heat map 646, adding data blocks to LBC 557, and updating LBC index 556.

Steps 1-12 are included here to enhance the reader's understanding of the present disclosure, but the invention is not so limited. Other embodiments implement different sequences of events and/or perform some of the depicted steps concurrently. Furthermore, storage manager 440 and media agent 444 are not limited to the functionality and data structures depicted in the present figure.

Figure 8B:
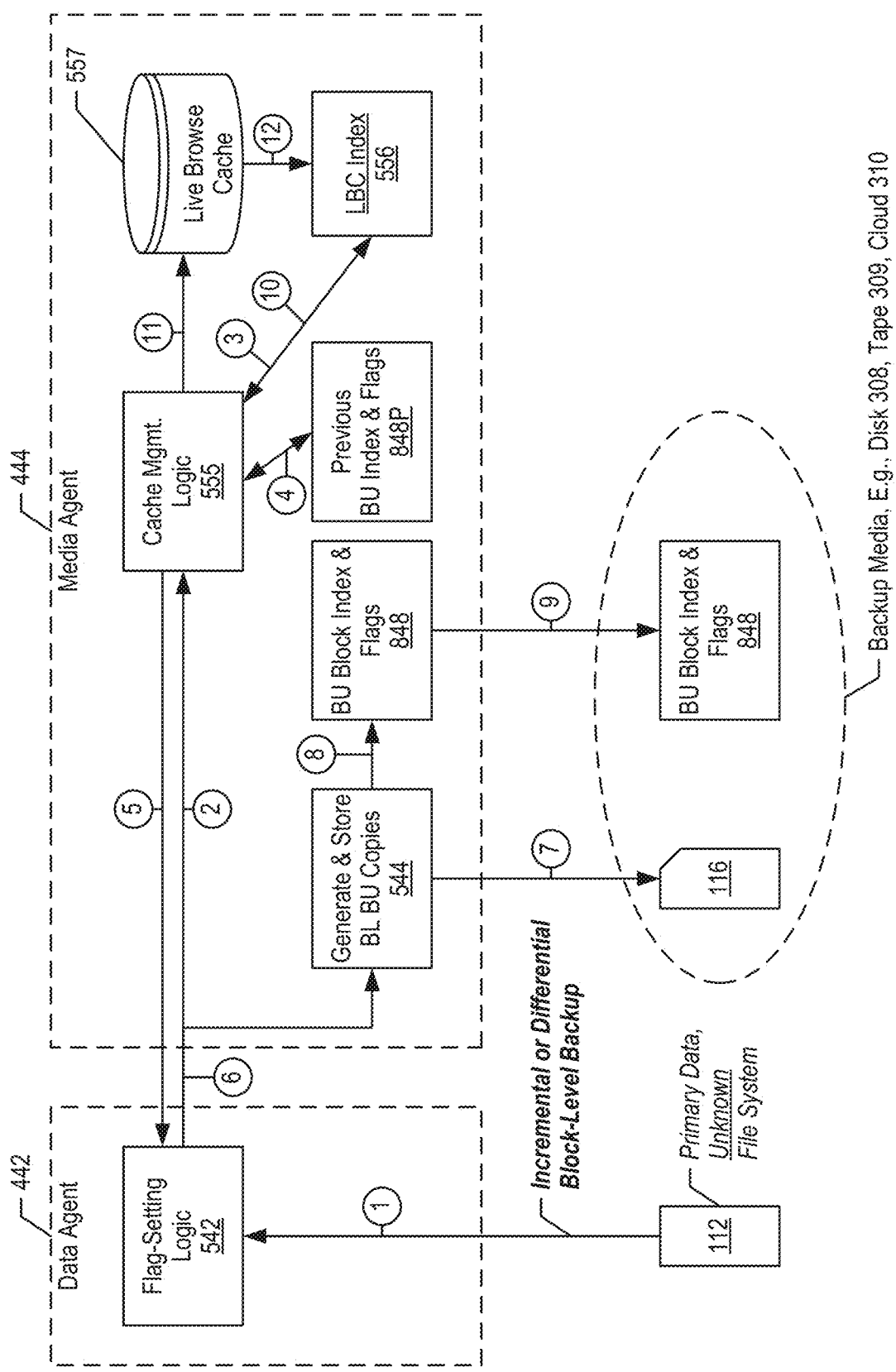
FIG. 8B is a block diagram illustrating certain operations and data flows in a block-level backup (Incremental or Differential Backup) in system 300, wherein the type of source virtual machine/file system is unknown to the originating data agent.

FIG. 8A is a block diagram illustrating certain operations and data flows in a block-level backup (Full Backup) in system 300, wherein the type of source virtual machine/file system is unknown to the originating data agent 442. In contrast to FIG. 5, where originating data agent 442 has an understanding of and an ability to interpret the file system that governs primary data 112 being backed up, no such capability exists in the present scenario. In other words, data agent 442 is aware of the primary data 112 it needs to back up, but lacks the ability to interpret the primary data to determine which data blocks are candidates for live browse caching, e.g., file-system descriptor blocks. In the present figure, when a full block-level backup is triggered, data agent 442 illustratively lacks most or even all interpretive information about the data blocks it is backing up from primary data 112. As a result, relatively little information is collected in this full backup operation as it relates to live browse, as illustrated by several skipped or null steps depicted here with dotted outlines, e.g., 2, 3, 5, 10, 11, and 12. However, subsequent user-driven live browse (FIG. 6) and file indexing (FIG. 7) of block-level backup copy 116 created in the present full backup will populate live browse cache 557 and enable these additional steps in a subsequent incremental or differential backup of the same source primary data 112, as shown in FIG. 8B. See also FIG. 10A/10B.

FIG. 8A depicts: primary data 112 undergoing a full block-level backup; block-level backup copy 116 and backup block index 846 (minus LBC-flags) on backup media 308/309/310; data agent 442 comprising flag-setting logic 542; and media agent 444 comprising logic 544, cache management logic 555, LBC index 556, LBC 557, backup block index 846 (minus LBC-flags). Logical data flows and information pathways are depicted by arrows.

Backup block index 846 is analogous to index 546 described in an earlier figure herein, but lacks the cacheable flags associated with backed up data blocks. The reason for the lacking flags is that data agent 442 lacks the capacity to identify cacheable data blocks in the source primary data 112 (contrast to FIG. 5). Furthermore, no historical information from previously cached blocks in LBC 557 can be exploited here (e.g., by consulting LBC index 556), because a full backup operation backs up data "from scratch" without reference to earlier backups. Thus, without being able to refer to live browse cache contents and without knowing the kinds of data blocks it is backing up in the full backup, data agent 442 lacks the ability to flag data blocks for cacheability and thus no cacheable flags are populated into backup block index 846. Logic 544 copies backup block index 846 to backup media, e.g., 308, 309, 310. Logic 544 associates index 846 with block-level backup copy 116 created in the full backup operation.

Several numbered steps depicted in the present figure illustrate some of the data processing logic that occurs in system 300 in a full block-level backup operation wherein the type of source virtual machine/file system is unknown to the originating data agent 442. Steps 1, 6, 7, 8, and 9 are described in further detail, whereas steps 2, 3, 5, 10, 11, and 12 are skipped here or are null (i.e., no data is actually exchanged).

Step 1 occurs in the course of a full block-level backup operation involving data agent 442 and media agent 444. In some embodiments, storage manager 440 triggers the backup operation by instructing data agent 442 and media agent 444 accordingly. At step 1, data agent 442 extracts a data block D (or a grouping of data blocks grouped into an "extent" E) from primary data 112. Data agent 442 comprises flag-setting logic 542, which cannot determine whether data block D should be flagged as live-browse cacheable, e.g., based on determining whether it is a file-system descriptor data block such as MFT, superblock, etc.

Steps 2, 3, and 5 (which are described in more detail in FIG. 8B) are skipped or result in no additional information being returned to data agent 442. At step 6, media agent 444 delivers data block D to logic 544. In some embodiments, data block D is delivered to cache management logic 555 only if accompanied by a cacheable flag, and since no flag is available here, no such data blocks are delivered to logic 555. In some embodiments, data block D is delivered to cache management logic 555 by logic 544 (not by data agent 442) after logic 544 determines that data block D is accompanied by a cacheable flag. Again, since no flag is available here, no such data blocks are delivered to logic 555.

At step 7, after logic 544 processes block D for inclusion within backup copy 116 as is well known in the art, logic 544 stores block-level backup copy 116 to backup media, e.g., disk/flash 308, tape 309, and/or cloud service account 310. At step 8, logic 544 populates backup block index 846 with storage information about data block D, but no associated cacheable flags. At step 9, media agent 444 (e.g., using logic 544) copies index 546 to backup media (e.g., 308, 309, and/or 310). In some embodiments, index 546 is stored to the same backup media as backup copy 116, because they are associated with each other, but the invention is not so limited.

Any data blocks that reach cache management logic 555 (e.g., using step 2) are analyzed by logic 555 for whether they are flagged, and discarded if unflagged, thus never reaching steps 10, 11, and 12. As in FIG. 5, data blocks received without a cacheable flag are not checked against index 556, as they are not candidates for the live browse cache at this stage.

Steps 1, 6, 7, 8, and 9 are included here to enhance the reader's understanding of the present disclosure, but the invention is not so limited. Other embodiments implement different sequences of events and/or perform some of the depicted steps concurrently and/or include fewer or additional steps not shown here. Furthermore, data agent 442 and media agent 444 are not limited to the functionality and data structures depicted in the present figure.

FIG. 8B is a block diagram illustrating certain operations and data flows in a block-level backup (Incremental or Differential Backup) in system 300, wherein the type of source virtual machine/file system is unknown to the originating data agent 442.

In contrast to FIG. 5, where originating data agent 442 has an understanding of and the ability to interpret the file system that governs primary data 112 being backed up, no such capability exists in the present scenario. In other words, as in FIG. 8A, data agent 442 is aware of the primary data 112 it needs to back up, but lacks the ability to interpret the primary data to determine which data blocks are candidates for live browse caching, e.g., file-system descriptor blocks. In the present figure, when an incremental or differential block-level backup is triggered, data agent 442 has the capacity to track changed data blocks as against a preceding full backup of the same source primary data 112 (see FIG. 8A), but data agent 442 lacks most or even all interpretive information about the data blocks it is backing up from primary data 112. User-driven live browse (FIG. 6) and file indexing (FIG. 7) of block-level backup copy 116 created in a preceding full backup (FIG. 8A) will populate live browse cache 557 and enable the present incremental or differential backup of the same source primary data 112 to benefit from the live browse cache enhancements herein. See also FIG. 10A/10B.

As a result, some of the null/skipped steps in FIG. 8A are enabled here by one or more intervening live browse and/or file indexing operations applied to the full backup copy created in FIG. 8A, i.e., in a preceding backup operation. Thus, every live browse and/or file indexing applied to a backup copy, whether full, incremental, or differential, is an opportunity to populate the live browse cache and/or generate cacheable flags that can be used by a later incremental or differential backup operation.

FIG. 8B depicts: primary data 112 undergoing a differential and/or incremental block-level backup; block-level backup copy 116 and backup block index 848 (including cacheable flags) on backup media 308/309/310; data agent 442 comprising flag-setting logic 542; and media agent 444 comprising logic 544, cache management logic 555, LBC index 556, LBC 557, backup block index 848 (including cacheable flags), and backup block index 848P (including cacheable flags) created in a previous block-level backup operation. Logical data flows and information pathways are depicted by arrows.

Backup block index 848P is analogous to backup block index 848, but is associated with an earlier backup copy 116 that was created in a previous block-level backup operation, e.g., incremental, differential, which included adding cacheable flags to the backup block index.

Several numbered steps depicted in the present figure illustrate some of the data processing logic that occurs in system 300 in an incremental or differential block-level backup operation wherein the type of source virtual machine/file system is unknown to the originating data agent 442.

Step 1 occurs in the course of an incremental or a differential block-level backup operation involving data agent 442 and media agent 444. In some embodiments, storage manager 440 triggers the backup operation by instructing data agent 442 and media agent 444 accordingly. At step 1, data agent 442 extracts a data block D (or a grouping of data blocks grouped into an "extent" E) from primary data 112. In an incremental backup, data agent 442 extracts certain data blocks D' that it determines have changed as compared to an immediately preceding backup operation (e.g., full, incremental). In a differential backup, data agent 442 extracts certain data blocks D' that changed as compared to the most recent full backup operation. Thus, by definition, both incremental and differential backup operations follow a preceding backup. To the extent that one or more live browse/file indexing operations intervened between the preceding backup and the present incremental/differential, the present backup operation will benefit from data blocks present in live browse cache 557, even though data agent 442 lacks the ability to recognize cacheable flags in the source primary data 112.

Data agent 442 comprises flag-setting logic 542, but it cannot determine whether changed data block D' should be flagged as live-browse cacheable, e.g., based on determining whether it is a file-system descriptor data block such as MFT, superblock, etc. To overcome this deficiency, at step 2 data agent 442 (e.g., using flag-setting logic 542) queries media agent 444 (e.g., cache management logic 555) for a list of data blocks present in live browse cache 557—data blocks that were previously backed up from the same primary data source 112, e.g., VM and/or file system. At step 3, cache management logic 555 obtains this information from LBC index 556, and/or at step 4 checks for cacheable flags in backup block index 848P created for the preceding backup copy 116. Cache management logic 555 formulates a response to data agent 442 that identifies a union of all data blocks identifiers previously cached and/or flagged and associated with the present primary data 112. At step 5, cache management logic 555 transmits the response to data agent 442. Data agent 442 (e.g., using flag-setting logic 542) flags any extracted data blocks D' based on the response received from media agent 444. Thus, if a certain changed data block D' has a corresponding data block D in live browse cache 557 and/or flagged in index 848P, then data agent 442 flags data block D' as cacheable to the live browse cache.

Steps 6-12 are analogous to their counterparts in FIG. 5. Thus, at step 6, media agent 444 delivers data block D' to logic 544. In some embodiments, data block D' is delivered to cache management logic 555 only if accompanied by a cacheable flag. In some embodiments, data block D' is delivered to cache management logic 555 by logic 544 (not by data agent 442) after logic 544 determines that data block D' is accompanied by a cacheable flag. At step 7, after logic 544 processes block D' for inclusion within backup copy 116 as is well known in the art, logic 544 stores block-level backup copy 116 to backup media, e.g., disk/flash 308, tape 309, and/or cloud service account 310. At step 8, logic 544 populates backup block index 848 for the present backup copy 116 with storage information about data block D' and also adds cacheable flags received from data agent 442 at step 6. At step 9, media agent 444 (e.g., using logic 544) copies index 848 to backup media (e.g., 308, 309, and/or 310). In some embodiments, index 848 is stored to the same backup media as backup copy 116, because they are associated with each other. Any data blocks that reach cache management logic 555 (e.g., using step 6) are analyzed by logic 555 for whether they are flagged, and they are discarded if unflagged. As in FIG. 5, data blocks D' received without a cacheable flag are not checked against index 556, as they are not candidates for the live browse cache at this stage. As described in FIG. 5 in regard to steps 10, 11, and 12, data block D' is added to LBC 557 if not already therein and LBC index 556 is updated accordingly.

Steps 1-12 are included here to enhance the reader's understanding of the present disclosure, but the invention is not so limited. Other embodiments implement different sequences of events and/or perform some of the depicted steps concurrently and/or include fewer or additional steps not shown here. Furthermore, data agent 442 and media agent 444 are not limited to the functionality and data structures depicted in the present figure.

Figure 9:
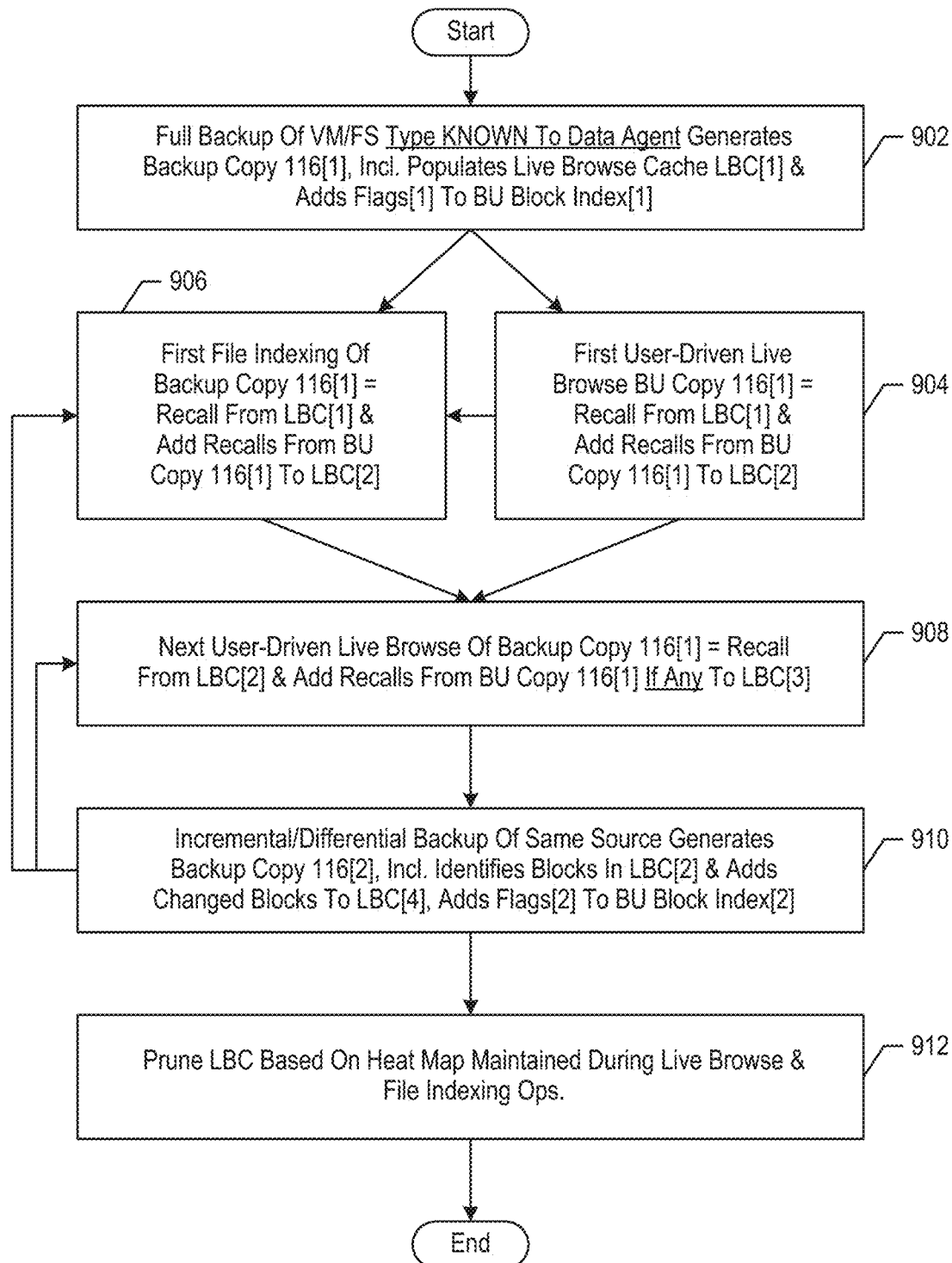
FIG. 9 depicts some salient operations of a method 900 according to an illustrative embodiment based on FIGS. 5-7.

FIG. 9 depicts some salient operations of a method 900 according to an illustrative embodiment based on FIGS. 5-7, in a scenario wherein the type of source virtual machine/file system that comprises primary data 112 is known to the originating data agent 442. In this configuration, data agent 442 recognizes certain key aspects of source file system 314 or source VM disk 305 that are relevant to live browse cache management. Method 900 is performed by one or more components of system 300, such as data backup and retrieval components 315, e.g., storage manager 440, data agent 442, media agent 444, and/or pseudo-disk driver 456. Additional details are given in FIGS. 5-7. In the present figure, as well as in FIGS. 10A and 10B, notations in square brackets [x] indicate different versions of an element as the illustrative method progresses, e.g., a first version of live browse cache is referred to as LBC[1], and a later version is referred to as LBC[2], etc.

At block 902, method 900 executes a full block-level backup operation of source primary data 112 of a type that is known to originating data agent 442. As shown in FIG. 5, this results in a first block-level backup copy 116[1], and includes populating certain data blocks to live browse cache 557, expressed here as LBC[1], and further includes adding cacheable flags to backup block index 546, expressed here as Flags[1]. Block 902 is followed by a first user-driven live browse operation at block 904 or a first file indexing operation at block 906.

At block 904, method 900 performs a first user-driven live browse of backup copy 116[1], as described in FIG. 6. This operation includes recalling data blocks from LBC[1], i.e., the version of live browse cache 557 created during the full backup at block 902. Data blocks not found in LBC[1] are recalled from backup copy 116[1] in backup media and these blocks are added to live browse cache 557, resulting in LBC[2]. Control passes to block 908 for another user-driven live browse, or to block 906 for a file indexing operation.

At block 906, method 900 performs a file indexing operation of backup copy 116[1], as described in FIG. 7. This operation includes recalling data blocks from live browse cache LBC[1], i.e., the version of live browse cache 557 created during the full backup at block 902. Data blocks not found in LBC[1] are recalled from backup copy 116[1] in backup media and these blocks are added to live browse cache 557, resulting in LBC[2]. If block 906 follows block 904, some data blocks are recalled from LBC[2], which was updated at block 904.

At block 908, method 900 performs a user-driven live browse of backup copy 116[1] that follows an earlier user-driven live browse at block 904 or a file indexing operation at block 906. In other words, block 908 continues to tap the current live browse cache 557, e.g., LBC[2], and adds additional data blocks recalled from backup copy 116[1] to form LBC[3].

At block 910, method 900 performs an incremental or a differential backup operation of the same source primary data 112 that was fully backed up at block 902. Backup copy 116[2] is generated here and stored to backup media as shown in FIG. 5. The originating data agent 442 identifies changed data blocks in primary data 112 that are to be backed up to the incremental/differential backup copy 116[2]. Changed data blocks that are flagged as cacheable are added to live browse cache 557, resulting in LBC[4]. Backup block index 546 is generated for the present backup copy 116[2], and includes cacheable flags, e.g., Flags[2]. Control passes to block 906 for file indexing of backup copy 116[2]. Control passes to block 908 for user-driven live browsing of backup copy 116[2].

At block 912, method 900 (e.g., cache management logic 555) prunes live browse cache 557, based on information in heat map 646. Accordingly, when certain storage thresholds are reached/exceeded by the amount of data stored in live browse cache 557, cache management logic 555 takes action to prune data blocks from LBC 557 to make room for further additions to the live browse cache. Illustratively, thresholds are set in cache management logic 555. For example, when live browse cache 557 reaches a pruning threshold (e.g., 75%) of maximum allowed storage space, pruning is invoked. Cache management logic 555 reviews use frequencies in heat map 646 and selects least-used data blocks to delete from LBC 557. A sufficient number of least-used data blocks are deleted from LBC 557 to bring the storage metric below the pruning threshold. In some embodiments, pruning is invoked based on elapsed time, e.g., weekly. In some embodiments, least-used data blocks that were more recently recalled than other similarly least-used data blocks are retained by the pruning logic, on the possibility that they are more likely to be recalled again soon. These figures and implementation choices are given here as examples, and the invention is not limited thereby.

Figure 10A:
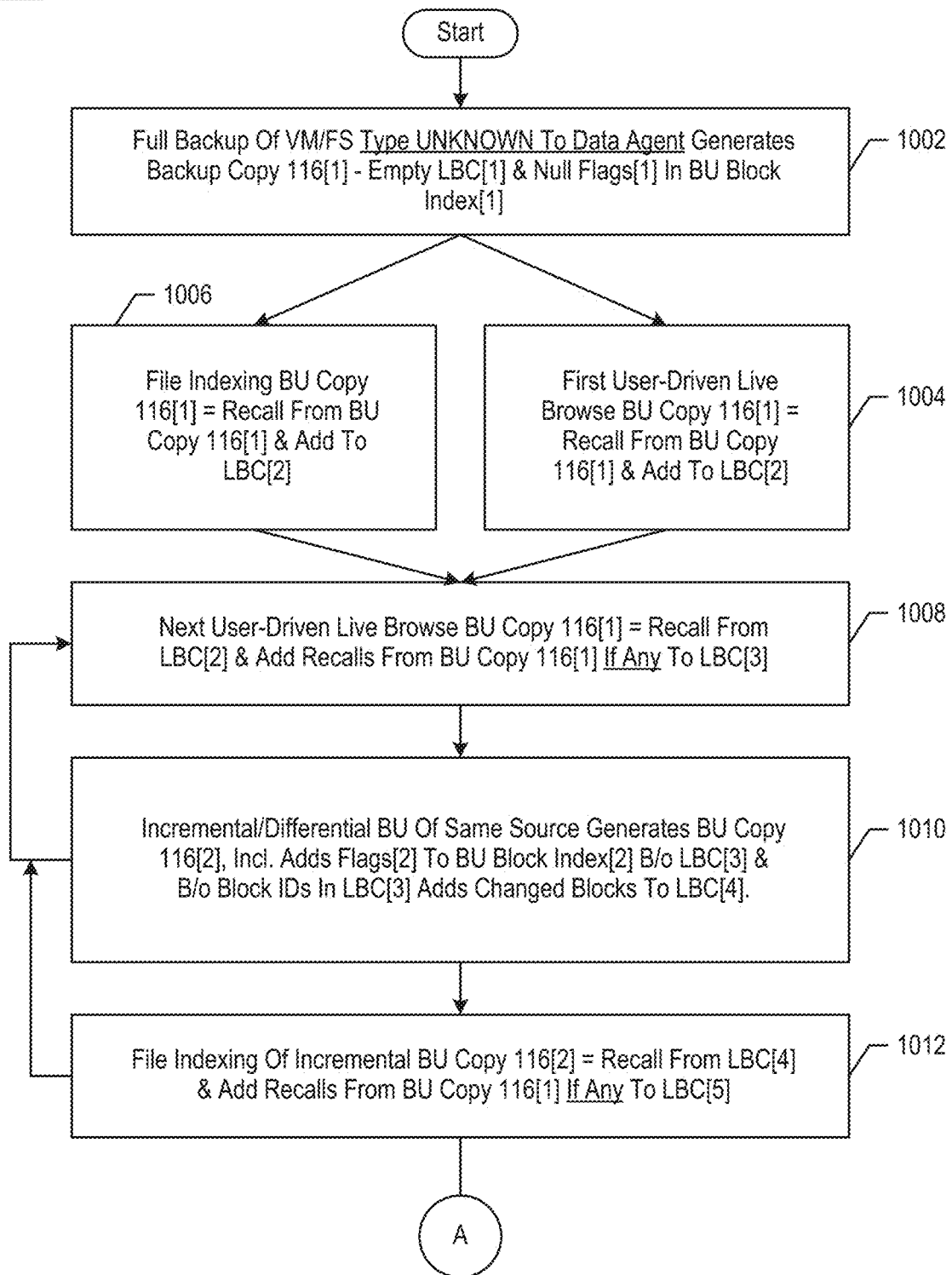
FIG. 10A depicts some salient operations of a method 1000 according to an illustrative embodiment based on FIGS. 8A, 8B, 6, and 7.

FIG. 10A depicts some salient operations of a method 1000 according to an illustrative embodiment based on FIGS. 8A, 8B, 6, and 7, in a scenario wherein the type of source virtual machine/file system that comprises primary data 112 is unknown to the originating data agent 442. In this configuration, data agent 442 lacks the capacity to recognize certain key aspects of source file system 314 or source VM disk 305 that are relevant to live browse cache management. Method 1000 is performed by one or more components of system 300, such as data backup and retrieval components 315, e.g., storage manager 440, data agent 442, media agent 444, and/or pseudo-disk driver 456.

At block 1002, method 1000 executes a full backup operation of source primary data 112 of a type that is unknown to originating data agent 442. As shown in FIG. 8A, this results in a first block-level backup copy 116[1]. Because a full backup does not rely on preceding backups, and because data agent 442 does not recognize whether any source data blocks are cacheable to the live browse cache, live browse cache 557 is not populated by the present full backup operation, resulting in an empty LBC[1]. Likewise, no cacheable flags are added to backup block index 846, resulting in null Flags [1]. Block 1002 is followed by a first user-driven live browse operation at block 1004 or a first file indexing operation at block 1006.

At block 1004, method 1000 performs a first user-driven live browse of backup copy 116[1], as described in FIG. 6. This operation recalls all needed data blocks from backup copy 116[1] on backup media, because no data blocks were populated to LBC[1] during the full backup operation. All data blocks recalled from backup copy 116[1] are added to LBC 557, resulting in LBC[2]. Thus, the present user-driven live browse operation does not benefit from the live browse cache (i.e., it experiences relatively slow performance as data blocks are retrieved from backup media), but by populating live browse cache 557, it causes future operations to benefit. Control passes to block 1008 for a subsequent user-driven live browse operation.

At block 1006, method 1000 performs a first file indexing operation of backup copy 116[1], as described in FIG. 7. Like the first-time user-driven live browse at block 1004, this operation recalls all needed data blocks from backup copy 116[1] on backup media, because no data blocks were populated to LBC[1] during the full backup operation. All data blocks recalled from backup copy 116[1] are added to LBC 557, resulting in LBC[2]. Thus, the present file indexing operation does not benefit from the live browse cache (i.e., it experiences relatively slow performance as data blocks are retrieved from backup media), but by populating live browse cache 557, it causes future operations to benefit. Control passes to block 1008 for a subsequent user-driven live browse operation.

At block 1008, method 1000 performs a user-driven live browse of backup copy 116[1] that follows an earlier user-driven live browse at block 1004 or a file indexing operation at block 1006. See also FIG. 6. Because these earlier operations populated data blocks into live browse cache LBC[2], the present live browse preferentially recalls data blocks from LBC[2], and if not found there, recalls other data blocks from backup copy 116[1] on backup media. All data blocks recalled from backup copy 116[1] are added to LBC 557, resulting in LBC[3]. Thus, the present user-driven live browse realizes faster performance from using the live browse cache, and by further populating the live browse cache, it causes future operations to benefit as well. Control passes to block 1010.

At block 1010, method 1000 performs an incremental or a differential backup operation of the same source primary data 112 that was backed up at block 1002 as shown in FIG. 8B. Backup copy 116[2] is generated here and stored to backup media. The originating data agent 442 lacks the capacity, as it did in the full backup operation, to recognize cacheable data blocks in the source primary data 112. However, data agent 442 queries media agent 444 as to whether changed data blocks detected by data agent 442 for the present incremental/differential operation have a corresponding (earlier version) in the live browse cache, e.g., LBC[3]. Data agent 442 flags changed data blocks corresponding to those in LBC[3] and the changed data blocks are added to live browse cache 557, resulting in LBC[4]. Moreover, cacheable flags are added to backup block index 848, resulting in Flags[2]. At this point, live browse cache 557 comprises data blocks that were browsed/used in earlier live browse/file indexing operations, and further comprises any corresponding changed data blocks backed up during the present incremental/differential backup operation. Thus, even though data agent 442 lacks the capacity to recognize data blocks suitable for the live browse cache within primary data 112, other techniques are used for populating the live browse cache on a going-forward basis. These techniques also help to populate cacheable flags into backup block index 848 created with backup copy 116[2].

At block 1012, method 1000 performs a file indexing operation of backup copy 116[2] generated at block 1010, as shown in FIG. 7. Because earlier operations populated data blocks into live browse cache LBC[4], the present file indexing operation preferentially recalls data blocks from LBC[4], and if not found there, recalls other data blocks from backup copy 116[2] on backup media. All data blocks recalled from backup copy 116[2] are added to LBC 557, resulting in LBC[5]. Thus, the present operation benefits from using the live browse cache, and by further populating the live browse cache, it causes future operations to benefit as well. Control passes to block 1014 in FIG. 10B.

Figure 10B:
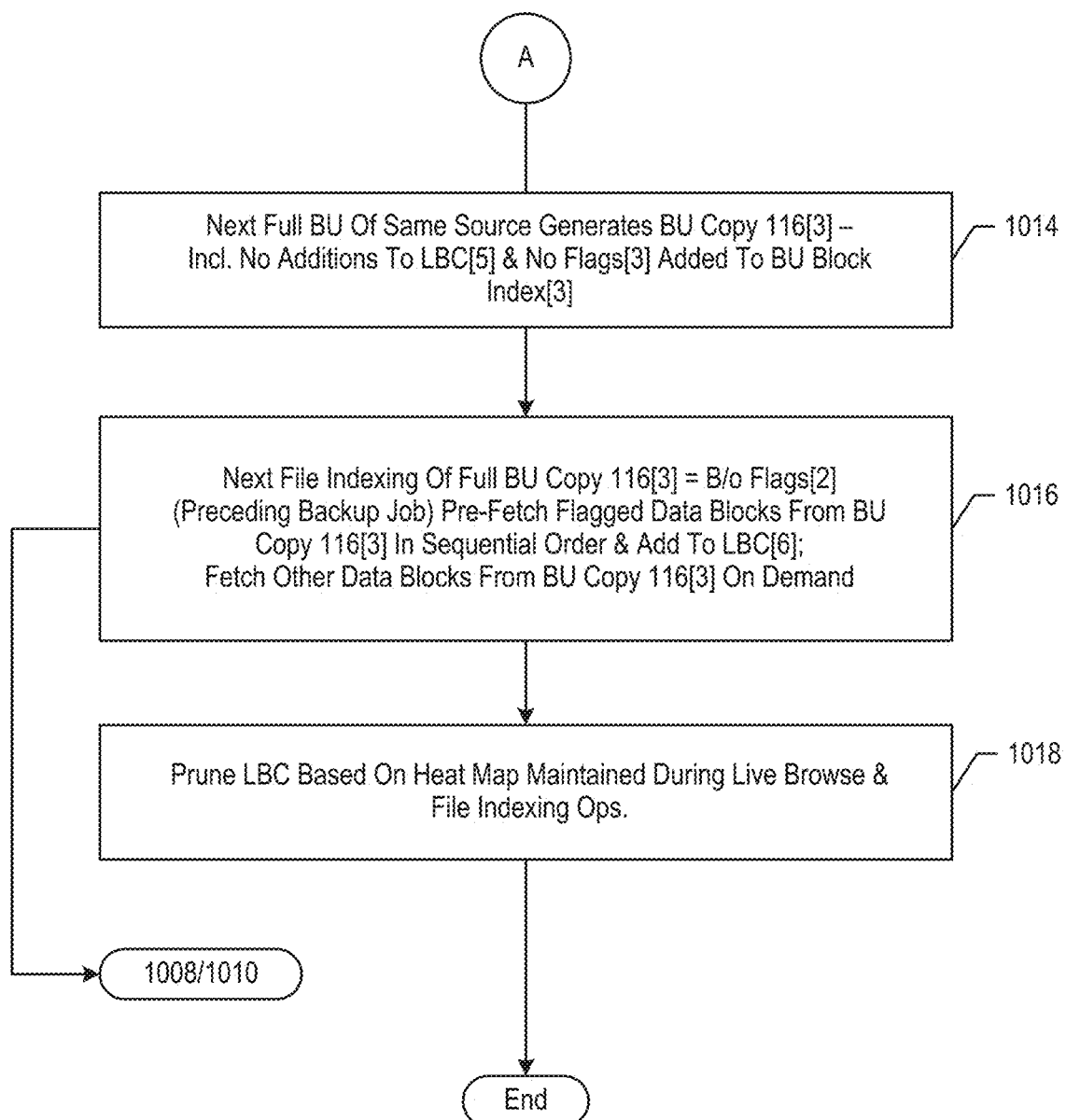
FIG. 10B depicts some additional salient operations of method 1000.

FIG. 10B depicts some additional salient operations of method 1000.

At block 1014, which follows block 1012 in FIG. 10A, method 1000 performs another full backup operation of the source primary data 112, resulting in block-level backup copy 116[3], as shown in FIG. 8A. As in block 1002, this operation does not populate live browse cache 557 and does not add flags to backup block index 848.

At block 1016, method 1000 performs a file indexing operation of block-level backup copy 116[3] generated at block 1014. In contrast to block 1006, block 1016 takes advantage of earlier operations to speed up the present file indexing. Accordingly, media agent 444 uses the cacheable flags from an earlier backup, e.g., Flags[2] generated at block 1010 as a guidepost to pre-fetching data blocks from backup media. Although data blocks flagged in an earlier backup operation are unlikely to be a perfect match for the present backup copy 116[3], the present operation fetches them sequentially from backup media, which is faster than one-by-one on-demand fetches as requested by the media agent's operating system. Data blocks that were not pre-fetched are then fetched on demand as the file indexing operation progresses. All data blocks recalled from backup copy 116[3] are added to the live browse cache, e.g., LBC[6], for future use. Control passes to block 1008 for user-driven live browse or to block 1010 for another backup operation.

At block 1018, method 1000 (e.g., cache management logic 555 in media agent 444) prunes live browse cache 557, based on information in heat map 646. This operation was described in more detail in block 912 of FIG. 9.

Figure 11:
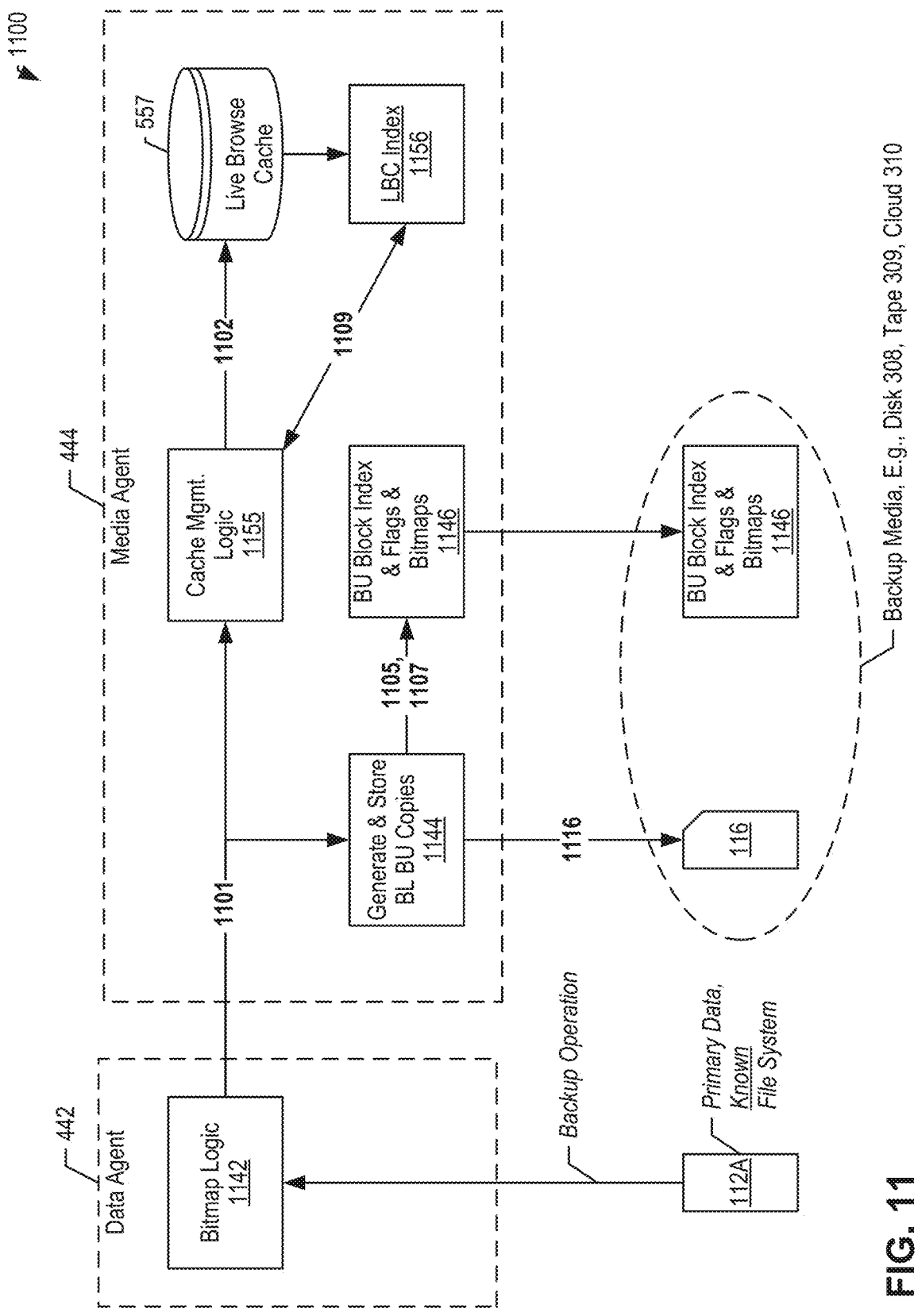
FIG. 11 is a block diagram depicting some salient portions of a system 1100 using lightweight metadata handling to improve performance of live browse and/or file indexing of backup copies, according to an illustrative embodiment.

Lightweight Metadata Handling for File Indexing and Live Browse of Backup Copies FIG. 11 is a block diagram depicting some salient portions of a system 1100 using lightweight metadata handling in a backup operation to improve performance of live browse and/or file indexing of backup copies, according to an illustrative embodiment. The present figure depicts certain components, operations, and data structures involved in conducting an enhanced backup operation according to an illustrative embodiment. The present figure depicts: primary data 112A; backup copy 116; backup media (e.g., 308, 309, 310); data agent 442 comprising bitmap logic 1142; and media agent 444 comprising live browse cache 557, backup generating logic 1144, backup index 1146, cache management logic 1155, and live browse cache index 1156. The arrows indicate certain logical views of data/metadata pathways within the system.

The figure indicates that data agent 442 is backing up primary data 112A from a known file system, thus enabling data agent 442 to identify metadata-carrying extents and segments. Data agent 442 generates extents 1101 (e.g., using bitmap logic 1142), and transmits them to media agent 444.

Figure 12A:
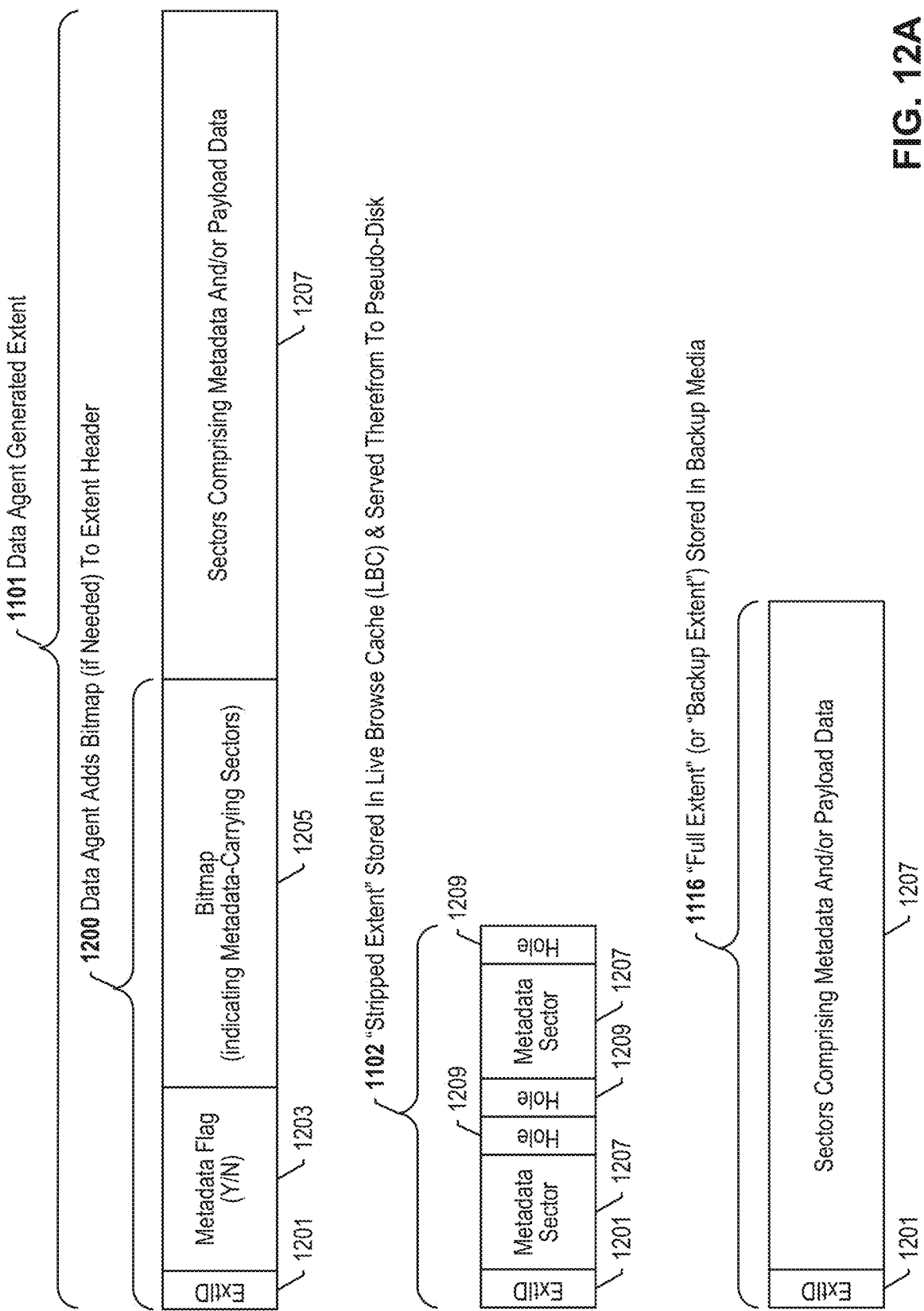
FIGS. 12A and 12B depict some data structures used in lightweight metadata handling by system 1100, according to an illustrative embodiment.
Figure 12B:
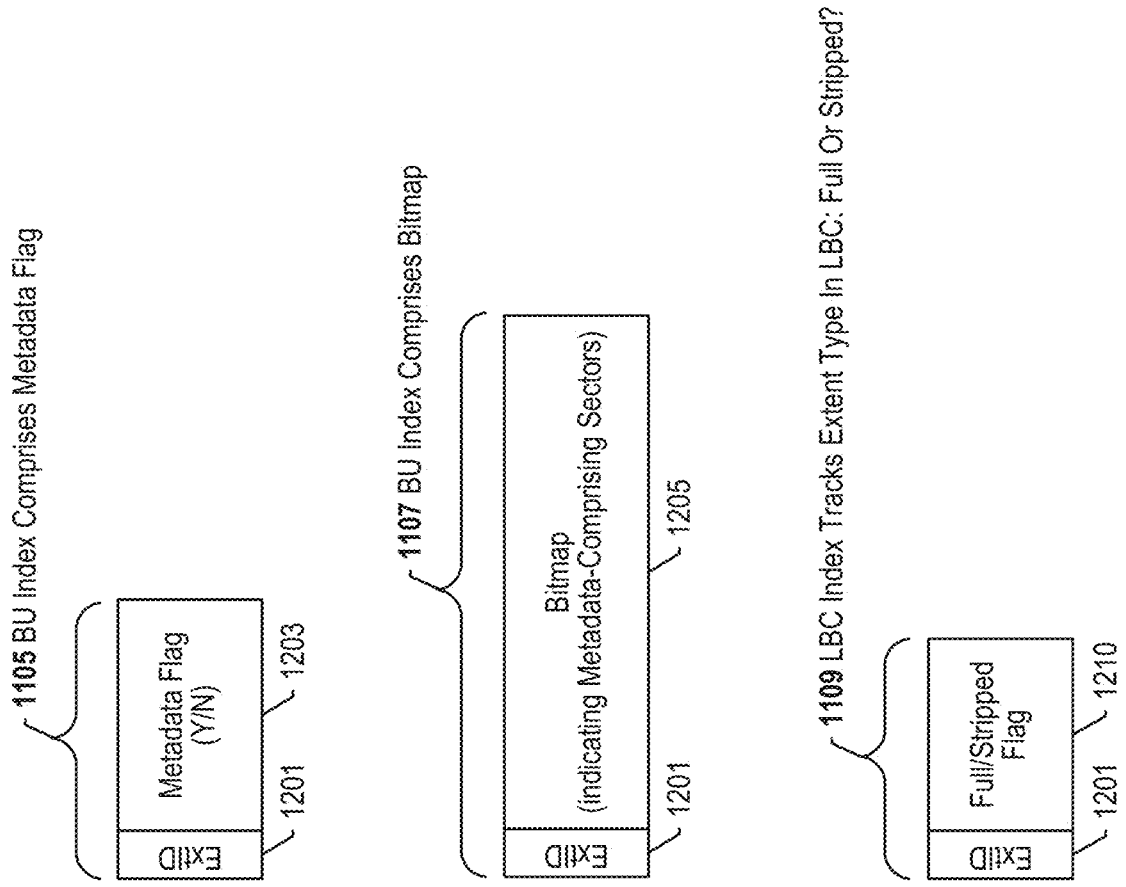

Cache management logic 1155 generates stripped extents 1102 and stores them in live browse cache (LBC) 557 and updates LBC index 1156 accordingly using entries 1109. Backup generating logic 1144 extracts metadata flags 1105 and bitmaps 1107 from extents 1101 and populates them into backup index 1146. Backup generating logic 1144 processes extents 1101 and backs them up as backup extents (full extents) 1116 to backup media. Backup extents 1116 collectively form backup copy 116. A copy of backup index 1146 is also stored to backup media. Illustrative examples of data structures 1101, 1102, 1105, 1107, 1109, and 1116 are shown in FIGS. 12A and 12B. Elements 112A, 116, 442, 444, and 557 are described in more detail elsewhere herein. Live browse cache 557 may be referred to herein as LBC 557 or as a cache storage area, though the invention is not limited to using cache technology for LBC 557.

Bitmap logic 1142 is a functional component of data agent 442 and in some embodiments also comprises the functionality of flag-setting logic 542 described in more detail elsewhere herein. Bitmap logic 1142 recognizes which sectors of primary data 112A comprise metadata. Accordingly, when dividing up primary data 112A into extents 1101 during the backup job, bitmap logic 1142 illustratively: (i) adds to the extent header 1200 a metadata flag indicating that extent 1101 comprises metadata (e.g., metadata flag 1203 set to "yes"); (ii) creates a bitmap 1205 that represents, for each segment 1207 within extent 1101, whether the segment comprises metadata or not; and (iii) adds bitmap 1205 to the extent header of extent 1101. See also FIG. 12A. For extents 1101 that lack metadata, bitmap logic 1142 adds to the extent header a metadata flag indicating that extent 1101 is metadata-free (e.g., metadata flag 1203 set to "no") and does not create a bitmap 1205. Thus, using bitmap logic 1142, data agent 442 is enhanced to handle metadata at a granular segment level rather than at the extent level.

Backup generating logic 1144 is a functional component of media agent 444 and in some embodiments also comprises the functionality of logic 544 described in more detail elsewhere herein. Backup generating logic 1144 is responsible for creating extents for backup (e.g., backup extents 1116, which collectively form backup copy 116) and is further responsible for populating backup index 1146 with the metadata flag 1203 and bitmap 1205 from the extent header of each extent 1101. In some embodiments, logic 1144 removes metadata flag 1203 and bitmap 1205 from extent 1101 when generating backup extents 1116, but the invention is not limited to this implementation. Logic 1144 is also responsible for storing backup extents 1116 to backup media (e.g., 308, 309, 310) and for populating tracking information thereof into backup index 1146.

Backup index 1146 is analogous to backup index 546 and additionally comprises entries that associate each extent identifier (e.g., 1201) with metadata flag 1203 and bitmap 1205, if any. Backup index 1146 may be copied to backup media (e.g., 308, 309, 310), which may or may not be the same as where backup copy 116 is stored.

Cache management logic 1155 is a functional component of media agent 444 and in some embodiments also comprises the functionality of logic 555 described in more detail elsewhere herein. Cache management logic is responsible for parsing metadata flag 1203 within each incoming extent 1101, and ignoring extent 1101 if its metadata flag 1203 indicates it is a metadata-free extent (e.g., metadata flag 1203 set to "no"). If cache management logic 1155 determines that metadata flag 1203 indicates a metadata-carrying extent or detects bitmap 1205 within the extent header 1200, it applies further processing to extent 1101, e.g., generating stripped extents 1102, storing them in LBC 557, and populating LBC index 1156 accordingly. In some alternative embodiments, the parsing of metadata flag 1203 and determining whether extent 1101 is to be processed into a stripped extent 1102 is performed outside cache management logic 1155, e.g., by backup generating logic 1144, by another aspect of media agent 444, etc., without limitation.

LBC index 1156 is analogous to LBC index 556 and further comprises, for each extent in LBC 557, an indication 1109 of whether it is a stripped extent 1102 or a backup extent 1116. More details are given in the subsequent figures.

FIG. 12A depicts some data structures, e.g., 1101, 1102, and 1116, which are used in lightweight metadata handling by system 1100, according to an illustrative embodiment.

Extent 1101 is generated by data agent 442 and transmitted to media agent 444. Extent 1101 comprises extent header 1200 and segments (sectors) 1207. Illustratively, extent 1101 is 1 MB in size and segments 1207 are 4 KB in size, but the invention is not so limited. Extent header 1200 comprises extent identifier 1201, metadata flag 1203 and bitmap 1205. Extent identifier 1201 uniquely identifies extent 1101 and its descendants, stripped extent 1102 and backup extent 1116, but the invention is not limited to this extent identification scheme. Metadata flag 1203 binarily indicates whether extent 1101 comprises metadata or not, and is set by data agent 442 when generating extent 1101. Bitmap 1205 represents sectors 1207 and is constructed during backup, indicating which sectors carry metadata, e.g., setting a corresponding bit in the bitmap to 1 for "yes" and 0 for "no" for each sector 1207 of extent 1101. Bitmap 1205 is not added for extents 1101 that are metadata-free. Data agent 442 generates bitmap 1205.

Stripped extent 1102 is generated by cache management logic 1155, is stored in LBC 557, is indexed in LBC index 1156, and is served from LBC 557 to pseudo-disk 656 (e.g., stored in recall store 658). Stripped extent 1102 comprises extent identifier 1201, metadata segments 1207, and hole markers 1209 taking the place of payload-only segments 1207. A hole marker 1209 comprises concise metadata or an indication representing one or more stripped out payload-only segments 1207 and occupies minimal storage space, far less than the segment 1207. Accordingly stripped extent 1102 is typically much smaller than extent 1101 or backup extent 1116, which include the payload-only segments 1207. Techniques for implementing hole marker 1209 are well known in the art. There is no limit on how many hole markers and/or how many metadata segments a stripped extent 1102 may have. Sometimes, an extent 1101 cannot be stripped, because all its segments 1207 comprise metadata. Such an extent will still be flagged as a metadata extent and its bitmap will indicate that all segments carry metadata. For purposes of the disclosed approach, the resultant extent 1102 will be treated as a stripped extent even though it lacks hole markers.

Full extent (or backup extent) 1116 is generated by backup generating logic 1144, is stored in backup media (e.g., 308, 309, 310), and is indexed in backup index 1146. Full extent 1116 comprises extent header 1200 and all sectors 1207 from extent 1101, whether they include metadata or not. In the illustrative embodiment, full extent 1116 has been stripped of metadata flag 1203 and bitmap 1205, which are retained in backup index 1146, but the invention is not limited to this implementation. Full extent 1116 is stored in a backup format in backup media (e.g., deduplicated, encrypted, compressed, re-formatted, etc.) and must be restored to a primary data format when requested by driver 456. Thus, when stored in LBC 557 and/or served to driver 456, full extent 1116 is in its restored primary data format, which may be different from the backup format used on backup media.

FIG. 12B depicts some data structures, e.g., 1105, 1107, and 1109, which are used in lightweight metadata handling by system 1100, according to an illustrative embodiment. Data structure 1105 is an example entry in backup index 1146, which associates extent identifier 1201 with metadata flag 1203 as obtained from extent 1101. Data structure 1107 is an example entry in backup index 1146, which associates extent identifier 1201 with bitmap 1205, if any, as obtained from extent 1101. Data structure 1109 is an example entry in LBC index 1156, which is used for every extent in LBC 557. Data structure 1109 indicates, e.g., using flag 1210, whether an extent with extent identifier 1201, which is in LBC 557, is a stripped extent 1102 or a full extent 1116.

Figure 13:
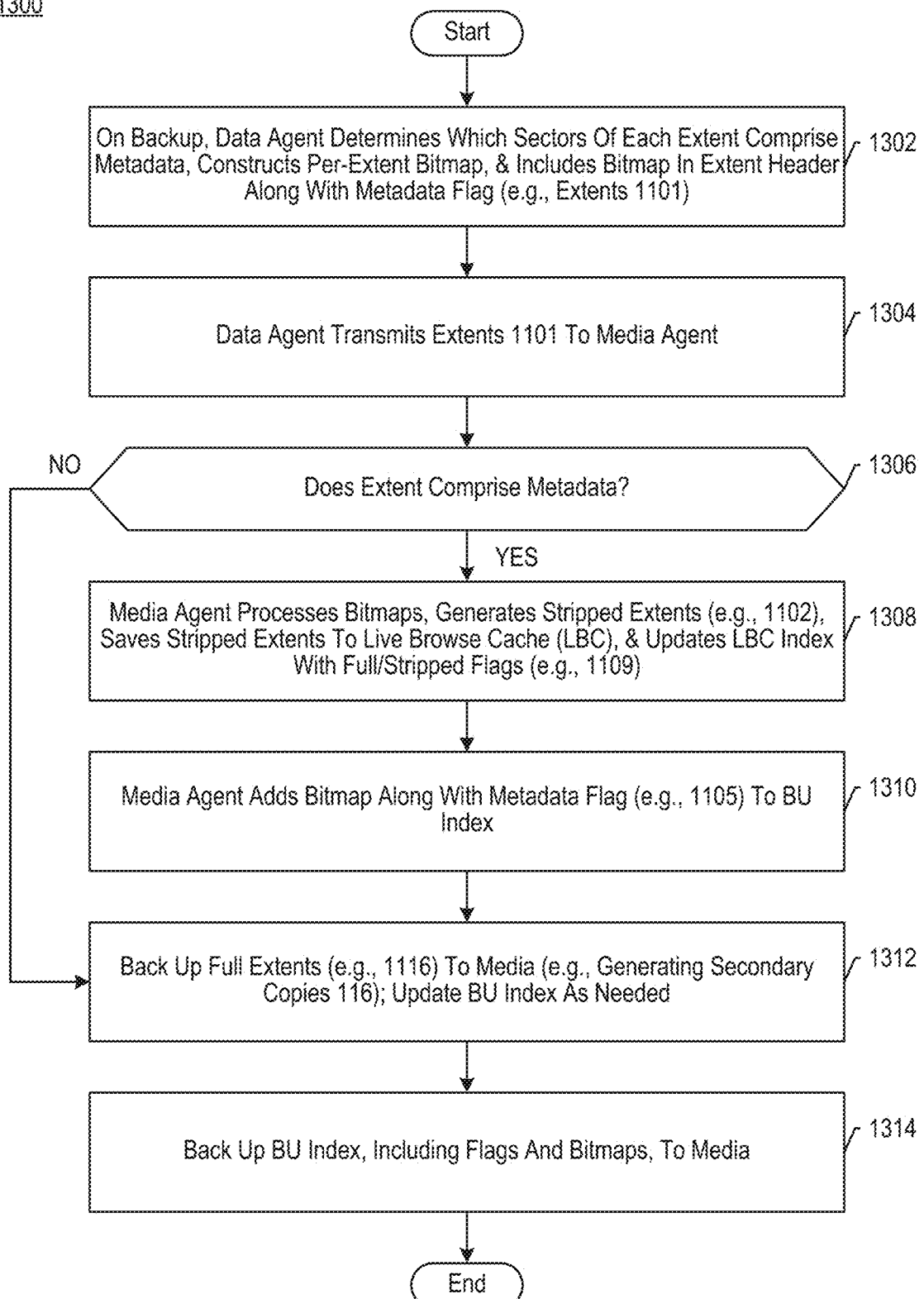
FIG. 13 depicts some salient operations of a method 1300 according to an illustrative embodiment.

FIG. 13 depicts some salient operations of a method 1300 according to an illustrative embodiment. Method 1300 is generally used for backing up primary data 112A as shown in FIG. 11, and is performed by components of system 1100.

At block 1302, while performing or participating in a backup job, data agent 442 determines which sectors 1207 of each extent 1101 comprise metadata, constructs per-extent bitmap 1205, and includes bitmap 1205 in extent header 1200 along with metadata flag 1203. Thus, data agent 442 (e.g., using bitmap logic 1142) generates extents 1101 from primary data 112A. At block 1304, data agent 442 transmits extents 1101 to media agent 444 as part of the backup job. At block 1306, media agent 444 determines whether extent 1101 comprises metadata, e.g., by interpreting metadata flag 1203. If extent 1101 is metadata-free control passes to block 1312. Otherwise, control passes to block 1308. At block 1308, media agent 444 (e.g., using cache management logic 1155) processes bitmaps 1205, generates stripped extents 1102, saves the stripped extents to LBC 557, and updates LBC index 1156 with full/stripped flags (e.g., 1109). At block 1310, media agent 444 entries for bitmaps (e.g., 1107) and entries for metadata flags (e.g., 1105) to backup index 1146.

At block 1312, media agent 444 (e.g., using backup generating logic 1144) backs up full extents 1116 to backup media (e.g., generating secondary copies 116). Media agent 444 may update backup index 1146 with location information indicating whether backup copy 116 and/or backup extents 1116 can be found on backup media. At block 1314, media agent 444 backs up backup index 1146 to backup media, and method 1300 ends here.

Figure 14:
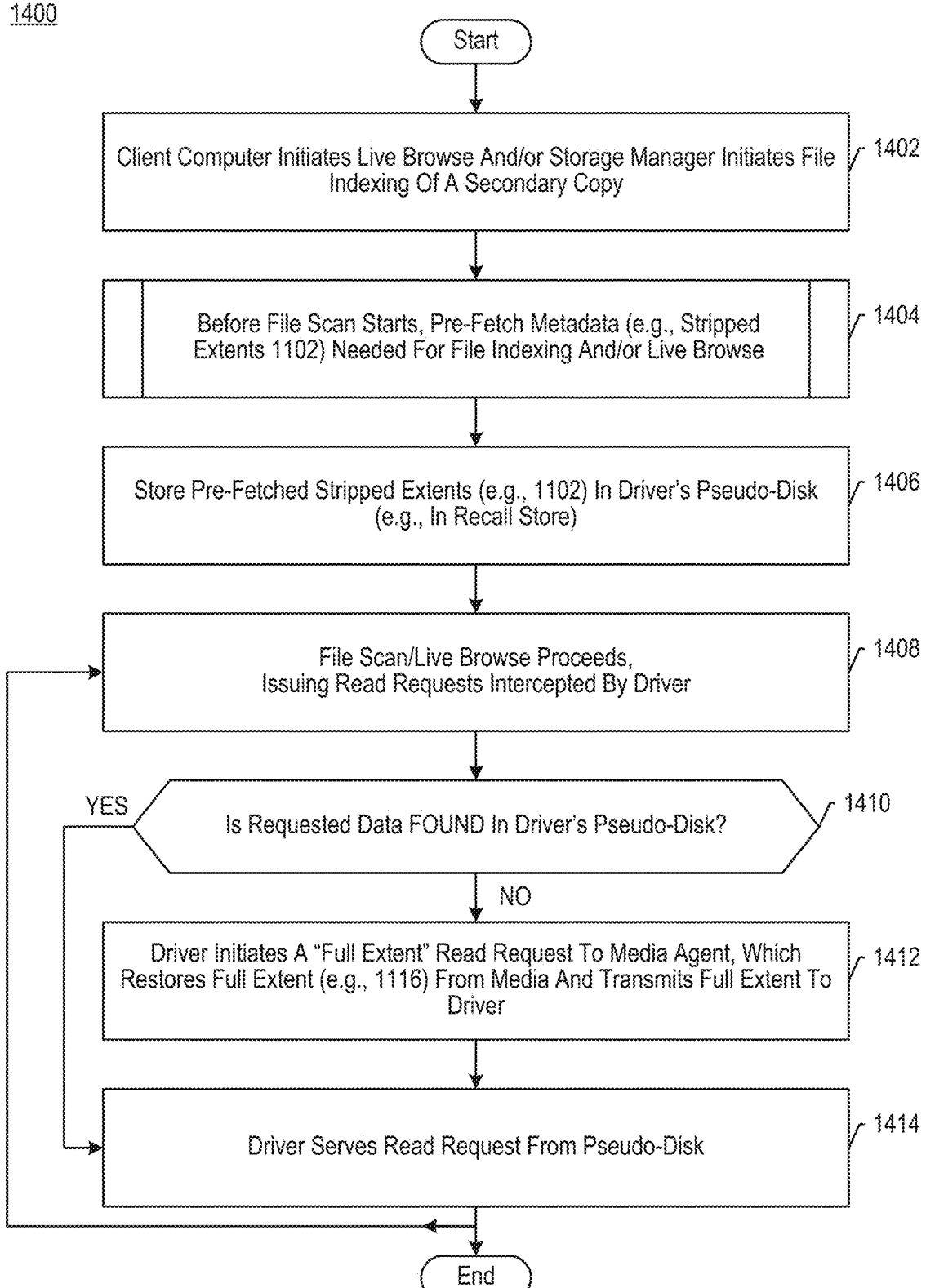
FIG. 14 depicts some salient operations of a method 1400 according to an illustrative embodiment.

FIG. 14 depicts some salient operations of a method 1400 according to an illustrative embodiment. Method 1400 is generally used for live browsing and/or file indexing a backup copy, including pre-fetching metadata therefor, and is performed by components of system 1100.

At block 1402, after the backup job that created backup copy 116 has been successfully completed (see, e.g., method 1300 in FIG. 13), a client computer (e.g., 321) initiates live browse of backup copy 116, and/or a storage manager (e.g., 440) or an indexing server (e.g., 321) initiates file indexing of backup copy 116. According to the illustrative embodiments, this provides notice to driver 456, which then initiates pre-fetching the metadata of backup copy 116 before the live browse may begin or before the file indexing may initiate its file scan. At block 1404, method 1400 pre-fetches metadata (e.g., stripped extents 1102) for file indexing and/or live browsing backup copy 116. The pre-fetching populates the driver's pseudo-disk 656 with stripped extents 1102, so that driver 456 may readily serve the read requests issued by the live browse and/or file scan operations. More details are given in another figure. At block 1406, driver 456 stores the pre-fetched stripped extents 1102 in the driver's pseudo-disk storage area, e.g., at recall store 658. After the pseudo-disk is populated, driver 456 allows the file scan or live browse to proceed.

At block 1408, the file scan of the file indexing operation proceeds, issuing read requests that traverse the file structure of backup copy 116; the read requests are intercepted by driver 456. Likewise, a live browse operation also issues read requests for metadata on user demand and driver 456 intercepts the read requests. At block 1410, driver 456 determines whether it can serve the read request from its pseudo-disk storage area 656. If so, control passes to block 1414. Otherwise, the requested data/metadata must be retrieved from media agent 444 and control passes to block 1412. At block 1412, driver 456 initiates a "full extent" read request to media agent 444. Typically, this will cause media agent 444 to locate backup extent 1116 using backup index 1146 and restore backup extent 1116 from backup media, store it to LBC 557, and serve it to driver 456. In some embodiments, media agent 444 will check LBC index 1156 for the full extent (using the extent identifier) on the off-chance that it might be in LBC 557 already and thus would not need to be restored from backup media. Media agent 444 transmits the request full extent 1116 to driver 456. Driver 456 adds full extent 1116 to its pseudo-disk storage area 656.

At block 1414, driver 456 serves the read request received at block 1408 from its pseudo-disk storage area 656. Control passes back to block 1408 for handling additional read requests issued by ongoing file scan and/or live browse operations. When the user stops live browsing and/or the file indexing is complete, method 1400 ends.

Figure 15:
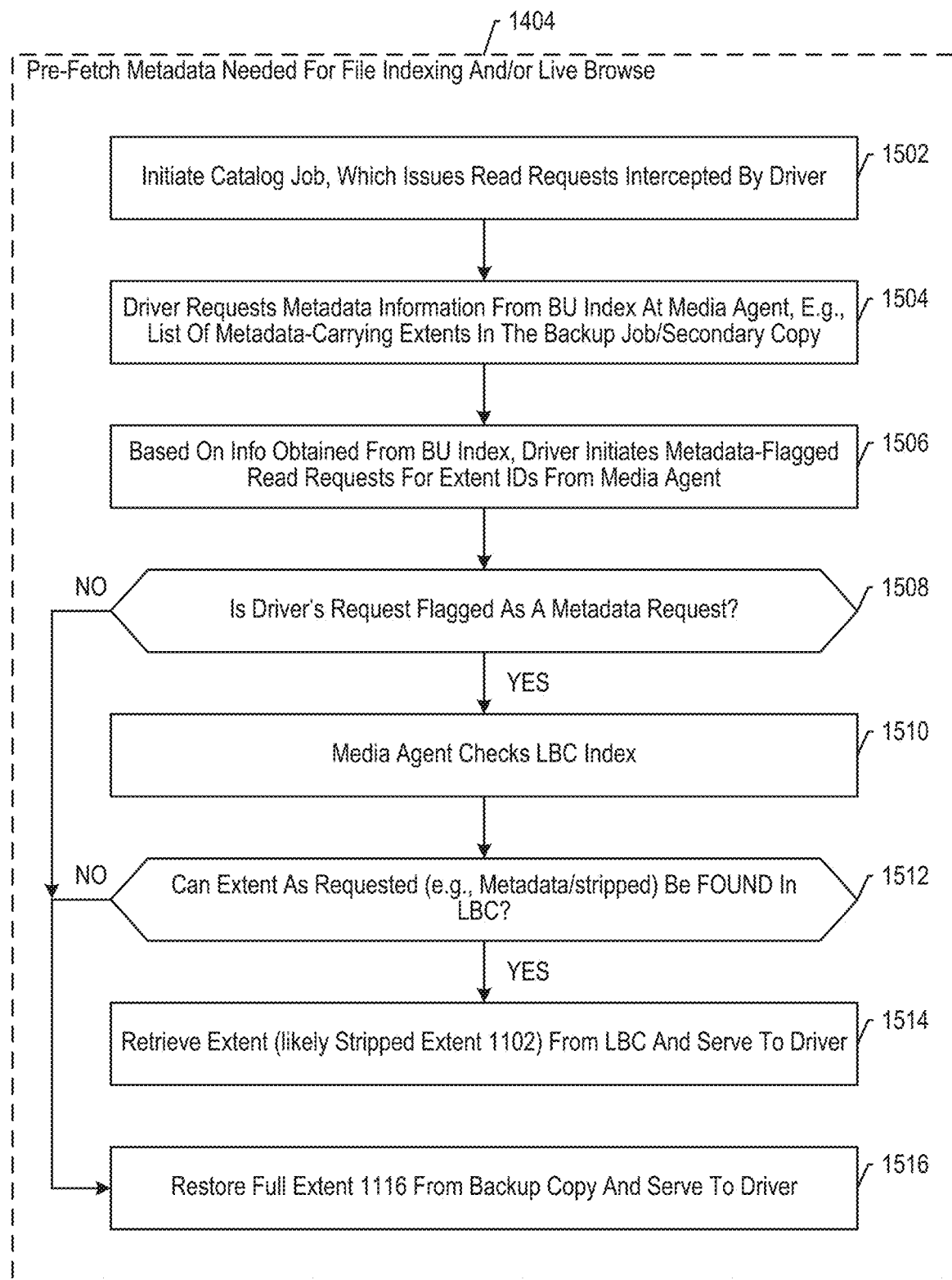
FIG. 15 depicts some salient operations of block 1404 of method 1400.

FIG. 15 depicts some salient operations of block 1404 of method 1400. Block 1404 is generally directed to pre-fetching metadata. At block 1502, media agent 444 initiates a catalog job, which issues read requests for metadata that are intercepted by driver 456. At block 1504, driver 456 requests and/or obtains metadata information from backup index 1146, e.g., a list of metadata-carrying extents in the backup copy. At block 1506, based on this information obtained from backup index 1146, driver 456 initiates metadata-flagged read requests for extents identified by their extent identifiers. The read requests are addressed to media agent 444. At block 1508, media agent 444 determines whether a driver's request is flagged as a metadata request. If not, media agent 444 interprets the request as one for a full extent and control passes to block 1516, otherwise control passes to block 1510. In some embodiments, control passes to block 1510 regardless, because it presents an opportunity to fetch a full extent from LBC 557. At block 1510, media agent 444 checks LBC index 1156 to determine whether the requested extent is present in LBC 557 in the requested form. Thus, if the request is for a full extent, media agent 444 can determine whether a full extent 1116 exists in LBC 557 based on flag 1210 in LBC index 1156. A stripped extent 1102 cannot be served in response to a request for a full extent.

At block 1512, media agent 444 determines whether the extent as requested can be found in LBC 557. If not, control passes to block 1516, otherwise control passes to block 1514. At block 1514, media agent 444 retrieves the extent as requested (likely stripped extent 1102) from LBC 557 and serves to driver 456.

At block 1516, media agent 444 restores full extent 1116 from backup copy 116 on backup media and serves the full extent to driver 456. Media agent may add the restored full extent 1116 to LBC 557 and update LBC index 1156 accordingly. Block 1404 ends here.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation. For example, in some embodiments, logic for managing the live browse cache and storage for the live browse cache are configured outside the media agent, e.g., on an indexing server computing device. For example, in some embodiments, the media agent transmits the live browse cache index and/or the backup block index (including the live browse cache flags) to the data agent at the beginning of each backup job, thus enabling the data agent to identify data blocks to flag for live browse caching.

Example Embodiments

Some example enumerated embodiments of the present invention are recited in this section in the form of methods, systems, and non-transitory computer-readable media, without limitation.

According to an example embodiment, a computer-implemented method for caching metadata-comprising segments of data being backed up comprises: by a first computing device that comprises one or more hardware processors and computer memory, while backing up first data: dividing the first data into extents of a first fixed size, wherein each extent comprises a plurality of segments of a second fixed size smaller than the first fixed size, for each extent that comprises at least one segment that comprises metadata, adding a metadata flag to a header of the extent, for each extent that comprises at least one segment that comprises metadata, generating a bitmap indicating which segments of the extent comprise metadata, and adding the bitmap to the header of the extent, and transmitting the extents of the first data to a second computing device (e.g., media agent host). The above-recited embodiment further comprising: by the second computing device, which comprises one or more hardware processors and computer memory, and which further comprises a cache storage area and a backup index, for each extent received from the first computing device: (a) determining whether the extent comprises a metadata flag, (b) generating a backup extent that comprises the plurality of segments within the extent, and (c) storing a backup copy of the first data at one or more data storage resources, wherein the backup copy comprises backup extents generated from the extents of the first data received from the first computing device.

The above-recited embodiment further comprising: by the second computing device, for each extent that comprises a metadata flag: (i) using the bitmap of the extent to strip from the extent all segments that do not comprise metadata, (ii) generating a stripped extent that comprises: an extent identifier corresponding to the extent, all segments of the extent that comprise metadata, and hole markers replacing segments of the extent that do not comprise metadata, and (iii) storing the stripped extent at the cache storage area. The above-recited embodiment further comprising: by the second computing device, in response to a request for metadata of a first extent associated with the backup copy: if a corresponding stripped extent is present in the cache storage area, serving the corresponding stripped extent therefrom, and if a corresponding stripped extent is not present in the cache storage area, using the backup index to locate a corresponding backup extent in the one or more data storage resources, restoring the corresponding backup extent, and serving the corresponding backup extent as restored. The above-recited embodiment further comprising: by the second computing device, for each extent received from the first computing device that comprises a metadata flag, adding the metadata flag and the bitmap of the extent to the backup index. The above-recited embodiment wherein each backup extent generated by the second computing device and stored at the one or more data storage resources is configured without a metadata flag and a bitmap. The above-recited embodiment wherein the corresponding backup extent located in the one or more data storage resources is restored to the cache storage area and served therefrom in response to the request. The above-recited embodiment further comprising: by the second computing device, determining if the corresponding stripped extent is present in the cache storage area by checking an index of the cache storage area at the second computing device. The above-recited embodiment wherein an index of the cache storage area indicates whether an extent in the cache storage area is a stripped extent or a backup extent. The above-recited embodiment further comprising: by the second computing device, in response to a request for an extent associated with the backup copy, using the backup index to locate a corresponding backup extent in the one or more data storage resources, restoring the corresponding backup extent, and serving the corresponding backup extent as restored. The above-recited embodiment further comprising: by the second computing device: in response to a request for an extent associated with the backup copy, using the backup index to locate a corresponding backup extent in the one or more data storage resources, restoring the corresponding backup extent to the cache storage area, and serving the corresponding backup extent therefrom.

The above-recited embodiment further comprising: in response to a request for a full extent, checking an index of the cache storage area to determine whether a corresponding backup extent is present in the cache storage area. The above-recited embodiment wherein the request is received from a driver that intercepts read requests directed to the backup copy in one of: a pre-fetch operation that precedes a file scan of a file indexing operation directed to the backup copy and a live browse operation directed to the backup copy. The above-recited embodiment wherein the driver executes on one of: the second computing device and a third computing device that is distinct from the first computing device and from the second computing device, and wherein the driver manages a pseudo-disk storage area from which the driver serves the read requests directed to the backup copy. The above-recited embodiment wherein the driver executes on one of: the second computing device and a third computing device that is distinct from the first computing device and from the second computing device, and wherein the driver stores stripped extents and backup extents received from the second computing device at a pseudo-disk storage area from which the driver serves the read requests directed to the backup copy. The above-recited embodiment further comprising: before executing a file indexing operation directed to the backup copy, pre-fetching metadata associated with the backup copy, wherein the pre-fetching comprises issuing to the second computing device a plurality of requests for metadata associated with the backup copy, including the request for metadata of the first extent, wherein the plurality of requests are flagged as metadata requests; and by the second computing device, based on receiving a request flagged as a metadata request, attempting to serve the metadata request with a stripped extent from the cache storage area. The above-recited embodiment further comprising: by the second computing device: receiving a request for metadata associated with the backup copy; identifying in the backup index a plurality of extent identifiers each one associated with the backup copy and having a metadata flag; receiving a request for an extent having a first identifier from among the plurality of extent identifiers; and in response, serving a stripped extent from the cache storage area.

The above-recited embodiment wherein a data agent that executes at the first computing device performs one or more of: the dividing the first data into extents, the adding the metadata flag, the generating of the bitmap, and the transmitting of the extents of the first data to the second computing device. The above-recited embodiment wherein a media agent that executes at the second computing device performs one or more of: the determining, the using of the bitmap, the generating and storing of the stripped extent, the generating of the backup extent, the storing of the backup copy, and the serving of one of the corresponding stripped extent and the corresponding backup extent. The above-recited embodiment further comprising: after the backup copy is stored at the one or more data storage resources, pre-fetching metadata of the backup copy, wherein the pre-fetching comprises: requesting from the backup index at the second computing device metadata about the backup copy; determining a plurality of extent identifiers associated with the backup copy that are flagged for metadata; receiving from the second computing device a plurality of stripped extents corresponding the plurality of extent identifiers; and storing the plurality of stripped extents at a pseudo-disk storage area, which is distinct from the cache storage area and is managed by a driver. The above-recited embodiment further comprising: after the pre-fetching, initiating a file scan as part of a file indexing of the backup copy, wherein the file scan issues read requests that are intercepted by the driver; by the driver, serving responses to the read requests of the file scan from the pseudo-disk storage area. The above-recited embodiment further comprising: after the pre-fetching, initiating a live browse of the backup copy, wherein the live browse issues read requests that are intercepted by the driver; and by the driver, serving responses to the read requests of the live browse from the pseudo-disk storage area. The above-recited embodiment wherein one of: (A) the driver executes on and maintains the pseudo-disk storage area at the second computing device, and (B) the driver executes on and maintains the pseudo-disk storage area at a third computing device, which comprises one or more hardware processors and is distinct from the first computing device and from the second computing device.

In an exemplary embodiment, a computer-implemented method for populating a cache storage area in a data storage management system, the method comprises: by a media agent at a first computing device, populating a cache storage area at the media agent with data blocks read during a file indexing operation of a backup copy, wherein the backup copy was generated in a block-level backup operation of primary data, and wherein the populating comprises: by the media agent, receiving an indication that the file indexing operation has been initiated by a second computing device, receiving a first read request issued by the file indexing operation for a first data block of the backup copy, (i) if the media agent determines that the first data block is in the cache storage area, retrieving the first data block from the cache storage area, and (ii) if the media agent determines that the first data block is not in the cache storage area, retrieving the first data block from the backup copy stored on backup media, adding the first data block to the cache storage area, and updating a cache-index to indicate that the first data block is in the cache storage area; wherein the first data block and other data blocks added to the cache storage area during the file indexing operation are available to be read from the cache storage area and not from the backup copy for subsequent live browse operations of the backup copy; and wherein the first computing device comprises one or more hardware processors and wherein the second computing device comprises one or more hardware processors.

The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media. The above-recited embodiment further comprising: by the media agent, receiving a second read request for the first data block of the backup copy issued by a subsequent live browse operation of the backup copy, and based on using the cache-index to determine that the first data block is in the cache storage area, retrieving the first data block from the cache storage area and not from the backup copy. The above-recited embodiment further comprising: by the media agent during a subsequent incremental block-level backup operation of the primary data: identifying that a changed version of the first data block is being backed up to a second backup copy, based on using the cache-index, determining that the first data block is in the cache storage area, adding the changed version of the first data block to the cache storage area, and updating the cache-index to indicate that the changed version of the first data block is in the cache storage area; and wherein in a live browse operation of the second backup copy, the changed version of the first data block is retrieved from the cache storage area and not from the second backup copy. The above-recited embodiment further comprising during the subsequent incremental block-level backup operation that generates the second backup copy: in a backup-index that tracks where data blocks are stored on backup media, flagging the changed version of the first data block as a data block suitable for the cache storage area; and wherein flags in the backup-index are used in a subsequent file indexing operation of a third backup copy of the primary data to pre-fetch from the third backup copy second data blocks corresponding to data blocks of the second backup copy flagged as suitable for the cache storage area, including the first data block, and wherein the pre-fetch is performed in a sequential order according to where the second data blocks are stored on the backup media. The above-recited embodiment wherein the pre-fetch enables the subsequent file indexing operation of the third backup copy to complete sooner as compared to on demand serving read requests issued by the subsequent file indexing operation. The above-recited embodiment further comprising during the subsequent incremental block-level backup operation that generates the second backup copy: in a backup-index that tracks where data blocks are stored on backup media, flagging the changed version of the first data block as a data block suitable for the cache storage area; and wherein flags in the backup-index are used instead of the cache-index in a subsequent live browse operation of the second backup copy to determine whether to add a given data block of the second backup copy to the cache storage area for later retrieval therefrom instead of from the backup media. The above-recited embodiment wherein a virtual machine generates the primary data, which resides on a virtual disk. The above-recited embodiment wherein a virtual machine generates the primary data, which resides in a cloud storage environment. The above-recited embodiment wherein one or more applications that execute on a third computing device, distinct from the first computing device, generate the primary data. The above-recited embodiment wherein the first backup copy is stored to one or more a cloud storage environments. The above-recite embodiment wherein the first backup copy is stored to magnetic tape.

According to another exemplary embodiments, a computer-implemented method for populating a cache storage area in a data storage management system, the method comprises: by a media agent, populating a cache storage area with data blocks read during a first live browse operation of a backup copy, wherein the backup copy was generated in a block-level backup operation of primary data, and wherein the populating comprises: by the media agent, receiving a first read request issued by the first live browse operation for a first data block of the backup copy, and (i) if the media agent determines that the first data block is in the cache storage area, retrieving the first data block from the cache storage area, and (ii) if the media agent determines that the first data block is not in the cache storage area, retrieving the first data block from the backup copy, adding the first data block to the cache storage area, and updating a cache-index to indicate that the first data block is in the cache storage area; by the media agent during a subsequent incremental block-level backup operation of the primary data: identifying that a changed version of the first data block is being backed up to a second backup copy, determining that the first data block is in the cache storage area, in a backup-index that tracks where data blocks are stored on backup media, flagging the changed version of the first data block as a data block suitable for the cache storage area, adding the changed version of the first data block to the cache storage area, and updating the cache-index to indicate that the changed version of the first data block is in the cache storage area.

The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media. The above-recited embodiment wherein in a subsequent file indexing operation of the second backup copy, the changed version of the first data block is retrieved from the cache storage area and not from the second backup copy on the backup media; and wherein the media agent executes on a first computing device comprising one or more hardware processors. The above-recited embodiment wherein a data agent associated with the primary data indicates to the media agent that the changed version of the first data block is being backed up to the second backup copy. The above-recited embodiment further comprising: by the media agent, storing a third backup copy of the primary data to backup media, wherein the third backup copy is generated by a full block-level backup operation. The above-recited embodiment further comprising: in a file indexing operation of the third backup copy: identifying one or more data blocks of the third backup copy that are flagged in the backup-index as suitable for the cache storage area, defining a sequential order for the one or more data blocks of the third backup copy according to where they are stored on the backup media, sequentially retrieving the one or more data blocks from the backup media according to the sequential order, adding the one or more data blocks to the cache storage area, updating the cache-index to indicate that the one or more data blocks of the third backup copy are in the cache storage area, serving read requests issued by the file indexing operation of the third backup copy for the one or more data blocks from the cache storage area, and retrieving on demand other data blocks needed for the file indexing operation of the third backup copy from the backup media to serve read requests issued by the file indexing operation for the other data blocks; wherein the sequentially retrieving, adding, and serving of the one or more data blocks from the cache storage area is faster than on demand retrieving the one or more data blocks from the third backup copy on the backup media to serve the read requests issued by the file indexing operation for the one or more data blocks. The above-recited embodiment wherein the backup media is part of a cloud storage environment. The above-recited embodiment wherein the backup media comprises magnetic tape. The above-recited embodiment wherein a virtual machine generates the primary data, which resides on a virtual disk. The above-recited embodiment wherein a virtual machine generates the primary data, which resides in a cloud storage environment. The above-recited embodiment wherein one or more applications that execute on a second computing device distinct from the first computing device generate the primary data. The above-recited embodiment wherein a pseudo-disk driver is interposed between a second computing device that initiates the first live browse operation and the media agent, and wherein the first data block is transmitted by the media agent to the pseudo-disk driver in response to an indication that the second computing device initiated the first live browse operation, and wherein the pseudo-disk driver responds to read requests of the first live browse operation issued by the second computing device; and wherein the pseudo-disk driver executes on one of: the first computing device that hosts the media agent, the second computing device that initiates the first live browse operation, and a third computing device distinct from the first and the second computing devices. The above-recited embodiment wherein the pseudo-disk driver serves read requests of the first live browse operation from a first storage area that comprises data blocks received from the media agent, including the first data block, and wherein the pseudo-disk driver stores data blocks from write operations issued by the first live browse operation to a second storage area whose contents are discarded after the second computing device terminates the first live browse operation. The above-recited method further comprising: by the media agent, receiving a second read request for the first data block of the backup copy issued by a second live browse operation of the backup copy, and based on using the cache-index to determine that the first data block is in the cache storage area, retrieving the first data block therefrom not from the backup copy.

According to yet another exemplary embodiment, a system comprising a first computing device that executes a media agent and comprises a cache storage area; wherein the first computing device is configured to: populating a cache storage area at the media agent with data blocks read during a file indexing operation of a backup copy, wherein the backup copy was generated in a block-level backup operation of primary data, and wherein the populating comprises: receiving an indication that the file indexing operation has been initiated by a second computing device, receiving a first read request issued by the file indexing operation for a first data block of the backup copy, (i) if the first data block is in the cache storage area, retrieving the first data block from the cache storage area, and (ii) if the first data block is not in the cache storage area, retrieving the first data block from the backup copy stored on backup media, adding the first data block to the cache storage area, and updating a cache-index to indicate that the first data block is in the cache storage area; wherein the first data block and other data blocks added to the cache storage area during the file indexing operation are available to be read from the cache storage area and not from the backup copy for subsequent live browse operations of the backup copy; receiving a second read request for the first data block of the backup copy issued by a subsequent live browse operation of the backup copy, and based on using the cache-index to determine that the first data block is in the cache storage area, retrieving the first data block from the cache storage area and not from the backup copy; and wherein the first computing device comprises one or more hardware processors and wherein the second computing device comprises one or more hardware processors. The above-recited embodiment further comprising a storage manager that initiates the block-level backup operation of the primary data. The above-recited embodiment further comprising a data agent associated with the primary data. The above-recited embodiment wherein the data agent indicates to the media agent that certain data blocks being backed up to the backup copy should be added to the cache storage area. The above-recited embodiment wherein the data agent indicates to the media agent that certain data blocks being backed up to the backup copy are suitable to be added to the cache storage area. The above-recited embodiment wherein the data agent indicates to the media agent that certain data blocks being backed up to the backup copy should be flagged in the backup-index as suitable to be added to the cache storage area. The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media.

According to an illustrative embodiment, a system comprises: a first computing device, comprising one or more hardware processors, which hosts a data agent associated with primary data, wherein the primary data has been backed up to a backup copy using a block-level backup operation; a second computing device, comprising one or more hardware processors, which hosts a media agent, a first index that tracks where data blocks of the backup copy are stored on backup media, a cache storage area managed by the media agent, and a second index that tracks which data blocks are stored in the cache storage area; wherein the first computing device is configured to: during the block-level backup operation, if the data agent recognizes a type of file system that hosts the primary data, indicate to the media agent which data blocks being backed up to the backup copy are cacheable data blocks suitable to store to the cache storage area; wherein the second computing device is configured to: store to the cache storage area certain data blocks of the backup copy, including the cacheable data blocks, during one or more of: generating the backup copy, live browsing the backup copy, and file indexing the backup copy and update the second index to indicate the certain data blocks in the cache storage area; indicate in the first index which data blocks of the backup copy are the cacheable data blocks as indicated by the data agent, and store the backup copy to backup media; and wherein data blocks in the cache storage area are available to be read from the cache storage area and not from the backup copy in one or more of: subsequent live browse operations of the backup copy, and subsequent file indexing operations of the backup copy.

The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media. The above-recited embodiment wherein at least some of the cacheable data blocks are descriptor block of the file system that hosts the primary data. The above-recited embodiment wherein the second computing device is further configured to: receive an indication that a third computing device initiated a subsequent live browse operation of the backup copy, wherein the third computing device comprises one or more hardware processors; retrieve from the cache storage area first data blocks of the backup copy that are stored in the cache storage area, if any, as indicated by the second index; retrieve from the backup copy second data blocks of the backup copy that are needed to launch the subsequent live browse operation and are not found in the cache storage area, by using a sequential order of retrieval based on where the second data blocks are stored on the backup media as indicated by the first index; transmit the first and second data blocks in response to the indication that the third computing device initiated the subsequent live browse operation; issue a release command that allows the third computing device to accept user requests to live browse the backup copy; and store to the cache storage area third data blocks retrieved on demand from the backup copy during the subsequent live browse operation if the third data blocks are not already in the cache storage area. The above-recited embodiment wherein the media agent is further configured to, during the subsequent live browse operation: receive a read request issued by the third computing device for a given data block of the backup copy; if the second index indicates that the given data block is in the cache storage area, retrieve the given data block from the cache storage area and not from the backup copy on the backup media, and transmit the given data block in response to the read request. The above-recited embodiment wherein the media agent is further configured to: if the given data block is not in the cache storage area, use the first index to determine where the given data block is stored on the backup media and retrieve the given data block therefrom; transmit the given data block retrieved from the backup media in response to the read request and store the given data block to the cache storage area for retrieval in a subsequent one of: a live browse operation and a file indexing operation. The above-recited embodiment wherein the media agent is further configured to: receive an indication that a third computing device initiated the subsequent file indexing operation of the backup copy, wherein the third computing device comprises one or more hardware processors; mount the backup copy to a mount point at the media agent; use the first index to identify the first data blocks in the backup copy; retrieve from the cache storage area first data blocks of the backup copy stored in the cache storage area as indicated by the second index; retrieve from the backup copy second data blocks needed for the file indexing operation and not found in the cache storage area, by using a sequential order of retrieval based on where these second data blocks are stored on the backup media as indicated by the first index; transmit the first and second data blocks in response to the indication that the third computing device initiated the subsequent file indexing operation; and store to the cache storage area the second data blocks retrieved from the backup copy during the subsequent file indexing operation if the second data blocks are not already in the cache storage area.

The above-recited embodiment wherein the media agent is further configured to, during the subsequent file indexing operation: receive a read request issued by the third computing device for a third data block of the backup copy; if the second index indicates that the third data block is in the cache storage area, retrieve the third data block from the cache storage area; and transmit the third data block in response to the read request without accessing the backup copy on the backup media. The above-recited embodiment wherein the media agent is further configured to: if the third data block is not in the cache storage area, use the first index to determine where the third data block is stored on the backup media and retrieve the third data block therefrom; transmit the third data block retrieved from the backup media in response to the read request and store the third data block to the cache storage area for retrieval in a subsequent one of: a live browse operation and a file indexing operation.

According to another illustrative embodiment, a computer-implemented method for managing a cache storage area in a data storage management system, comprises: in the data storage management system, performing a block-level backup operation that generates: a backup copy of primary data that resides in a file system, and a first index that tracks where data blocks of the backup copy are stored on backup media, wherein the first index indicates that certain data blocks are file system descriptor blocks; by the media agent, using a second index stored at the media agent to determine whether each of the file system descriptor blocks is stored in a cache storage area at the media agent, wherein the media agent maintains the second index; if the media agent determines that a file descriptor block is not stored in the cache storage area, storing the file descriptor block to the cache storage area and updating the second index to so indicate; receiving an indication at the media agent that a computing device initiated a live browse operation in reference to the backup copy; by the media agent, using the first index to identify data blocks in the backup copy that are file system descriptor blocks; if the media agent determines that first file system descriptor blocks of the backup copy are stored in the cache storage area, retrieving the first file system descriptor blocks therefrom; if the media agent determines that second file system descriptor blocks of the backup copy are not stored in the cache storage area, using the first index to determine where the second file system descriptor blocks are stored on the backup media, defining a sequential order for the second file system descriptor blocks according to where they are stored on the backup media and sequentially retrieving them from the backup media according to the sequential order, wherein the backup copy is mounted to a mount point at the media agent; and storing the second file system descriptor blocks to the cache storage area and updating the second index to so indicate; transmitting one or more of: the first and second file system descriptor blocks of the backup copy in response to the indication that the computing device initiated the live browse operation; and issuing a release command that allows the computing device to accept user requests to live browse contents of the backup copy.

The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media. The above-recited embodiment wherein the transmitting of the one or more of the first and second file system descriptor blocks for the backup copy before issuing the release command enables faster response times of the live browse of the backup copy as compared to on demand serving read requests issued by the live browse operation for data blocks of the backup copy. The above-recited embodiment further comprising performing the live browse operation in the data storage management system wherein data blocks from the backup copy that are retrieved in the live browse operation are added to the cache storage area at the media agent. The above-recited embodiment wherein data blocks from the backup copy that are retrieved in the live browse operation are added to the cache storage area at the media agent and are available therefrom for subsequent file indexing of the backup copy. The above-recited embodiment further comprising performing the live browse operation in the data storage management system comprising: receiving, at the media agent, a read request issued by the computing device for a first data object that was backed up to the backup copy, wherein the first data object comprises a first data block; by the media agent, using the second index to determine whether the first data block is stored in the cache storage area; if the media agent determines that the first data block is stored in the cache storage area, retrieving the first data block therefrom; if the media agent determines that the first data block is not stored in the cache storage area, using the first index to determine where the first data block is stored on the backup media, and retrieving the first data block from the backup media; and transmitting the first data block in response to the read request. The above-recited embodiment wherein a pseudo-disk driver is interposed between the computing device that initiates the live browse operation and the media agent, and wherein the one or more of the first and second file system descriptor blocks for the backup copy are transmitted by the media agent to the pseudo-disk driver in response to the indication that the computing device initiated the live browse operation, and wherein the pseudo-disk driver responds to read requests of the live browse operation issued by the computing device. The above-recited embodiment wherein the pseudo-disk driver responds to the read requests of the live browse operation from a first storage area that comprises data blocks received from the media agent, including the one or more of the first and second file system descriptor blocks, and wherein data blocks from write operations issued by the live browse operation are written to a second storage area whose contents are discarded after the computing device terminates the live browse operation. The above-recited embodiment wherein the block-level backup operation is one of a full backup, a differential backup, and an incremental backup. The above-recited embodiment wherein the file system descriptor blocks are data blocks that are used in live browse operations. The above-recited embodiment wherein the live browse operation uses file system descriptor blocks added to the cache storage area by the block-level backup operation. The above-recited embodiment further comprising: receiving an indication at the media agent that a file indexing operation has been initiated in reference to the backup copy; by the media agent, using the first index to identify data blocks in the backup copy that are file system descriptor blocks; if the media agent determines that third file system descriptor blocks of the backup copy are stored in the cache storage area, retrieving the third file system descriptor blocks therefrom; if the media agent determines that fourth file system descriptor blocks of the backup copy are not stored in the cache storage area, using the first index to determine where the fourth file system descriptor blocks are stored on the backup media, defining a sequential order for the fourth file system descriptor blocks according to where they are stored on the backup media and sequentially retrieving them from the backup media according to the sequential order, storing the fourth file system descriptor blocks to the cache storage area and updating the second index to so indicate; transmitting one or more of the third and fourth file system descriptor blocks of the backup copy in response to the indication that the file indexing operation has been initiated; and generating a file index of the backup copy, based on the file system descriptor blocks obtained from the media agent, including the one or more of the third and fourth file system descriptor blocks, wherein the file index indicates what data objects are backed up in the backup copy. The above-recited embodiment wherein the primary data is generated by one or more applications that store the primary data in the file system to one or more primary data storage devices. The above-recited embodiment wherein the primary data is generated by a virtual machine that stores the primary data to a virtual disk.

According to yet another illustrative embodiment, a computer-implemented method for managing a cache storage area in a data storage management system, the method comprises: in the data storage management system, performing a block-level backup operation that generates: a backup copy of primary data that resides in a file system, and a first index that tracks where data blocks of the backup copy are stored on backup media; by the media agent, using a second index to determine whether each of the file system descriptor blocks is stored in a cache storage area at the media agent, wherein the media agent maintains the second index and the cache storage area, and wherein the media agent executes on a first computing device comprising one or more hardware processors; if a file descriptor block is not stored in the cache storage area, storing the file descriptor block to the cache storage area and updating the second index to so indicate; performing a live browse operation at a second computing device in the data storage management system comprising: receiving, at the media agent, a read request issued by the computing device for a first data block that was backed up to the backup copy, if, according to the second index, the first data block is stored in the cache storage area, retrieving the first data block therefrom, if the first data block is not in the cache storage area, using the first index to determine where the first data block is stored on the backup media, and retrieving the first data block therefrom, wherein the backup copy is mounted to a mount point at the first computing device; transmitting the first data block in response to the read request.

The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media. The above-recited embodiment wherein, before receiving the read request the method further comprises: receiving an indication at the media agent that the second computing device initiated the live browse operation in reference to the backup copy; mounting the backup copy to the mount point at the first computing device; by the media agent, using the first index to identify data blocks in the backup copy that are file system descriptor blocks; if first file system descriptor blocks are stored in the cache storage area, retrieving the first file system descriptor blocks therefrom; if second file system descriptor blocks are not stored in the cache storage area, using the first index to determine where the second file system descriptor blocks are stored on the backup media, defining a sequential order for the second file system descriptor blocks according to where they are stored on the backup media and sequentially retrieving them from the backup media according to the sequential order, storing the second file system descriptor blocks to the cache storage area and updating the second index to so indicate; transmitting one or more of the first and second file system descriptor blocks of the backup copy in response to the indication that the second computing device initiated the live browse operation; and issuing a release command that allows the computing device to accept user input to live browse contents of the backup copy, including a user input that comprises the read request for the first data block of the backup copy. The above-recited embodiment wherein, before receiving the read request the method further comprises: receiving an indication at the media agent that the second computing device initiated the live browse operation in reference to the backup copy, wherein the second computing device is communicatively coupled with a pseudo-disk driver that is interposed between the second computing device and the media agent; mounting the backup copy to a mount point at the first computing device; by the media agent, using the first index to identify data blocks in the backup copy that are file system descriptor blocks; if the media agent determines that first file system descriptor blocks are stored in the cache storage area, retrieving the first file system descriptor blocks therefrom; if the media agent determines that second file system descriptor blocks are not stored in the cache storage area, using the first index to determine where the second file system descriptor blocks are stored on the backup media, defining a sequential order for the second file system descriptor blocks according to where they are stored on the backup media and sequentially retrieving them from the backup media according to the sequential order, storing the second file system descriptor blocks to the cache storage area and updating the second index to so indicate; transmitting one or more of the first and second file system descriptor blocks for the backup copy to the pseudo-disk driver; issuing a release command that allows the computing device to accept user requests to live browse contents of the backup copy, including a user request that comprises the read request for the first data block of the backup copy; and wherein the pseudo-disk driver responds to read requests of the live browse operation, including the read request for the first data block, from a first storage area that comprises data blocks received from the media agent, including the one or more of the first and second file system descriptor blocks, and wherein data blocks from write operations issued by the live browse operation are written to a second storage area whose contents are discarded after the computing device terminates the live browse operation.

The above-recited embodiment wherein the file system descriptor blocks for the backup copy are transmitted by the media agent to the pseudo-disk driver in response to the indication that the computing device initiated the live browse operation, and wherein the pseudo-disk driver responds to read requests of the live browse operation issued by the computing device. The above-recited embodiment wherein the pseudo-disk driver serves read requests of live browse operations from a first storage area that comprises data blocks received from the media agent, and wherein data blocks from write operations issued by the live browse operation are written to a second storage area whose contents are discarded after the computing device terminates the live browse operation. The above-recited embodiment wherein the media agent executes on a first computing device comprising one or more hardware processors, and wherein the pseudo-disk driver executes on one of: the first computing device and a second computing device comprising one or more hardware processors and which is communicatively coupled to the first computing device. The above-recited embodiment wherein the file system descriptor blocks are associated with the file system. The above-recited embodiment wherein a virtual machine generates the primary data, which is stored in a virtual disk in the file system, and wherein the file system descriptor blocks are associated with the file system. The above-recited embodiment further comprising: by a data agent component of the data storage management system, indicating to the media agent during the block-level backup operation, that a data block being backed up to the backup copy is a type of data block to be added to the cache storage area, and wherein a file system descriptor block is of the type of data block to be added to the cache storage area. The above-recited embodiment further comprising: by a data agent component of the data storage management system, indicating to the media agent that a data block being backed up to the backup copy is a type of data block to be added to the cache storage area, and wherein a file system descriptor block is of the type of data block to be added to the cache storage area. The above-recited embodiment wherein the data agent is specific to the file system. The above-recited embodiment wherein the data agent is a virtual server data agent associated with a computing device that hosts a virtual machine that generates the primary data. The above-recited embodiment further comprising: by a data agent component of the data storage management system, indicating to the media agent that a data block being backed up to the backup copy is a file system descriptor block. The above-recited embodiment wherein using the second index by the media agent to determine whether each of the file system descriptor blocks is stored in the cache storage area is based on the data agent indicating that a data block being backed up to the backup copy is a file system descriptor block. The above-recited embodiment wherein the data agent is specific to the file system. The above-recited embodiment wherein the data agent is a virtual server data agent associated with a computing device that hosts a virtual machine that generates the primary data. The above-recited embodiment wherein the primary data in the file system is generated by one or more applications that execute on a computing device. The above-recited embodiment wherein the primary data is generated by one or more virtual machines that execute on a computing device, and wherein a virtual disk associated with the one or more virtual machines comprises the primary data. The above-recited embodiment further comprising: if the media agent determines that the first data block is not stored in the cache storage area, storing the first data block to the cache storage area and updating the second index to so indicate. The above-recited embodiment further comprising: populating a data structure at the media agent that tracks each retrieval of each data block, whether retrieved from the cache storage area or from the backup copy on backup media. The above-recited embodiment further comprising: populating a data structure at the media agent that tracks each retrieval of each data block, whether retrieved from the cache storage area or from the backup copy on backup media; and pruning data blocks from the cache storage area based on retrieval information in the data structure. The above-recited embodiment wherein the media agent executes on a first computing device comprising one or more hardware processors, and wherein the first computing device is distinct from the computing device that performs the live browse operation. The above-recited embodiment wherein the media agent executes on a first computing device comprising one or more hardware processors; wherein the file system descriptor blocks are associated with the file system of the primary data; and wherein a data agent component of the data storage management system, which is associated with the primary data, indicates to the media agent that a data block being backed up to the backup copy is a file system descriptor block, wherein the data agent executes on one of: the first computing device, and a second computing device comprising one or more hardware processors and which is communicatively coupled to the primary data. The above-recited embodiment wherein the block-level backup operation is managed by a storage manager that executes on a first computing device comprising one or more hardware processors; wherein the media agent executes on a second computing device comprising one or more hardware processors; and wherein the backup copy is generated under instructions received by the media agent from the storage manager.

According to yet one more illustrative embodiment, a computer-implemented method for managing a cache storage area for file indexing operations in a data storage management system, the method comprises: in the data storage management system, performing a block-level backup operation that generates: a backup copy of primary data that resides in a file system, and a first index that tracks where data blocks of the backup copy are stored on backup media, wherein the first index is generated and maintained by a media agent component of the data storage management system, wherein the first index indicates that certain data blocks are file system descriptor blocks; by the media agent, using a second index stored at the media agent to determine whether each of the file system descriptor blocks is stored in a cache storage area at the media agent, wherein the media agent maintains the second index and the cache storage area; if the media agent determines that a file descriptor block is not stored in the cache storage area, storing the file descriptor block to the cache storage area and updating the second index to so indicate; receiving an indication at the media agent that a file indexing operation has been initiated in reference to the backup copy; mounting the backup copy to a mount point at the media agent; by the media agent, using the first index to identify all data blocks in the backup copy that are file system descriptor blocks; if the media agent determines that first file system descriptor blocks of the backup copy are stored in the cache storage area, retrieving the first file system descriptor blocks therefrom; if the media agent determines that second file system descriptor blocks of the backup copy are not stored in the cache storage area, using the first index to determine where the second file system descriptor blocks are stored on the backup media, defining a sequential order for the second file system descriptor blocks according to where they are stored on the backup media and sequentially retrieving them from the backup media according to the sequential order, storing the second file system descriptor blocks to the cache storage area and updating the second index to so indicate; transmitting all the file system descriptor blocks for the backup copy in response to the indication that the file indexing operation has been initiated; and generating a file index of the backup copy, based on the file system descriptor blocks obtained from the media agent, wherein the file index indicates what data file objects are backed up in the backup copy.

The above-recited embodiment, wherein data blocks in the cache storage area are available for retrieval therefrom in one or more of: subsequent live browse operations of the backup copy, subsequent file indexing operations of the backup copy, and subsequent file-level restores of the backup copy, rather than being retrieved from the backup copy on backup media. The above-recited embodiment wherein the media agent generates the file index. The above-recited embodiment wherein an indexing server distinct from a computing device that hosts the media agent generates the file index. The above-recited embodiment further comprising performing a live browse operation of the backup copy after the generating of the file index of the backup copy, comprising: receiving, at the media agent, a read request issued by a computing device for a first data object that was backed up to the backup copy, wherein the first data object comprises a first data block; by the media agent, using the second index to determine whether the first data block is stored in the cache storage area; if the media agent determines that the first data block is stored in the cache storage area, retrieving the first data block therefrom; if the media agent determines that the first data block is not stored in the cache storage area, using the first index to determine where the data block is stored on the backup media, and retrieving the first data block from the backup media; and transmitting the first data block in response to the read request. The above-recited embodiment wherein a pseudo-disk driver is interposed between the computing device that initiates the live browse operation and the media agent, and wherein file system descriptor blocks for the backup copy are transmitted by the media agent to the pseudo-disk driver in response to the indication that the computing device initiated the live browse operation, and wherein the pseudo-disk driver responds to read requests of the live browse operation issued by the computing device. The above-recited embodiment wherein the pseudo-disk driver serves read requests of the live browse operations from a first storage area that comprises data blocks received from the media agent, and wherein data blocks from write operations issued by the live browse operation are written to a second storage area whose contents are discarded after the computing device terminates the live browse operation. The above-recited embodiment wherein a pseudo-disk driver is interposed between a computing device that generates the file index and the media agent, and wherein file system descriptor blocks for the backup copy are transmitted by the media agent to the pseudo-disk driver in response to the indication that the file indexing operation has been initiated, and wherein the pseudo-disk driver responds to read requests of the file indexing operation issued by the computing device that generates the file index. The above-recited embodiment wherein the pseudo-disk driver serves read requests of the indexing operation from a first storage area that comprises data blocks received from the media agent, and wherein data blocks from write operations issued by the file indexing operation are written to a second storage area whose contents are discarded after the file indexing operation ends. The above-recited embodiment wherein data blocks from the backup copy that are used in the file indexing operation are added to the cache storage area at the media agent. The above-recited embodiment wherein data blocks from the backup copy that are used in the file indexing operation are added to the cache storage area at the media agent and are available therefrom for subsequent live browse operations of the backup copy.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method for caching metadata-comprising segments of data being backed up, the method comprising:
    by a first computing device that comprises one or more hardware processors and computer memory, while backing up first data:
        dividing the first data into extents of a first fixed size, wherein each extent comprises a plurality of segments of a second fixed size smaller than the first fixed size,
        for each extent that comprises at least one segment that comprises metadata, adding a metadata flag to a header of the extent,
        for each extent that comprises at least one segment that comprises metadata, generating a bitmap indicating which segments of the extent comprise metadata, and adding the bitmap to the header of the extent, and
        transmitting the extents of the first data to a second computing device;
    by the second computing device, which comprises one or more hardware processors and computer memory, and which further comprises a cache storage area and a backup index, for each extent received from the first computing device:
        (a) determining whether the extent comprises a metadata flag,
        (b) generating a backup extent that comprises the plurality of segments within the extent, and
        (c) storing a backup copy of the first data at one or more data storage resources, wherein the backup copy comprises backup extents generated from the extents of the first data received from the first computing device;
    by the second computing device, for each extent that comprises a metadata flag:

(i) using the bitmap of the extent to strip from the extent all segments that do not comprise metadata, (ii) generating a stripped extent that comprises: an extent identifier corresponding to the extent, all segments of the extent that comprise metadata, and hole markers replacing segments of the extent that do not comprise metadata, and (iii) storing the stripped extent at the cache storage area; and by the second computing device, in response to a request for metadata of a first extent associated with the backup copy:

based on a corresponding stripped extent being present in the cache storage area, serving the corresponding stripped extent therefrom, and based on a corresponding stripped extent not being present in the cache storage area, using the backup index to locate a corresponding backup extent in the one or more data storage resources, restoring the corresponding backup extent, and serving the corresponding backup extent as restored.

2. The method of claim 1 further comprising: by the second computing device, for each extent received from the first computing device that comprises a metadata flag, adding the metadata flag and the bitmap of the extent to the backup index.

3. The method of claim 1, wherein each backup extent generated by the second computing device and stored at the one or more data storage resources is configured without a metadata flag and a bitmap.

4. The method of claim 1 wherein the corresponding backup extent located in the one or more data storage resources is restored to the cache storage area and served therefrom in response to the request.

5. The method of claim 1 further comprising: by the second computing device, determining if the corresponding stripped extent is present in the cache storage area by checking an index of the cache storage area at the second computing device.

6. The method of claim 1, wherein an index of the cache storage area indicates whether an extent in the cache storage area is a stripped extent or a backup extent.

7. The method of claim 1 further comprising: by the second computing device, in response to a request for an extent associated with the backup copy, using the backup index to locate a corresponding backup extent in the one or more data storage resources, restoring the corresponding backup extent, and serving the corresponding backup extent as restored.

8. The method of claim 1 further comprising: by the second computing device: in response to a request for an extent associated with the backup copy, using the backup index to locate a corresponding backup extent in the one or more data storage resources, restoring the corresponding backup extent to the cache storage area, and serving the corresponding backup extent therefrom.

9. The method of claim 1 further comprising:

in response to a request for a full extent, checking an index of the cache storage area to determine whether a corresponding backup extent is present in the cache storage area.

10. The method of claim 1, wherein the request is received from a driver that intercepts read requests directed to the backup copy in one of: a pre-fetch operation that precedes a file scan of a file indexing operation directed to the backup copy and a live browse operation directed to the backup copy.

11. The method of claim 10, wherein the driver executes on one of: the second computing device and a third computing device that is distinct from the first computing device and from the second computing device, and wherein the driver manages a pseudo-disk storage area from which the driver serves the read requests directed to the backup copy.

12. The method of claim 10, wherein the driver executes on one of: the second computing device and a third computing device that is distinct from the first computing device and from the second computing device, and wherein the driver stores stripped extents and backup extents received from the second computing device at a pseudo-disk storage area from which the driver serves the read requests directed to the backup copy.

13. The method of claim 1, further comprising:

before executing a file indexing operation directed to the backup copy, pre-fetching metadata associated with the backup copy, wherein the pre-fetching comprises issuing to the second computing device a plurality of requests for metadata associated with the backup copy, including the request for metadata of the first extent, wherein the plurality of requests are flagged as metadata requests; and by the second computing device, based on receiving a request flagged as a metadata request, attempting to serve the metadata request with a stripped extent from the cache storage area.

14. The method of claim 1 further comprising: by the second computing device:

receiving a request for metadata associated with the backup copy;

identifying in the backup index a plurality of extent identifiers each one associated with the backup copy and having a metadata flag;

receiving a request for an extent having a first identifier from among the plurality of extent identifiers; and in response, serving a stripped extent from the cache storage area.

15. The method of claim 1 wherein a data agent that executes at the first computing device performs one or more of: the dividing the first data into extents, the adding the metadata flag, the generating of the bitmap, and the transmitting of the extents of the first data to the second computing device.

16. The method of claim 1, wherein a media agent that executes at the second computing device performs one or more of: the determining, the using of the bitmap, the generating and storing of the stripped extent, the generating of the backup extent, the storing of the backup copy, and the serving of one of the corresponding stripped extent and the corresponding backup extent.

17. A computer-implemented method comprising:

by a first computing device that comprises one or more hardware processors and computer memory, while backing up first data:

dividing the first data into extents of a first fixed size, wherein each extent comprises a plurality of segments of a second fixed size smaller than the first fixed size, for each extent that comprises at least one segment that comprises metadata, adding a metadata flag to a header of the extent, for each extent that comprises at least one segment that comprises metadata, generating a bitmap indicating which segments of the extent comprise metadata, and adding the bitmap to the header of the extent, and transmitting the extents of the first data to a second computing device;

by the second computing device, which comprises one or more hardware processors and computer memory, and which further comprises a cache storage area and a backup index, for each extent received from the first computing device:
(a) determining whether the extent comprises a metadata flag,
(b) generating a backup extent that comprises the plurality of segments within the extent, and
(c) storing a backup copy of the first data at one or more data storage resources, wherein the backup copy comprises backup extents generated from the extents of the first data received from the first computing device;

by the second computing device, for each extent that comprises a metadata flag:
(i) using the bitmap of the extent to strip from the extent all segments that do not comprise metadata,
(ii) generating a stripped extent that comprises: an extent identifier corresponding to the extent, all segments of the extent that comprise metadata, and hole markers replacing segments of the extent that do not comprise metadata, and
(iii) storing the stripped extent at the cache storage area;

by the second computing device, in response to a request for metadata of a first extent associated with the backup copy:
based on a corresponding stripped extent being present in the cache storage area, serving the corresponding stripped extent therefrom, and
based on a corresponding stripped extent not being present in the cache storage area, using the backup index to locate a corresponding backup extent in the one or more data storage resources, restoring the corresponding backup extent, and serving the corresponding backup extent as restored; and after the backup copy is stored at the one or more data storage resources, pre-fetching metadata of the backup copy, wherein the pre-fetching comprises:
requesting from the backup index at the second computing device metadata about the backup copy,
determining a plurality of extent identifiers associated with the backup copy that are flagged for metadata,
receiving from the second computing device a plurality of stripped extents corresponding the plurality of extent identifiers, and
storing the plurality of stripped extents at a pseudo-disk storage area, which is distinct from the cache storage area and is managed by a driver.

18. The method of claim 17 further comprising:
after the pre-fetching, initiating a file scan as part of a file indexing of the backup copy, wherein the file scan issues read requests that are intercepted by the driver;
by the driver, serving responses to the read requests of the file scan from the pseudo-disk storage area.

19. The method of claim 17 further comprising:
after the pre-fetching, initiating a live browse of the backup copy, wherein the live browse issues read requests that are intercepted by the driver; and
by the driver, serving responses to the read requests of the live browse from the pseudo-disk storage area.

20. The method of claim 17, wherein one of: (A) the driver executes on and maintains the pseudo-disk storage area at the second computing device, and (B) the driver executes on and maintains the pseudo-disk storage area at a third computing device, which comprises one or more hardware processors and is distinct from the first computing device and from the second computing device.

\* \* \* \* \*